(12) United States Patent
Douros et al.

(10) Patent No.: US 10,489,362 B2
(45) Date of Patent: Nov. 26, 2019

(54) DISTRIBUTED DATABASE SYSTEM

(71) Applicant: Ab Initio Technology LLC, Lexington, MA (US)

(72) Inventors: Bryan Phil Douros, Framingham, MA (US); Stephen A. Revilak, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 446 days.

(21) Appl. No.: 15/201,849

(22) Filed: Jul. 5, 2016

(65) Prior Publication Data

US 2017/0011085 A1 Jan. 12, 2017

Related U.S. Application Data

(60) Provisional application No. 62/190,843, filed on Jul. 10, 2015.

(51) Int. Cl.
*G06F 16/215* (2019.01)
*G06F 16/23* (2019.01)
(Continued)

(52) U.S. Cl.
CPC ........ *G06F 16/215* (2019.01); *G06F 16/2308* (2019.01); *G06F 16/2329* (2019.01);
(Continued)

(58) Field of Classification Search
CPC .. G06F 2221/2149; G06F 9/466; G06F 21/78; G06F 2221/0782; G06F 17/30356;
(Continued)

(56) References Cited

U.S. PATENT DOCUMENTS 5,999,931 A 12/1999 Breitbart et al.
6,785,696 B2 * 8/2004 Mosher, Jr. ......... G06F 11/1471
(Continued)

FOREIGN PATENT DOCUMENTS

EP 0 458 564 11/1991
JP H04232545 8/1992
(Continued)

OTHER PUBLICATIONS

International Search Report and Written Opinion, PCT Application No. PCT/US2016040949, dated Oct. 10, 2016 (11 pages).
(Continued)

*Primary Examiner* — Angelica Ruiz
(74) *Attorney, Agent, or Firm* — Occhiuti & Rohlicek LLP

(57) ABSTRACT

Managing potentially concurrent transactions in a distributed database system includes: maintaining, at a first node, records of transactions executing on one or more nodes, each having a transaction state, execution of a first transaction at a second node including an operation for accessing a first data element stored on the second node and execution of a second transaction at the second node including an operation for accessing the first data element; receiving, at the second node from the first node, a list of transactions including any transactions executing on the second node and having a first transaction state at a time of initiation of the second transaction, and including the first transaction; determining that an outcome of the second transaction depends on an outcome of the first transaction based on the list; and suspending execution of the second transaction until after the first transaction is complete based on the determining.

42 Claims, 41 Drawing Sheets

(51) Int. Cl.
*G06F 9/46* (2006.01)
*G06F 16/27* (2019.01)

(52) U.S. Cl.
CPC ...... *G06F 16/2343* (2019.01); *G06F 16/2365* (2019.01); *G06F 16/2379* (2019.01); *G06F 16/27* (2019.01)

(58) Field of Classification Search
CPC ........ G06F 17/30377; G06F 17/30227; G06F 17/30575
USPC ............. 707/600–831, 899, 99.001–999.206
See application file for complete search history.

(56) References Cited

U.S. PATENT DOCUMENTS

| | | | | |
|---|---|---|---|---|
| 7,130,807 | B1* | 10/2006 | Mikurak | G06Q 10/06 705/7.25 |
| 7,716,077 | B1* | 5/2010 | Mikurak | G06Q 10/06 705/7.12 |
| 8,140,623 | B2* | 3/2012 | Fachan | G06F 17/30227 709/205 |
| 8,356,007 | B2* | 1/2013 | Larson | G06F 16/1865 707/610 |
| 9,075,841 | B2 | 7/2015 | Larson et al. | |
| 2002/0087366 | A1 | 7/2002 | Collier et al. | |
| 2003/0120600 | A1* | 6/2003 | Gurevich | G06F 9/542 705/50 |
| 2004/0078379 | A1 | 4/2004 | Hinshaw et al. | |
| 2007/0011194 | A1* | 1/2007 | Gurevich | G06F 9/542 |
| 2007/0168351 | A1* | 7/2007 | Fachan | G06F 17/30227 |
| 2009/0144750 | A1* | 6/2009 | Little | G06F 13/385 719/313 |
| 2011/0041006 | A1* | 2/2011 | Fowler | G06F 9/466 714/10 |
| 2012/0102006 | A1* | 4/2012 | Larson | G06F 16/1865 707/703 |
| 2015/0169415 | A1* | 6/2015 | Hildebrand | G06F 3/0617 714/4.5 |
| 2017/0011085 | A1 | 1/2017 | Douros et al. | |

FOREIGN PATENT DOCUMENTS

| | | |
|---|---|---|
| JP | H08235047 | 9/1996 |
| WO | WO 2013/019894 | 2/2013 |
| WO | 2014/186396 | 11/2014 |

OTHER PUBLICATIONS

Lomet et al., "Multi-version Concurrency via Timestamp Range Conflict Management," 2012 IEEE 28th International Conference on Data Engineering, pp. 714-725 (Apr. 1, 2012).

International Search Report and Written Opinion, PCT Application No. PCT/US2016/040953, dated Oct. 10, 2016 (13 pages).

Cahill, Michael et al."Serializable isolation for snapshot databases." *Proceedings of the 2008 ACM SIGMOD international conference on Management of data*. ACM, (2008): 229-238.

Revilak et al. "Precisely Serializable Snapshot Isolation." *University of Massachusetts at Boston*, (2011).

U.S. Appl. No. 15/201,931, filed Jul. 5, 2016, Distributed Database System.

Shinya Kobashi, Regarding Time Printing System that can serve accord to request, Journal of the Institute Electronics, Information and Communication, The Institute of Electronics, Information and Communication Engineers, Mar. 25, 1991, vol. J74-D-I No. 3, p. 232-239.

Toshio Hirotsu, Consistent guarantee system by a transaction control Transactions of Information Processing Society of Japan, Nov. 15, 1995, v0l. 36, No. 11, p. 2702-2710.

* cited by examiner

DISTRIBUTED DATABASE SYSTEM

CROSS-REFERENCE TO RELATED APPLICATIONS

This application is claims priority to U.S. Application Ser. No. 62/190,843, filed on Jul. 10, 2015, incorporated herein by reference.

BACKGROUND

This description relates to a distributed database system.

A database is a structured set of persistent data that can be managed and queried using a software program. A transactional database management system is a relational database system that operates on (e.g., stores and manipulates) data in a database using database "transactions." In general, a database transaction symbolizes a single unit of work (including one or more operations) performed by the database management system on the database. To ensure that database transactions are processed reliably, database transactions must be atomic (i.e., a transaction, including all of its one or more operations, must either complete in its entirety or have no effect whatsoever), consistent (i.e., a transaction must move the database from one valid state to another valid state), isolated (i.e., concurrently executing transactions result in the same state in the database as would result if the transactions were executed serially), and durable (i.e., a committed transaction will remain committed regardless of system crashes, errors, and other issues). This set of properties of a database transaction is sometimes referred to as "ACID."

SUMMARY

In an aspect, in general, a method for managing potentially concurrent transactions in a distributed database system including a plurality of nodes includes: maintaining, at a first node of the plurality of nodes, records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node; receiving, at the second node from the first node, a list of transactions that includes any of the plurality of transactions executing on the second node and having a first transaction state at a time of initiation of the second transaction, the list of transactions including the first transaction; determining that an outcome of the second transaction depends on an outcome of the first transaction based at least in part on the list of transactions; and suspending execution of the second transaction until after the first transaction is complete based on the determining.

Aspects can include one or more of the following features.

Determining that an outcome of the second transaction depends on an outcome of the first transaction based at least in part on the list of transactions includes determining that a time of initiation of the first transaction occurs prior to the time of initiation of the second transaction and that a commit time of the first transaction occurs prior to the time of initiation of the second transaction.

The list of transactions is received at the second node at the time of initiation of the second transaction.

The transactions included in the list of transactions consist of the transactions executing on the second node and having the first transaction state at the time of initiation of the second transaction.

The list of transactions includes, for each transaction in the list of transactions, a time of initiation of the transaction.

The first transaction state indicates that a transaction is preparing to complete.

The first transaction writes the first data element and the second transaction reads the first data element, and a version of the first data element read by the second transaction depends on the outcome of the first transaction.

Possible outcomes of the first transaction include a transaction aborted outcome and a transaction committed outcome.

The method further includes resuming execution of the second transaction after completion of the first transaction, including reading a first version of the first data element if the outcome of the first transaction is the transaction aborted outcome.

The method further includes resuming execution of the second transaction after completion of the first transaction, including reading a second, different version of the first data element written by the first transaction if the outcome of the first transaction is the transaction committed outcome.

One or both of the first transaction and the second transaction accesses data elements stored on a third node of the plurality of nodes.

Both the first transaction and the second transaction attempt to write the first data element and the second transaction is in the first transaction state.

Determining that an outcome of the second transaction depends on an outcome of the first transaction based at least in part on the list of transactions includes determining that a time of initiation of the second transaction occurs after a time of initiation of the first transaction and before a commit time of the first transaction.

The first transaction is scheduled to commit its write before the second transaction and whether or not the second transaction is aborted depends on whether the first transaction results in a transaction aborted outcome or a transaction committed outcome.

The method further includes resuming execution of the second transaction after completion of the first transaction, including writing a first value of the first data element if the outcome of the first transaction is the transaction aborted outcome.

The method further includes resuming execution of the second transaction after completion of the first transaction, including aborting the second transaction if the outcome of the first transaction is the transaction committed outcome.

In another aspect, in general, software is stored in a non-transitory form on a computer-readable medium, for managing potentially concurrent transactions in a distributed database system including a plurality of nodes, the software including instructions for causing a computing system to: maintain, at a first node of the plurality of nodes, records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node; receive, at the second node from the first node, a list of transactions that includes any of the plurality of transactions executing on the second node and having a first transaction state at a time of initiation of the second transaction, the list of transactions including the first transaction; determine that an outcome of the second transaction depends on an outcome of the first transaction based at least in part on the list of transactions; and suspend execution of the second transaction until after the first transaction is complete based on the determining.

In another aspect, in general, an apparatus for managing potentially concurrent transactions includes: a plurality of nodes arranged in a distributed database system, each node including at least one processor; and a communication medium connecting ports of the plurality of nodes for sending and receiving information between the plurality of nodes; wherein a first node of the plurality of nodes is configured to maintain records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node; wherein the second node is configured to receive, from the first node, a list of transactions that includes any of the plurality of transactions executing on the second node and having a first transaction state at a time of initiation of the second transaction, the list of transactions including the first transaction; wherein the second node is configured to determine that an outcome of the second transaction depends on an outcome of the first transaction based at least in part on the list of transactions; and wherein the second node is configured suspend execution of the second transaction until after the first transaction is complete based on the determining.

In another aspect, in general, a computing system for managing potentially concurrent transactions in a distributed database system including a plurality of nodes includes: means for maintaining, at a first node of the plurality of nodes, records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node; means for receiving, at the second node from the first node, a list of transactions that includes any of the plurality of transactions executing on the second node and having a first transaction state at a time of initiation of the second transaction, the list of transactions including the first transaction; means for determining that an outcome of the second transaction depends on an outcome of the first transaction based at least in part on the list of transactions; and means for suspending execution of the second transaction until after the first transaction is complete based on the determining.

In another aspect, in general, a method for managing database transactions in a distributed database system including a plurality of nodes includes: maintaining, at a first node of the plurality of nodes, a first plurality of records of transactions in the system, each record in the first plurality of records being associated with a transaction and including a start time of the transaction and a start time of an oldest transaction that was active at the start time of the transaction, one of the records in the first plurality of records being a record of an oldest currently active transaction in the system; maintaining, at a second node of the plurality of nodes, a second plurality of records of transactions, the second plurality of records including records of completed transactions associated with the second node, each record in the second plurality of records including a transaction start time and a transaction end time; receiving at the second node, a message from the first node including a start time of an oldest transaction that was active at the transaction start time of the oldest currently active transaction in the system; and removing, from the second plurality of records, any records of completed transactions with a transaction end time occurring before the start time of the oldest transaction.

Aspects can include one or more of the following features.

The method further includes sending, from the second node, a request for the message from the first node.

The method further includes: receiving at the second node, a message from the first node including third plurality of records including records of active transactions in the system, each record in the third plurality of records including a transaction start time; and, for each record of a completed transaction in the second plurality of records, determining whether to remove the record based on the third plurality of records.

Determining whether to remove the record based on the third plurality of records includes comparing the transaction start times of the records of active transactions in the third plurality of records to a time interval beginning at the transaction start time of the record of the completed transaction and ending at the transaction end time of the record of the completed transaction.

Determining whether to remove the record based on the third plurality of records includes removing the record of the completed transaction from the second plurality of records if none of the transaction start times of the records of active transactions in the third plurality of records are in a time interval beginning at the transaction start time of the record of the completed transaction and ending at the transaction end time of the record of the completed transaction.

Determining whether to remove the record based on the third plurality of records includes preserving the record of the completed transaction in the second plurality of records if a record of an active transaction in the third plurality of records is associated with a transaction start time in a time interval beginning at the transaction start time of the record of the completed transaction and ending at the transaction end time of the record of the completed transaction.

Determining whether to remove the record based on the third plurality of records occurs after removing, from the second plurality of records, any records of completed transactions with a transaction end time occurring before the start time of the oldest transaction.

The method further includes: receiving, at the second node, a first transaction for accessing a data element associated with the second node; maintaining, at the second node, a third plurality of records including records of active transactions at the second node; and determining whether the first transaction is allowed to access a version of the data element of a plurality of versions of the data element based on one or both of the second plurality of records and the third plurality of records.

Determining whether the first transaction is allowed to access the version of the data element based on one or both of the second plurality of records and the third plurality of records includes: determining whether a record of a second transaction associated with the version of the data element is included in the third plurality of records and, if it is, determining that the first transaction is allowed to access the data element; if the record of the second transaction is not included in the third plurality of records, determining whether the a record of the second transaction is included in the second plurality of records and, if it is, comparing a start time of the first transaction to an end time of the second transaction to determine whether the first transaction is allowed to access the data element; and if the record of the second transaction is not included in the second plurality of records or the third plurality of records, determining that the first transaction is allowed to access the data element.

The first transaction is allowed to read the version of the data element if the transaction end time of the second transaction occurred before the transaction start time of the first transaction and if there does not exist a record of a third transaction in the second plurality of records, the third transaction having written a second version of the data element and having a transaction end time occurring after the transaction end time of the second transaction and before the transaction start time of the first transaction.

The first transaction is allowed to read the version of the data element if the version of the data element was written by the first transaction.

The first transaction is not allowed to read the version of the data element if the transaction start time of the second transaction occurred after the transaction start time of the first transaction.

The records of completed transactions of the second plurality of records are ordered based on the transaction end times of the records.

Removing any records of completed transactions with a transaction end time occurring before the transaction start time of the record of the oldest active transaction from the second plurality of records includes: iterating, in order starting from the record of the most recently completed transaction in the second plurality of records, through the second plurality of records until a record of a completed transaction with a transaction end time occurring before the transaction start time of the record of the oldest transaction is identified; and removing the identified record from the second plurality of records.

The method further includes removing any records of completed transactions with transaction end times occurring before the transaction end time of the identified record from the second plurality of records.

In another aspect, in general, software is stored in a non-transitory form on a computer-readable medium, for managing database transactions in a distributed database system including a plurality of nodes, the software including instructions for causing a computing system to: maintain, at a first node of the plurality of nodes, a first plurality of records of transactions in the system, each record in the first plurality of records being associated with a transaction and including a start time of the transaction and a start time of an oldest transaction that was active at the start time of the transaction, one of the records in the first plurality of records being a record of an oldest currently active transaction in the system; maintain, at a second node of the plurality of nodes, a second plurality of records of transactions, the second plurality of records including records of completed transactions associated with the second node, each record in the second plurality of records including a transaction start time and a transaction end time; receive at the second node, a message from the first node including a start time of an oldest transaction that was active at the transaction start time of the oldest currently active transaction in the system; and remove, from the second plurality of records, any records of completed transactions with a transaction end time occurring before the start time of the oldest transaction.

In another aspect, in general, an apparatus for managing database transactions includes: a plurality of nodes arranged in a distributed database system, each node including at least one processor; and a communication medium connecting ports of the plurality of nodes for sending and receiving information between the plurality of nodes; wherein a first node of the plurality of nodes is configured to maintain a first plurality of records of transactions in the system, each record in the first plurality of records being associated with a transaction and including a start time of the transaction and a start time of an oldest transaction that was active at the start time of the transaction, one of the records in the first plurality of records being a record of an oldest currently active transaction in the system; wherein a second node of the plurality of nodes is configured to maintain a second plurality of records of transactions, the second plurality of records including records of completed transactions associated with the second node, each record in the second plurality of records including a transaction start time and a transaction end time; wherein the second node is configured to receive a message from the first node including a start time of an oldest transaction that was active at the transaction start time of the oldest currently active transaction in the system; and wherein the second node is configured to remove, from the second plurality of records, any records of completed transactions with a transaction end time occurring before the start time of the oldest transaction.

In another aspect, in general, a computing system for managing database transactions in a distributed database system including a plurality of nodes, the computing system including: means for maintaining, at a first node of the plurality of nodes, a first plurality of records of transactions in the system, each record in the first plurality of records being associated with a transaction and including a start time of the transaction and a start time of an oldest transaction that was active at the start time of the transaction, one of the records in the first plurality of records being a record of an oldest currently active transaction in the system; means for maintaining, at a second node of the plurality of nodes, a second plurality of records of transactions, the second plurality of records including records of completed transactions associated with the second node, each record in the second plurality of records including a transaction start time and a transaction end time; means for receiving at the second node, a message from the first node including a start time of an oldest transaction that was active at the transaction start time of the oldest currently active transaction in the system; and means for removing, from the second plurality of records, any records of completed transactions with a transaction end time occurring before the start time of the oldest transaction.

Aspects may have one or more of the following advantages.

Distributed database systems arranged in a network of nodes may allow for processing a large amount of transactions per time that occur over a large area. For example, global logistical processes or credit card processes may involve a large number of transactions in a small amount of time across the globe. However, such huge amounts of transactions, and associated operations being applied to data, need to be coordinated (or managed) to obtain meaningful results of the transactions, especially if transactions occur at about the same time and use the same data.

Aspects described herein include a distributed database system implemented using multi-version concurrency control. In general, multi-version concurrency control enables a number of different versions (i.e., uniquely identifiable and independently modifiable copies) of a particular data element be retained in the distributed database system. Allowing a new version of a data element to be created avoids the need for certain locking protocols that may otherwise need to be used for preventing concurrent (and potentially conflicting) access to the same data element when only a single version of each data element is maintained. The longer wait times caused by such locking can also be avoided, potentially increasing the performance of the overall system.

A number of practical issues arise when using multi-version concurrency control in a distributed database system. For example, when multiple, concurrent transactions access the same data element, ambiguities may arise as to which of the transactions are allowed to commit their work. Some conventional distributed database systems resolve these ambiguities in such a way that results in potentially wasteful, premature, and possibly incorrect aborting of transactions. Aspects described herein are configured to elegantly resolve these ambiguities in such a way that potentially wasteful, premature, and possibly incorrect aborting of transactions is avoided.

In practical distributed database systems with limited memory and storage capacity, retention of too great a number of prior versions of data elements can result in consumption of an undesirable amount of the memory and/or storage capacity. Aspects described herein elegantly dispose of unneeded, obsolete prior versions of data elements by more precisely determining which prior versions of the data elements are no longer needed and deleting only those unneeded prior versions of data elements. The increased availability of memory and/or storage capacity for other purposes aids the performance of the overall system.

Among other aspects, the distributed database system implements multi-version concurrency control and conflict resolution on such a distributed, multi-node database system. Aspects advantageously maintain records of transactions, including transaction states, both locally at nodes of the database where the transactions are executing and at a leader node of the multi-node database. The records of transactions advantageously allow for fine-grained control over concurrent transactions across the network of the distributed database system.

Certain aspects advantageously use a snapshot isolation form of multi-version concurrency control, which allows for multiple versions of a data element to exist in the database system while, at the same time, allowing prevention of conflicts. Both transactions and versions of data in the database are advantageously associated with timestamps or similar transaction identifiers, which encode temporal relationships between transactions and provide a mechanism for conflict resolution between concurrent transactions.

One advantage of maintaining multiple versions of a data element is that transactions accessing the data element can easily be aborted and changes associated with the transaction can easily be undone by reverting to a previous version of the data element.

Certain aspects advantageously utilize a two-stage commit procedure to ensure atomicity of transactions.

Aspects can mitigate the effects of race conditions and/or ambiguities in the distributed database system, thereby avoiding premature abortion of transactions.

Nodes of the distributed database system maintain records of transactions that have previously completed or are active on the node. The records of transactions are used to identify race conditions and/or ambiguities in the distributed database system. The nodes implement purging procedures to ensure that only relevant records of transactions are maintained at the node and that irrelevant records are not maintained at the node. The purging can be performed in an efficient manner, such that the purging does not excessively interfere with other useful processing in the system, as described in more detail below. The purging may also facilitate subsequent processing for the preventing of conflicts between multiple transactions accessing the same data, possibly having multiple versions of data elements.

Other features and advantages of the invention will become apparent from the following description, and from the claims.

DESCRIPTION

Figure 1:
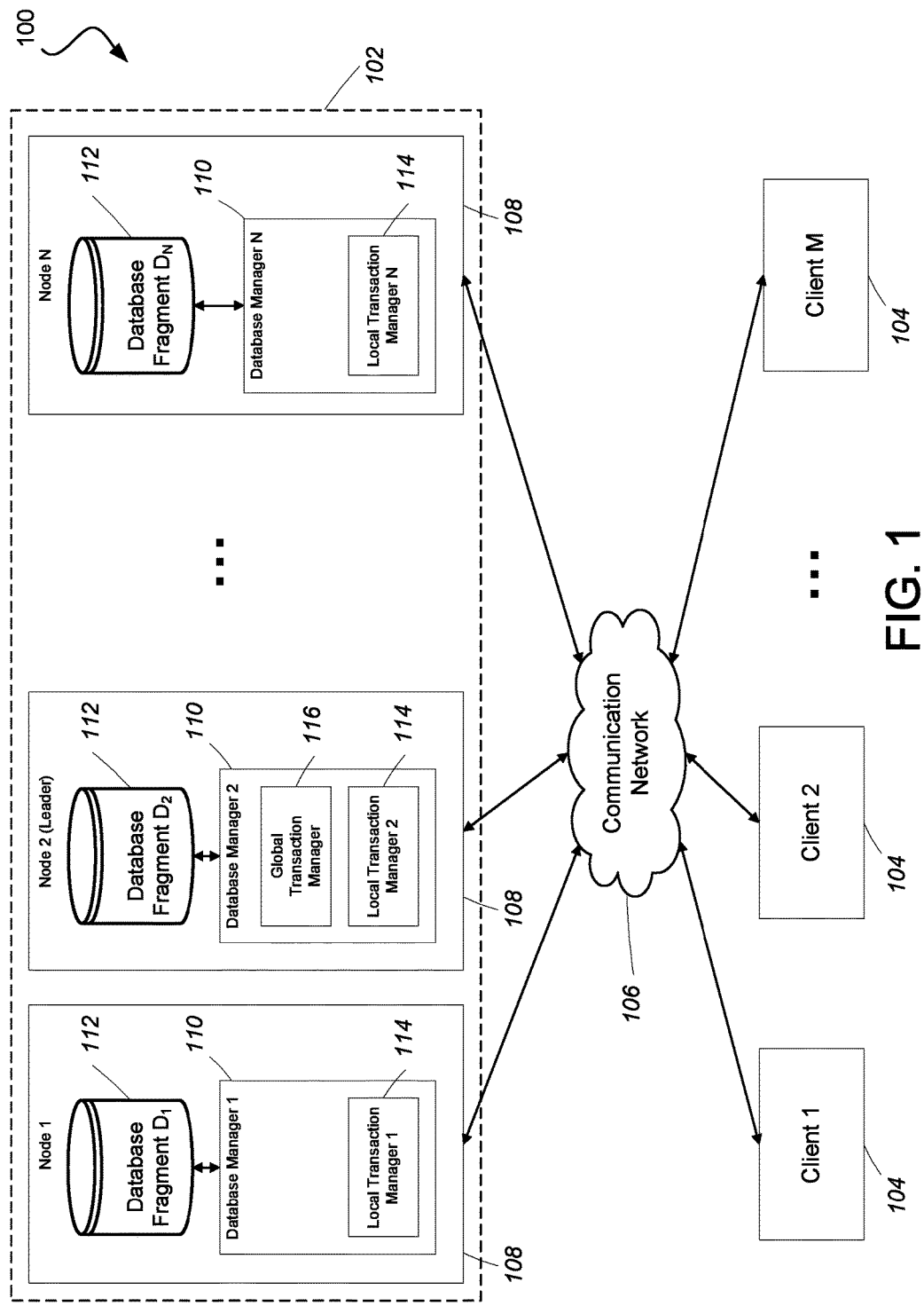
FIG. 1 is a block diagram of a data processing system including a distributed database system.

FIG. 1 shows an example of a data processing system 100 including the distributed database system 102. The distributed database system 102 is in communication with M database clients 104 over a communication network 106 (e.g., a WAN, a LAN, or a network in a multi-processor system or on a chip).

1 Distributed Database System

The distributed database system 102 includes N nodes (or "partitions") 108 over which fragments $D_n$ of a database, D are allocated. In some examples, each node 108 corresponds to a server process executing on a server computing system. In some examples, several nodes 108 can be hosted on a single processor or computing machine, or the nodes 108 may spread across multiple processors or computing machines (e.g., with each node 108 hosted on its own processor).

Each node 108 includes a data storage device 112 on which a fragment of the database, D is stored and a database manager 110, which manages the fragment of the database on the data storage device 112. The database manager 110 for a node 108 also serves as an interface between the fragment of the database on the data storage device 112 and entities external to the node 108 such as the clients 104 and other nodes 108.

In operation, the clients 104 specify one or more database transactions for execution on the database, D. The transactions specified by the clients 104 are sent over the communication network 106 to one or more of the database managers 110 of the nodes 108. When a transaction arrives at an $n^{th}$ database manager 110 of the N nodes 108, the $n^{th}$ database manager 110 causes the transaction to execute on the fragment of the database stored on the $n^{th}$ data storage device 112 that is managed by the $n^{th}$ database manager 110.

In some examples, when a transaction accesses multiple fragments of the database stored on multiple nodes 108, the $n^{th}$ database manager 110 forwards the transaction to the database managers 110 of the multiple nodes 108. In other examples, the client 104 from which the transaction originated sends the transaction to the appropriate nodes 108 required for completing the transaction. In yet other examples, the client 104 from which the transaction originated sends the transaction to the leader node and the leader node sends the transaction to the appropriate nodes 108 required for completing the transaction.

With the one or more transactions received at the appropriate nodes 108, the one or more transactions can execute and access the database. As is the case with conventional, centralized transactional databases, the one or more transactions may conflict with one another, resulting in some transactions successfully completing and other transactions failing, at which point they are forced to undo their changes and retry.

In some examples, each of the database managers 110 described above includes a local transaction manager 114 for, among other tasks, maintaining a record of each transaction that has in the past or is currently executing on the node 108. In some examples, each record of a transaction maintained by the local transaction manager 114 includes a transaction identifier (e.g., a start time of the transaction), a commit identifier (e.g., a time that the transaction was committed) for the transaction, and a state of the transaction (e.g., ACTIVE, PREPARING, COMMITTED, or ABORTING). While not explicitly shown in the figure, in some examples, each database manager 110 also includes a data processor that is responsible for management of the fragment of the database stored on the data storage device 112 managed by the database manager 110, an application processor for processing requests that require access to database fragments on more than one node 108, and communications software for communicating with the clients 104 and with other nodes 108.

In some examples, one of the nodes 108 (e.g., Node 2 in FIG. 1) is designated as a "leader" node. The leader node includes a global transaction manager 116 which is responsible for assigning transaction identifiers to new transactions, assigning commit identifiers to transactions, and for coordinating commit operations among the various nodes 108 in the distributed database system 102. In some examples, the global transaction manager 116 also maintains a record of all transactions that are currently active in the distributed database system 102. In some examples, each record of an active transaction includes a transaction identifier for the transaction (e.g., a start time of the transaction), a commit identifier for the transaction (e.g., a time that the transaction was committed), a list of nodes on which the transaction is operating, and a state of the transaction (e.g., ACTIVE, PREPARING, COMMITTED, or ABORTING).

1.1 Database Transactions

In general, each database transaction that operates in the distributed database system 102 is associated with a time interval that represents a lifetime of the transaction. To establish the time interval, when a transaction, T operating on the database begins, a transaction identifier is assigned to T. The transaction identifier is a globally distinct number that identifies the transaction in the distributed database system 102 and specifies a start time (i.e., the beginning of the time interval) for the transaction. In some examples, to achieve such an identifier, the transaction identifiers are generated as a monotonically-increasing sequence of numbers which convey a notion of time. For example, a first transaction, T[10] with a transaction identifier "10" and a second transaction, T[20] with a transaction identifier "20," one can discern that T[10] started before T[20] started since the transaction identifier for T[10] comes before the transaction identifier for T[20].

At a time when a transaction is prepared to commit, the transaction is assigned a commit identifier which specifies an end time for the transaction (i.e., the end of the time interval). The commit identifier originates from the same sequence of numbers as the transaction identifiers and also conveys a notion of time.

In some examples, the notation T[a, b] is used to represent a transaction with lifetime spanning a time from a to b. The transaction identifier a is always less than the commit identifier b. A currently active transaction (i.e., a transaction that has not committed) can be represented as T[a,FUTURE] where setting b=FUTURE implies that the transaction will end at some unknown time in the FUTURE. In some examples, a currently active transaction is represented using a shorthand representation T[a], where b=FUTURE is implied.

The time intervals associated with transactions can provide information about the relationship between the transactions. For example, examining the time intervals for a first transaction, T[10,15] and a second transaction, T[16,20] provides the information that the two transactions executed serially with the second transaction starting after the first transaction finished. Examining the time intervals for a third transaction, T[10,20] and a fourth transaction, T[15,25] provides the information that the two transactions executed concurrently. It is noted that in the instant application, two transactions are considered to be concurrently executing when the respective lifetimes of the two transactions overlap. The lifetime of a transaction starts at a time associated with the transaction identifier, includes time during which the transaction is actively executing to perform useful work, includes time for a validation phase (e.g., the JOIN, PREPARE, and COMMIT messages/phases associated with the transaction), and ends at a time associated with the commit identifier, after which the transaction is considered to be completed. One or both of two concurrent transactions may in a suspended (or "sleep") state in which they are not actively executing to perform useful work, for any portion of their lifetimes, and those transactions are still considered to be concurrently executing due to their overlapping lifetimes.

In some examples, when a new transaction arrives at the distributed database system 102, the transaction undergoes a process referred to as "joining." To join, the transaction requests access to data on a node, where the node has no prior record of the transaction. Upon receiving the request, the node sends a 'join' message to the global transaction manager 116 on the leader node, the message including the name of the node (e.g., Node 1). When the global transaction manager 116 receives the message, the node is registered as a participant in the transaction.

The global transaction manager 116 then sends a reply to the node 108 with a transaction identifier for the transaction, a "low water mark" for the transaction, and a list of "completing transaction identifiers" for the transaction. Very generally, the low water mark for a transaction is the transaction identifier for an oldest active transaction in the distributed database system 102 at the time that the transaction started. The list of completing transaction identifiers is a list of transactions that were in the process of preparing when the transaction started. The low water mark and the list of completing transaction identifiers are described in greater detail below.

1.2 Data Element Versioning

In some examples, the database, D is implemented using a snapshot isolation technique, which is a specific form of multi-version concurrency control (MVCC). In such a database, a number of versions may exist for one or more of the data elements in the database. Each version of the data element has a unique identifier such that the different versions of the data element can be distinguished from one another. In some examples, for each version of a data element, the unique identifier for the version corresponds to the transaction identifier of the transaction that wrote the version to the database. That is, each time a transaction writes a new version of a data element to the database, the transaction identifier for the transaction writing the new version is assigned as the identifier for the new version. For example, a data element named x may have a number of versions including x[25], x[37], and x[53] that were written by transactions T[25, 30], T[37,42], and T[53,59], respectively.

1.3 Data Visibility

The versioning techniques described above can be used by the nodes 108 of the distributed database system 102 to determine what versions of a data element a transaction is allowed to access and to identify transactions whose operations conflict. When transactions with conflicting operations are identified, one of the transactions may be forced to abort. To this end, in some examples, nodes 108 of the distributed database system 102 abide by the following rules when a transaction tries access one or more data elements:

1) Given a data element x, where x[m] is a version of x that was written by transaction T[m], when a transaction T[i] attempts to read x, T[i] can read the most recent version of x that was committed before T[i] started. That is, T[i] is able to read x[j], where j is the largest transaction identifier less than i, such that T[j] wrote x, and T[j] committed before T[i] started.

2) Given a data element x, where x[i] is a version of x that was written by transaction T[i], T[i] can commit if there is no transaction T[j], such that T[j] wrote x, T[j] was concurrent with T[i], and T[j] committed first.

In general, the above rules provide a high degree of isolation between concurrent transactions. In particular, the first rule prevents dirty reads (i.e., reading of an uncommitted version of a data element) and the second rule prevents unintended overwrites of data. Neither of the rules requires blocking or waiting.

1.4 Two-Stage Commit Procedure

Due to the distributed nature of the distributed database system 102, there is an intrinsic delay between the sending and receiving of messages over the communication network 106 and the order in which network messages are received and processed at nodes 108 may differ from the order in which they were sent. Due to this intrinsic delay, ensuring atomicity (from the client's perspective) is a complex operation. To ensure atomicity from the client's perspective, the distributed database system 102 uses a two-phase commit procedure to coordinate commit operations among the nodes 108 of the distributed database system 102.

In the two-phase commit procedure, transactions operating on the distributed database system 102 can be in an ACTIVE state, a PREPARING (or PREPARED) state, a COMMITTING (or COMMITTED) state, or an ABORTING (or ABORTED) state. During the PREPARE phase, each node participating in the transaction performs a validation procedure to decide whether the transaction can commit. If all partitions agree (in the affirmative) that the transaction can commit, then the transaction commits. Otherwise, the transaction aborts.

1.5 Distributed Database Write

Figure 2:
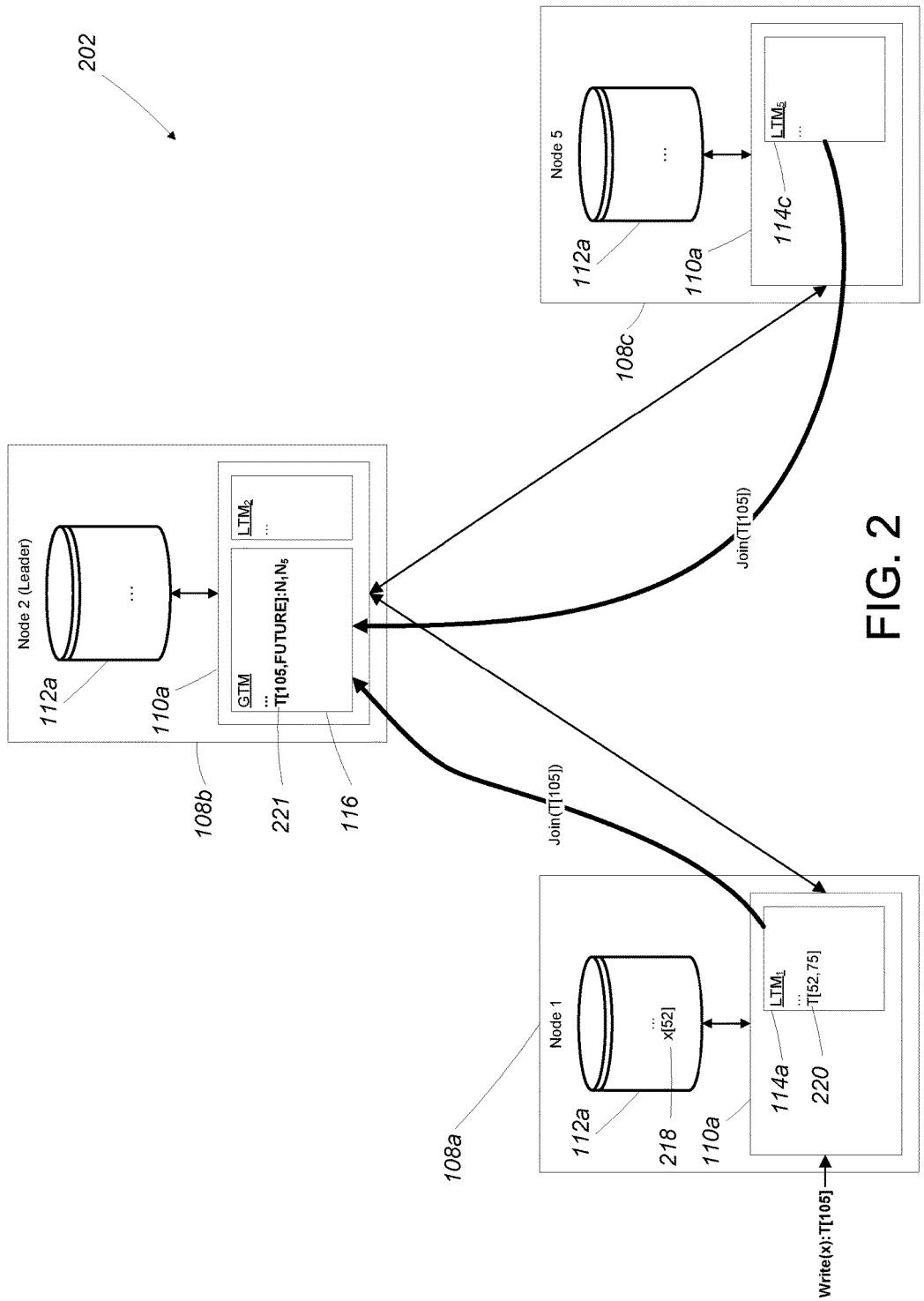
FIG. 2 is a block diagram showing a transaction including a write operation joining a distributed database system.

In FIGS. 2-6, one example of a transaction that writes a new version of a data element and successfully commits using the two-stage commit protocol is illustrated. Referring to FIG. 2, a portion of a distributed database system 202 includes a first node 108a, a second node 108b, and a fifth node 108c. (Note that the labeling of nodes as "first" or "second" etc. for a given example does not prevent the changing of those labels, as appropriate, in other examples.) The second node is 108b is designated as the leader node for the distributed database system 202. A first transaction T[52, 75] has previously completed on the first node 108a, resulting in a version of a data element, x[52] 218 being written to a first database fragment 112a on the first node 108a. A first local record 220 of the first transaction is stored in a first local transaction manager 114a of the first node 108a.

Figure 3:
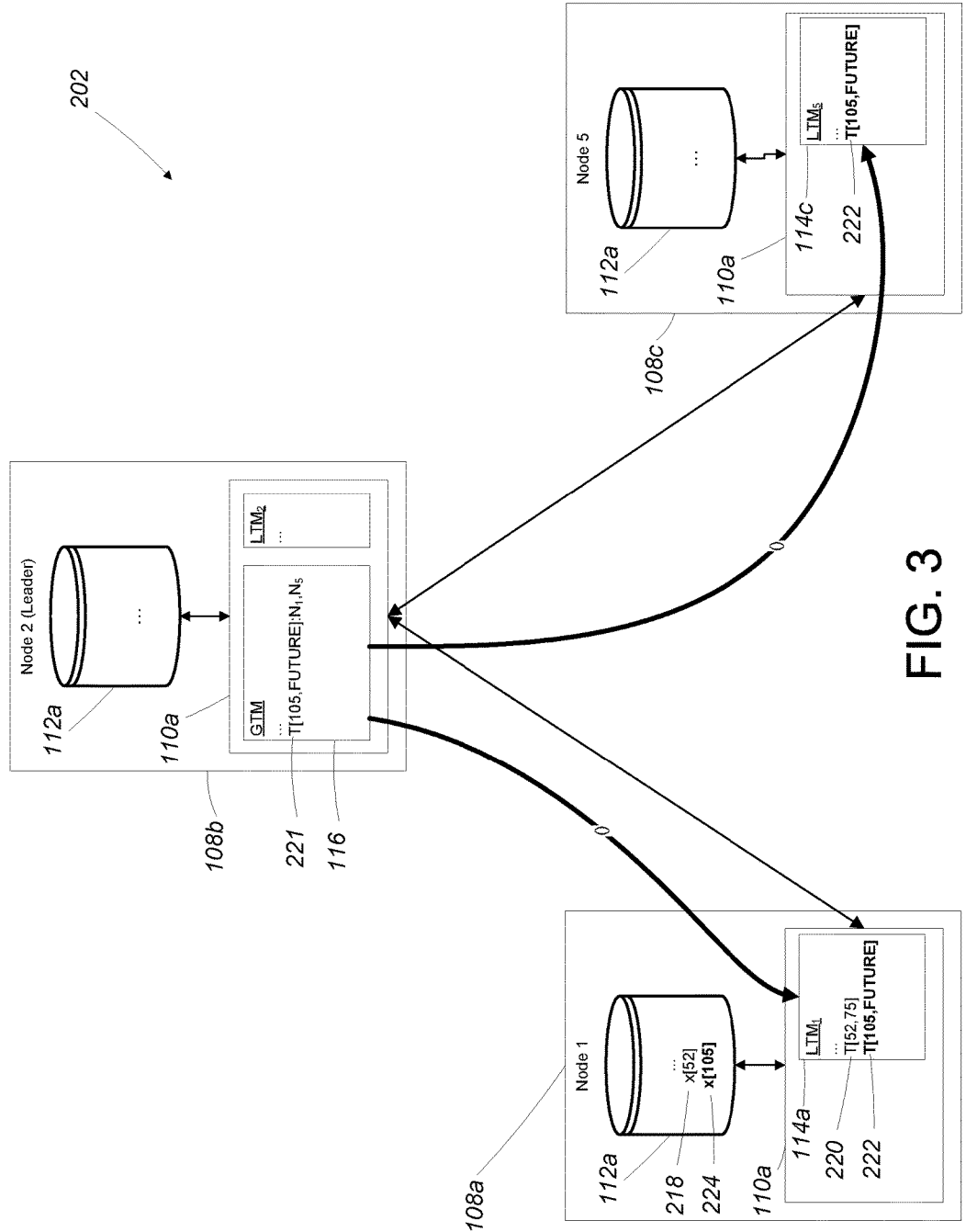
FIG. 3 is a block diagram showing the transaction of FIG. 2 executing its operations on the distributed database.

A second transaction is initiated at the distributed database system 202 when a client sends a Begin Transaction message (not shown) to the global transaction manager 116. The global transaction manager 116 creates a global record 221 for the second transaction: T[105,FUTURE] and responds to the client with a Started T[105] message (not shown). The client then issues a Write(x) command for transaction T[105] at the first node 108a and one or more other commands for transaction T[105] (not shown) at the fifth node 108c. Since the second transaction is new to the first node 108a and the fifth node 108c, the first node 108a and the fifth node 108c each send a Join(T[105]) message for the second transaction to the global transaction manager 116 of the leader node (i.e., the second node 108b). The global transaction manager 116 updates the global record 221 to reflect that the first node 108a and the fifth node 108c have joined the transaction: T[105,FUTURE]: $N_1N_5$. The global record 221 indicates that a transaction with the transaction identifier 105 is currently active (i.e., the commit identifier of the global record 221 is FUTURE) and is operating on the first node 108a and the fifth node 108c. Referring to FIG. 3, the global transaction manager 116 sends an empty "list of completing transaction identifiers" (i.e., ( ), described in greater detail below) for T[105] back to the local transaction managers 114a, 114c of the first and fifth nodes 108a, 108c. The local transaction managers 114a, 114c of the first and fifth nodes 108a, 108c each create a second local record 222 for the second transaction: T[105,FUTURE]. The first node 108a proceeds in executing the Write(x) command, resulting in a second version of x, x[105]224 being written to the first database fragment 112a. Though not shown in the figure, fifth node 108c also proceeds in executing commands for the second transaction.

Figure 4:
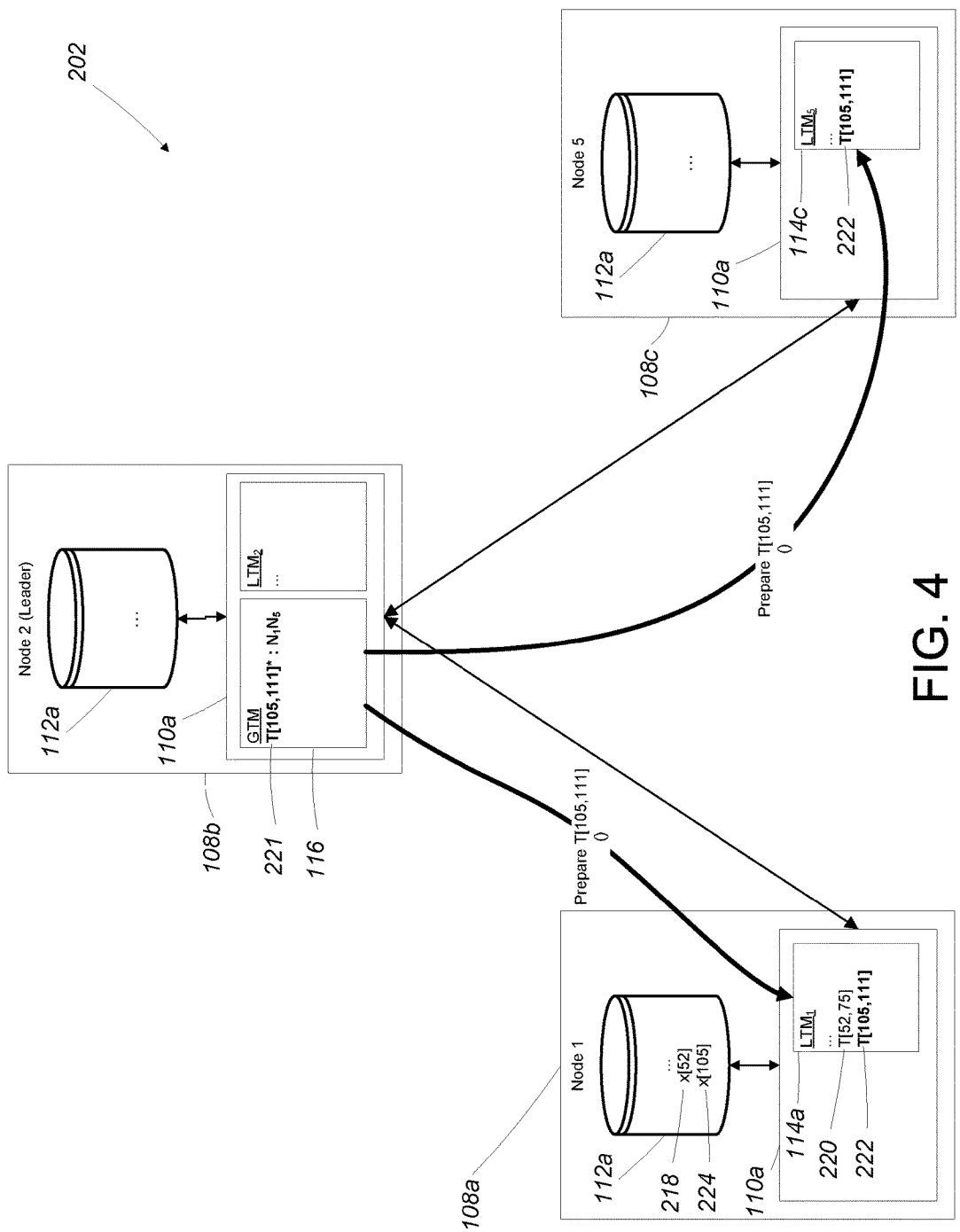
FIG. 4 is a block diagram showing the transaction of FIG. 2 receiving prepare messages from a leader node.

Referring to FIG. 4, once the commands of the second transaction have completed, the client initiates the commit sequence for the second transaction by sending an End Transaction message (not shown) to the global transaction manager 116 which in turn generates a commit identifier (i.e., 111) for the second transaction and updates the global record 221 for the second transaction to include the commit identifier. The global transaction manager 116 also marks the global record 221 for the second transaction (shown as an asterisk in FIG. 4) as being in the PREPARE state, resulting in an updated version of the global record 221: T[105,111]*: $N_1N_5$. The global transaction manager 116 sends a Prepare (T[105,111]) message including an empty list of completing transaction identifiers (i.e., ( )) to the local transaction managers 114a, 114c of the first and fifth nodes 108a, 108c. In response to receiving the Prepare(T[105,111]) message from the global transaction manager 116, the local transaction managers 114a, 114c the first and fifth nodes 108a, 108c update their local records for the second transaction to T[105,111] and determine whether they are prepared to commit the second transaction.

Figure 5:
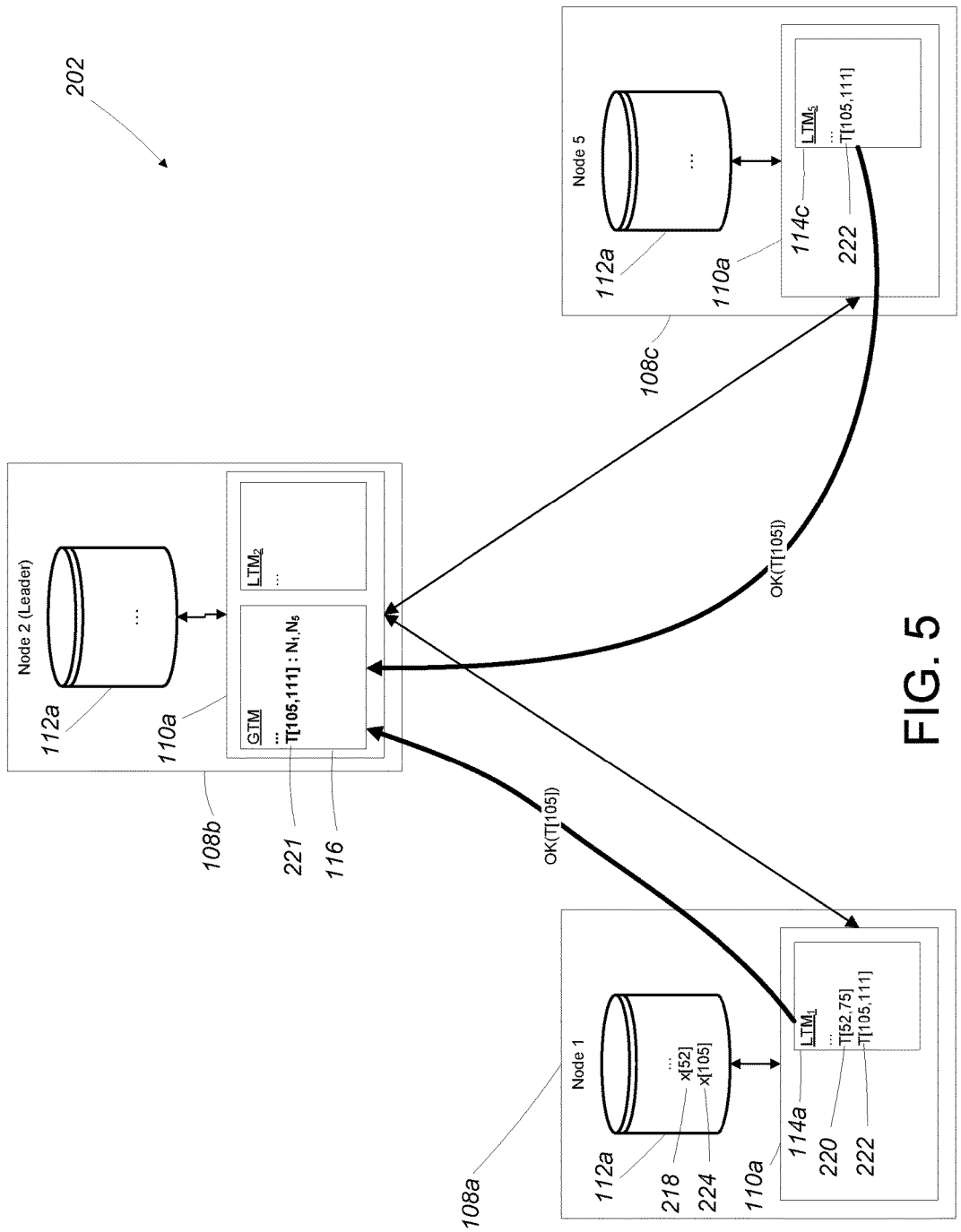
FIG. 5 is a block diagram showing the transaction of FIG. 2 sending OK messages to the leader node.
Figure 6:
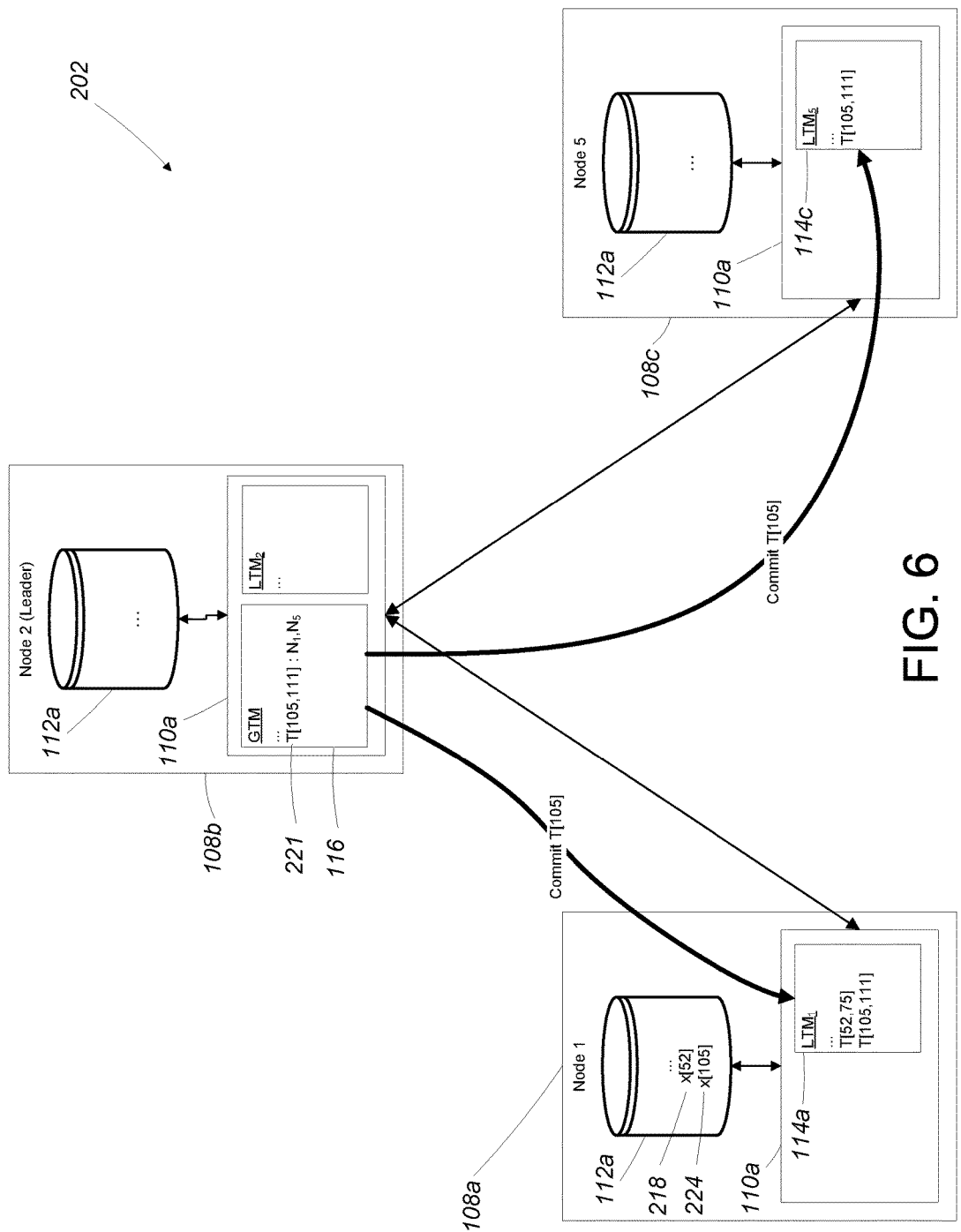
FIG. 6 is a block diagram showing the transaction of FIG. 2 receiving commit messages from the leader node.

Referring to FIG. 5, the local transaction managers 114a, 114c of the first and fifth nodes 108a, 108c both respond to the global transaction manager 116 with an OK(T[105]) message indicating that both of the nodes 108a, 108c are prepared to commit the second transaction. Referring to FIG. 6, in response to receiving the OK(T[105]) messages from the local transaction managers 114a, 114c of the first and fifth nodes 108a, 108c, the global transaction manager 116 sends a Commit(T[105]) message to the local transaction managers 114a, 114c of the first and fifth nodes 108a, 108c, causing the second transaction to commit, including committing the newly written version of x, x[105].

1.6 Distributed Database Read

Figure 7:
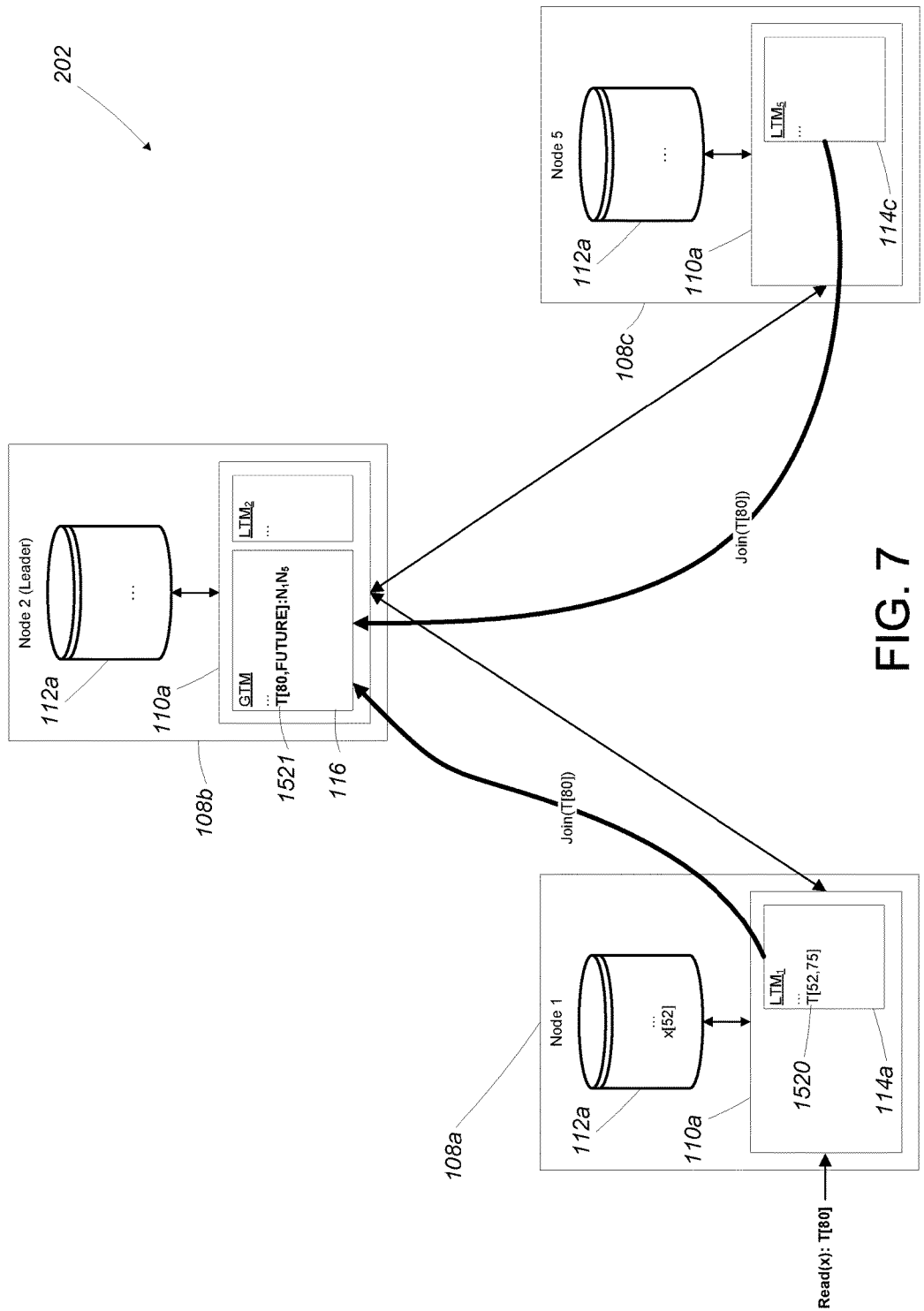
FIG. 7 is a block diagram showing a transaction including a read operation joining a distributed database system.

In FIGS. 7-11, one example of a transaction that reads a version of a data element and commits using the two-stage commit protocol is illustrated. Referring to FIG. 7, a portion of a distributed database system 202 includes a first node 108a, a second node 108b, and a fifth node 108c. The second node is 108b is designated as the leader node for the distributed database system 202. A first transaction T[52, 75] has previously completed on the first node 108a, resulting in a version of a data element x, x[52] 1518 being written to a first database fragment 112a on the first node 108a. A first local record 1520 of the first transaction is stored in a first local transaction manager 114a of the first node 108a.

A second transaction is initiated at the distributed database system 202 when a client sends a Begin Transaction message (not shown) to the global transaction manager 116.

The global transaction manager creates a global record 1521 for the second transaction: T[80,FUTURE] and responds to the client with a Started T[80] message (not shown). The client then issues a Read(x) command for the transaction T[80] at the first node 108a and one or more other commands for the transaction T[80] (not shown) at the fifth node 108c. Since the second transaction is new to the first node 108a and the fifth node 108c, the first node 108a and the fifth node 108c each send a Join(T[80]) message for the second transaction to the global transaction manager 116 of the leader node (i.e., the second node 108b). The global transaction manager 116 updates the global record 1521 for the second transaction to reflect that the first node 108a and the fifth node 108c have joined the transaction: T[80,FUTURE]: $N_1N_5$. The global record 1521 indicates that a transaction with the transaction identifier 80 is currently active (i.e., the commit identifier of the global record 1521 is FUTURE) and is operating on the first node 108a and the fifth node 108c.

Figure 8:
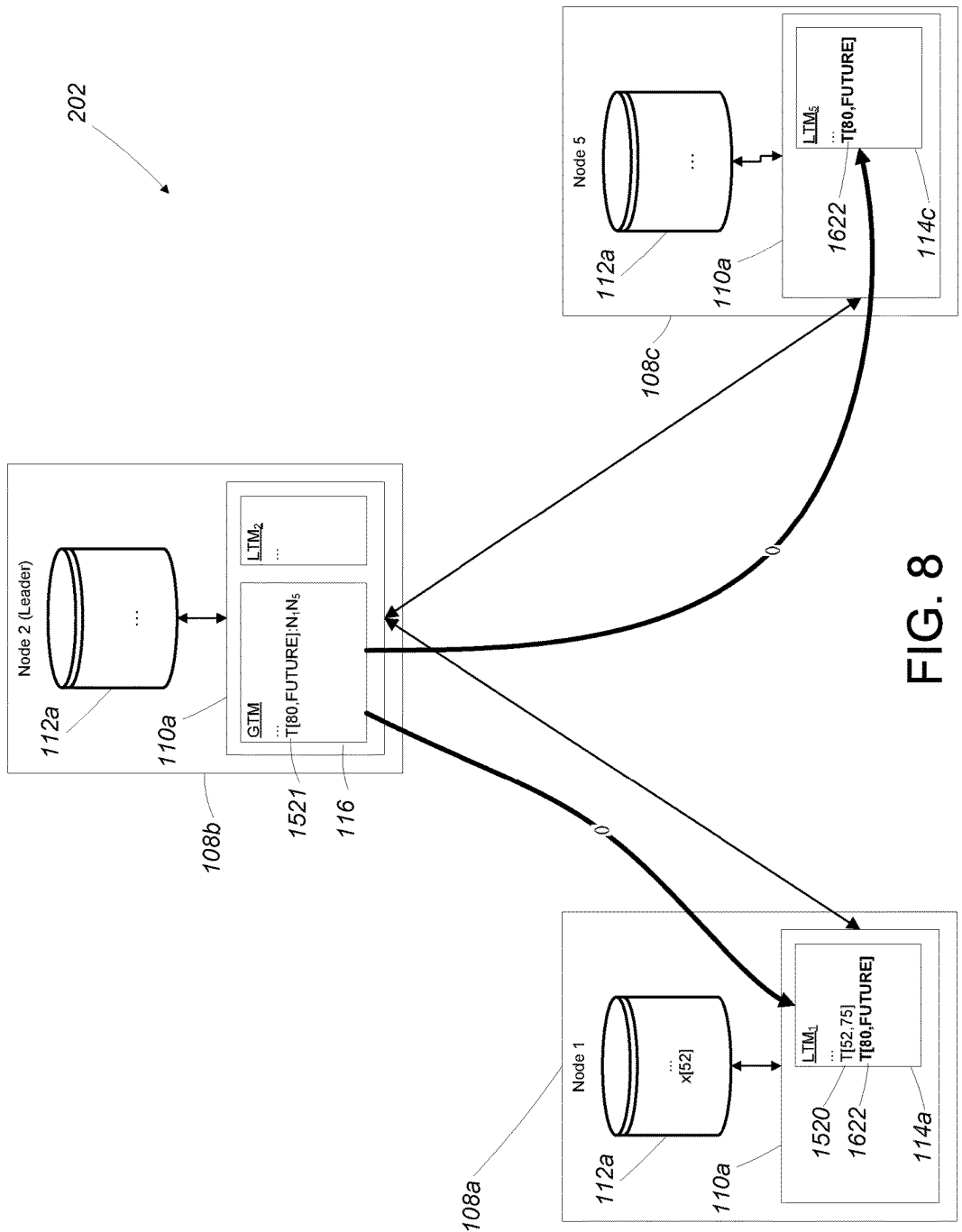
FIG. 8 is a block diagram showing the transaction of FIG. 7 executing its operations on the distributed database.

Referring to FIG. 8, the global transaction manager 116 sends the a list of completing transaction identifiers (i.e., ( ), which is empty in this case) for T[80] back to the local transaction managers 114a, 114c of the first and fifth nodes 108a, 108c. The local transaction managers 114a, 114c of the first and fifth nodes 108a, 108c each create a second local record 1622 for the second transaction: T[80,FUTURE]. The first node 108a proceeds in executing the Read(x) command, resulting in x[52] being read from the first database fragment 112a. Though not shown in the figure, fifth node 108c also proceeds in executing commands for the second transaction.

Figure 9:
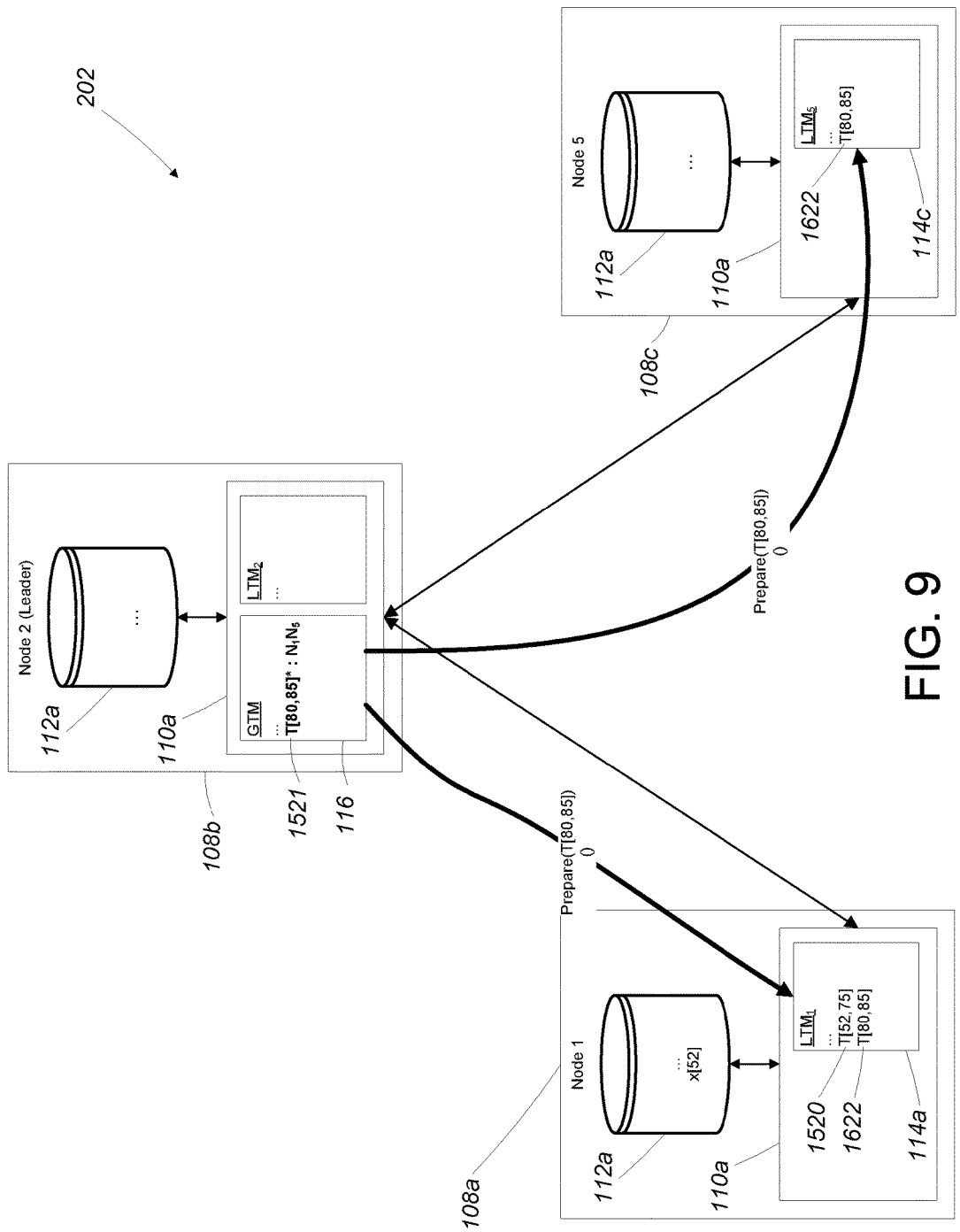
FIG. 9 is a block diagram showing the transaction of FIG. 7 receiving prepare messages from a leader node.

Referring to FIG. 9, once the commands of the second transaction have completed, the client initiates the commit sequence for the second transaction by sending an End Transaction message (not shown) to the global transaction manager 116 which in turn generates a commit identifier (i.e., 85) for the second transaction and updates the global record 1521 for the second transaction to include the commit identifier. The global transaction manager 116 also marks the global record 1521 for the second transaction (shown as an asterisk in FIG. 9) as being in the PREPARE state, resulting in an updated version of the global record 1521: T[80,85]*: $N_1N_5$. The global transaction manager 116 sends a Prepare (T[80,85]) message including an empty list of completing transaction identifiers (i.e., ( )) to the local transaction managers 114a, 114c of the first and fifth nodes 108a, 108c. In response to receiving the Prepare (T[80,85]) message from the global transaction manager 116, the local transaction managers 114a, 114c the first and fifth nodes 108a, 108c each update the second local record 1622 for the second transaction to T[80, 85] and determine whether they are prepared to commit the second transaction.

Figure 10:
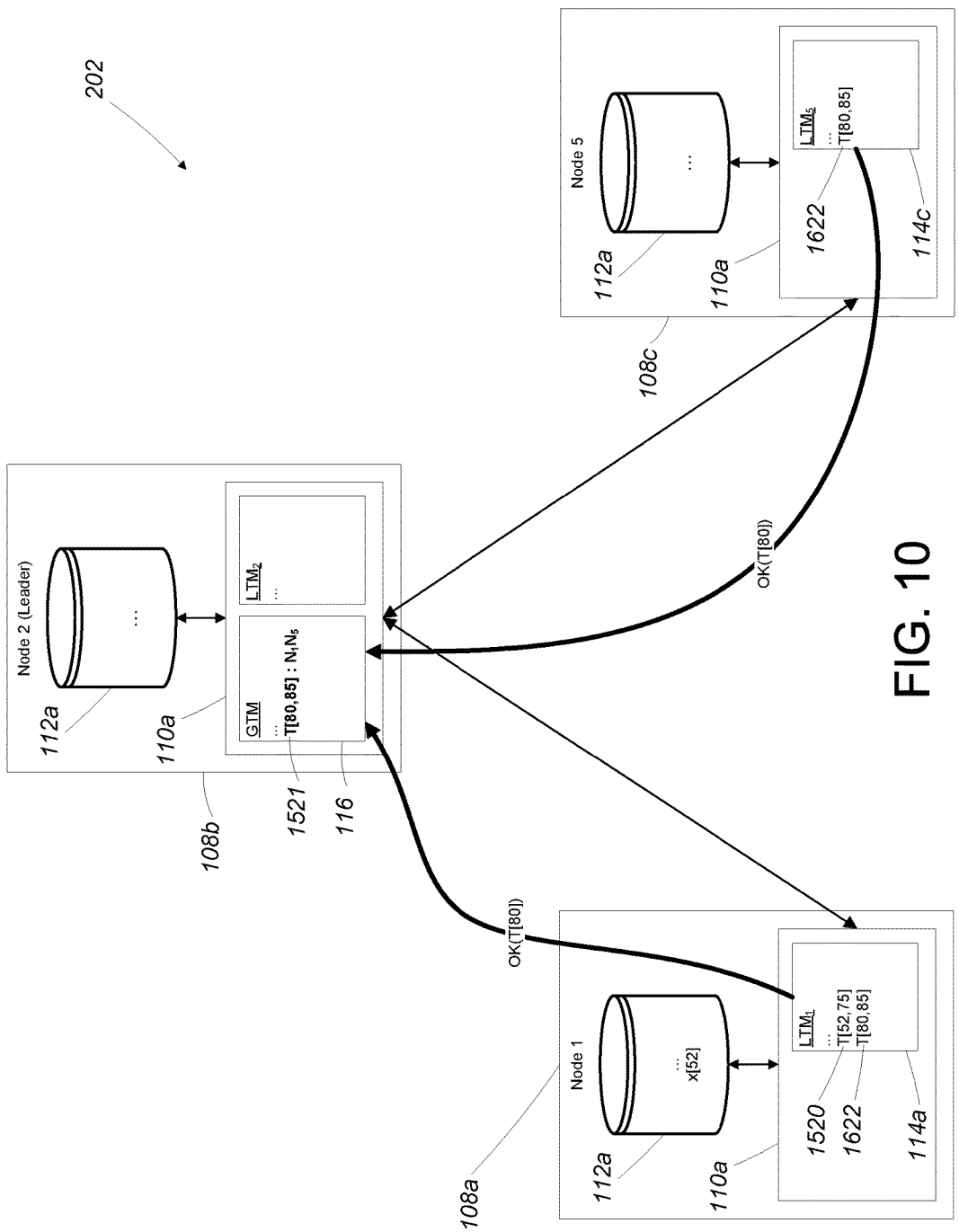
FIG. 10 is a block diagram showing the transaction of FIG. 7 sending OK messages to the leader node.
Figure 11:
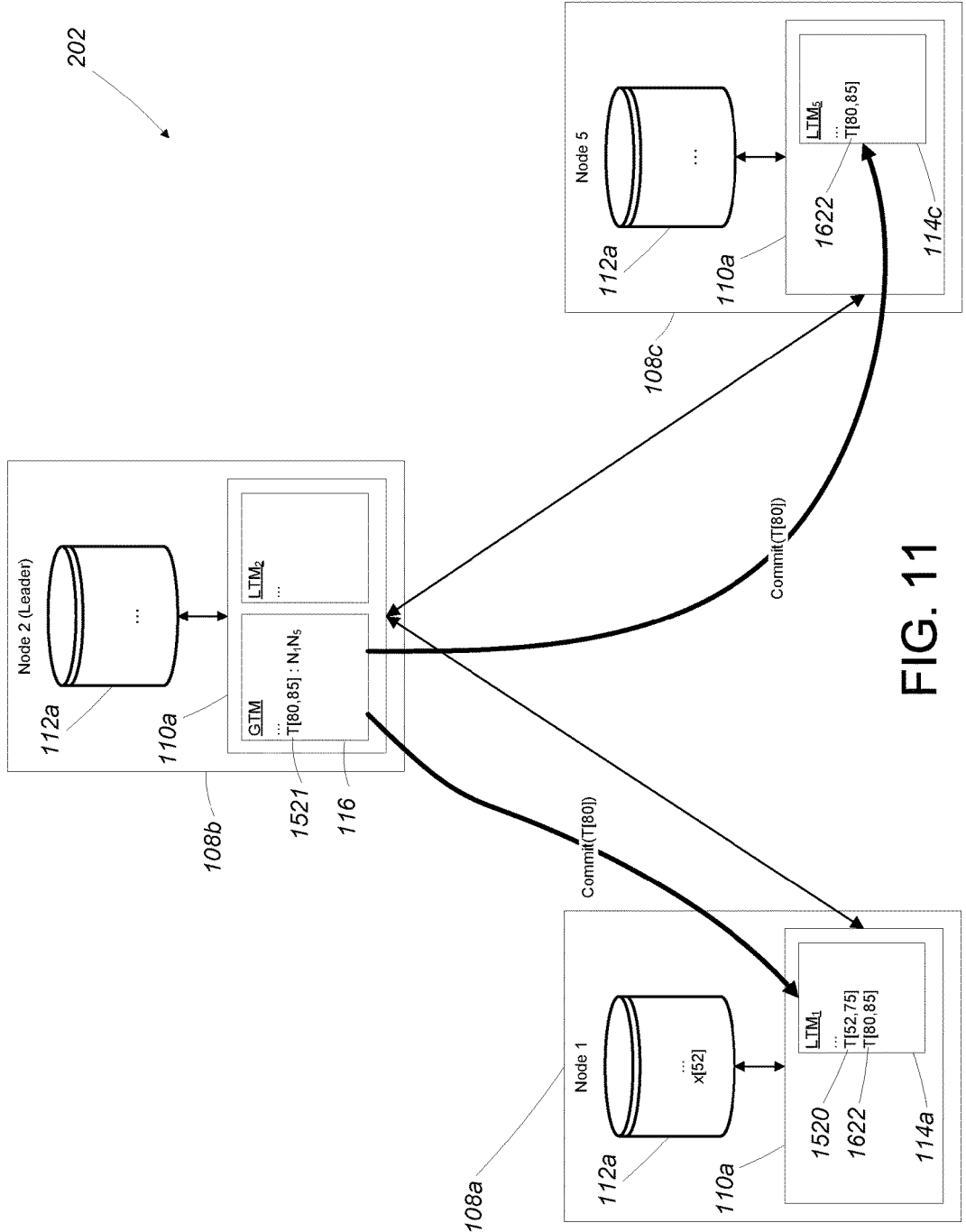
FIG. 11 is a block diagram showing the transaction of FIG. 7 receiving commit messages from the leader node.

Referring to FIG. 10, the local transaction managers 114a, 114c of the first and fifth nodes 108a, 108c both respond to the global transaction manager 116 with an OK(T[80]) message indicating that both of the nodes 108a, 108c are prepared to commit the second transaction. Referring to FIG. 11, in response to receiving the OK(T[80]) messages from the local transaction managers 114a, 114c of the first and fifth nodes 108a, 108c, the global transaction manager 116 sends a Commit(T[80]) message to the local transaction managers 114a, 114c of the first and fifth nodes 108a, 108c, causing the second transaction to commit.

1.7 Optimized Distributed Database Operations

In the exemplary distributed database transactions described above, both read and write operations are executed on the distributed database without encountering any complications in the two-stage commit procedure. However, in some examples, when one or more transactions are in their PREPARE phases, ambiguities can occur and lead to inefficient operation in the distributed database system 102.

As is described in greater detail below, these ambiguities are mitigated using the local transaction manager 114 which maintains a record of each transaction that executed on its node 108. Each record of a transaction stored by the local transaction manager includes the transaction's lifetime, T[i, k] (with k=FUTURE for transaction that's still active). The records maintained by the local transaction manager can be used to resolve certain conflicts that result from the ambiguities.

1.7.1 Optimized Distributed Database Write

In some examples, when a first transaction and a second transaction have both written a different version of a data element and are both in the PREPARE phase with the second transaction's transaction identifier being greater than the transaction identifier for the first transaction and less than commit identifier for the first transaction, an ambiguity can cause an inefficiency to occur. In particular, the second transaction has no way of knowing whether or not it should abort its write operation since it is not known whether the first transaction will commit or abort. This may result in the second transaction prematurely aborting.

Figure 12:
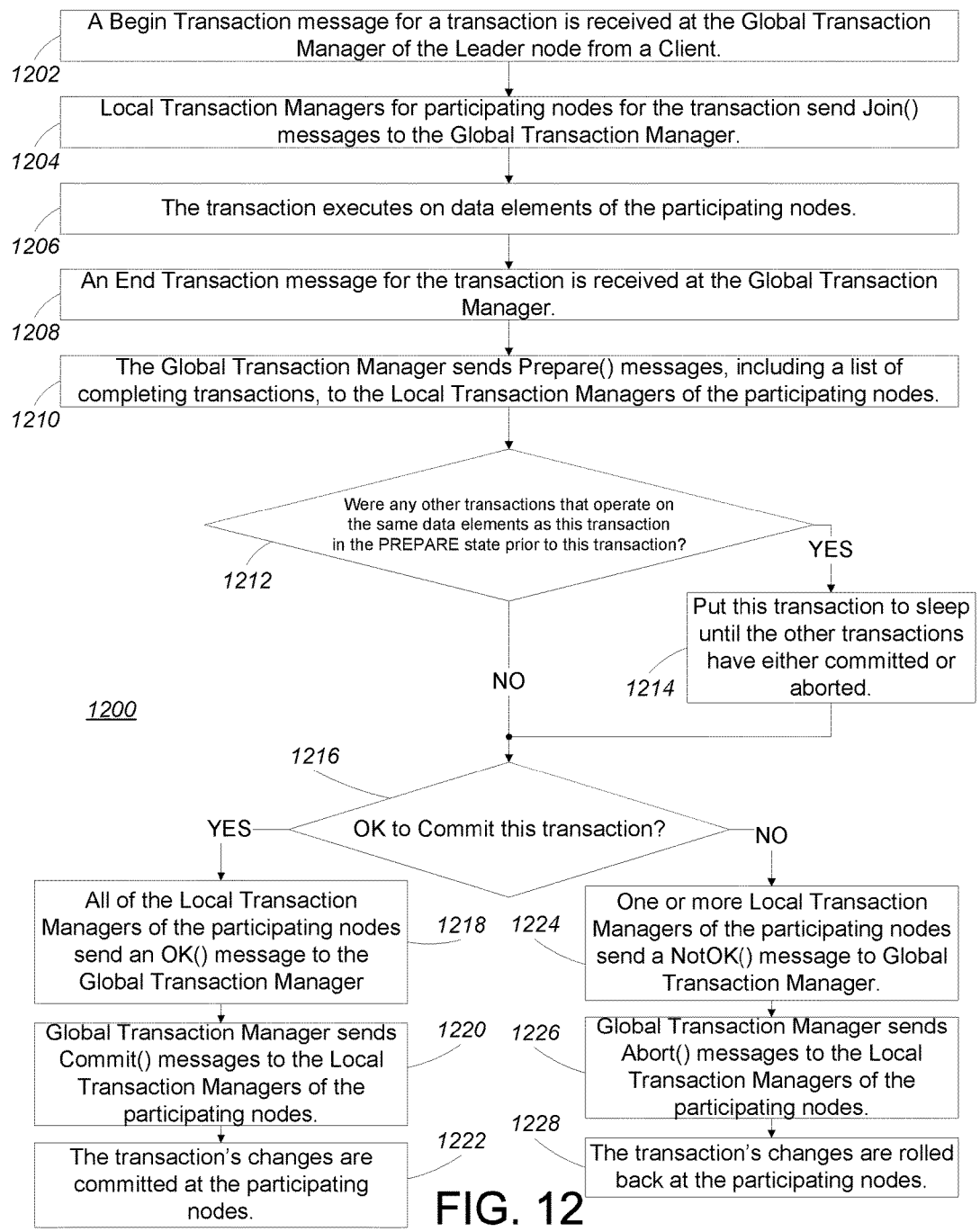
FIG. 12 is a flow chart showing steps of an optimized distributed database write algorithm.

Referring to FIG. 12, to avoid such a situation from occurring, an optimized database write algorithm 1200 is used. In a first step 1202 of the optimized database write algorithm 1200 a Begin Transaction message for a transaction including a database write operation (possibly among other operations) is received at the Global Transaction Manager of the Leader node. In a second step 1204, the Local Transaction Managers of the nodes of the database system that will participate in the database write operation send Join( ) messages to the Global Transaction Manager. In a third step 1206, the transaction executes on data elements stored at the nodes participating in the transaction. In a fourth step 1208, upon completion of execution of the transaction, and End Transaction message is received at the Global Transaction Manager. In a fifth step 1210, the Global Transaction Manager sends Prepare( ) messages, including a list of completing transactions, to the Local Transaction Managers of the participating nodes.

In a sixth step 1212, the Local Transaction Managers of the participating nodes compare the list of completing transactions to records of transactions that they currently manage to determine whether any other transactions that operate on the same data elements as the transaction were put into the PREPARE state prior to the transaction being put into the prepare state. If such prior transactions do exist, then the algorithm proceeds to a seventh step 1214 in which the Local Transaction Managers causes the transaction to sleep (i.e., to be placed into a SUSPENDED state by the Local Transaction Managers) until the prior transactions complete. Suspending the transaction in this manner delays the decision of whether to abort the transaction until the outcome of the prior transactions is known.

If no such prior transactions exist or when the transaction awakens, the algorithm proceeds to an eighth step 1216 where the Local Transaction Managers determine whether the transaction can be committed.

If the transaction can be committed, the algorithm proceeds to a ninth step 1218 wherein all of the Local Transaction Managers of the participating nodes send an OK( ) message to the Global Transaction Manager. In a subsequent, tenth step 1220, the Global Transaction Manager sends Commit( ) messages to the Local Transaction Managers of the participating nodes. Finally, in an eleventh step 1222, the transaction's changes are committed at the participating nodes.

If the transaction can not be committed, the algorithm proceeds to a twelfth step 1224 in which one or more of the Local Transaction Managers of the participating nodes send a NotOK( ) message to the Global Transaction Manager. In a subsequent, thirteenth step 1226, the Global Transaction Manager sends Abort( ) messages to the participating nodes. Finally, in a fourteenth step 1228, the transaction's changes are rolled back at the participating nodes.

Figure 13:
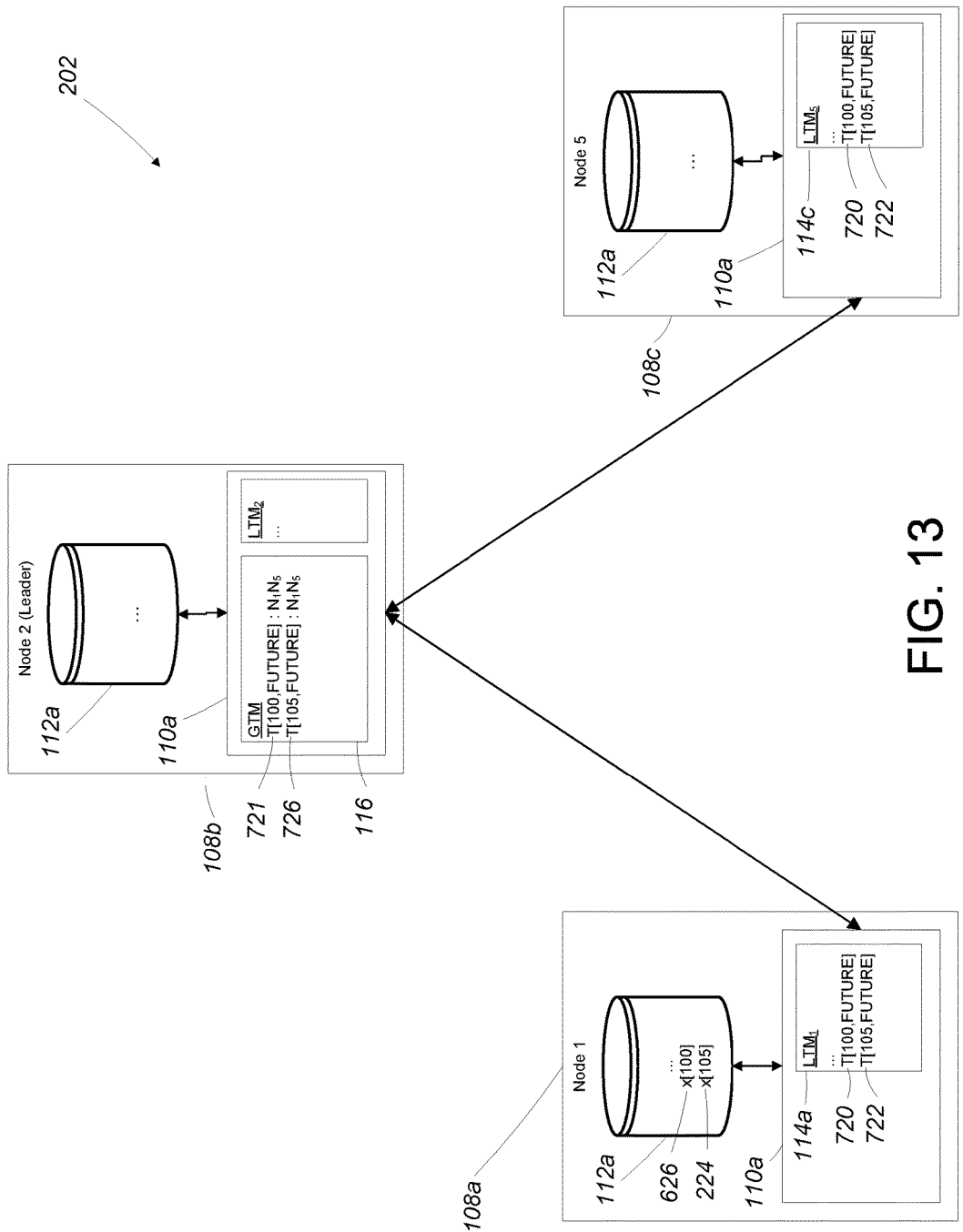
FIG. 13 is a block diagram showing a first transaction and a second transaction active in a distributed database system.

The following example illustrates an application of steps 1210-1228 of the algorithm of FIG. 12. Referring to FIG. 13, a portion of a distributed database system 202 includes a first node 108a, a second node 108b, and a fifth node 108c. The second node is 108b is designated as the leader node for the distributed database system 202. A first transaction, T[100, FUTURE] has written a first new version of a data element x, x[100]626 to a first database fragment 112a on the first node 108a and has performed one or more other operations (not shown) on the fifth node 108c. A second transaction, T[105, FUTURE] has written a second new version of the data element x, x[105]224 to the first database fragment 112a on the first node 108a and has performed one or more other operations (not shown) on the fifth node 108c. The global transaction manager 116 includes a first global record 721 for the first transaction: T[100, FUTURE]: $N_1N_5$. The first global record 721 indicates that the first transaction has a transaction identifier 100 and is currently active on the first node 108a and the fifth node 108c. The global transaction manager 116 also includes a second global record 726 for the second transaction: T[105, FUTURE]: $N_1N_5$. The second global record 726 indicates that the second transaction has a transaction identifier 105 and is currently active on the first node 108a and the fifth node 108c. Both a first local record, T[100,FUTURE] 720 of the first transaction and a second local record, T[105, FUTURE] 722 of the second transaction are stored in the local transaction managers 114a, 114c of the first and fifth node 108a, 108c.

Figure 14:
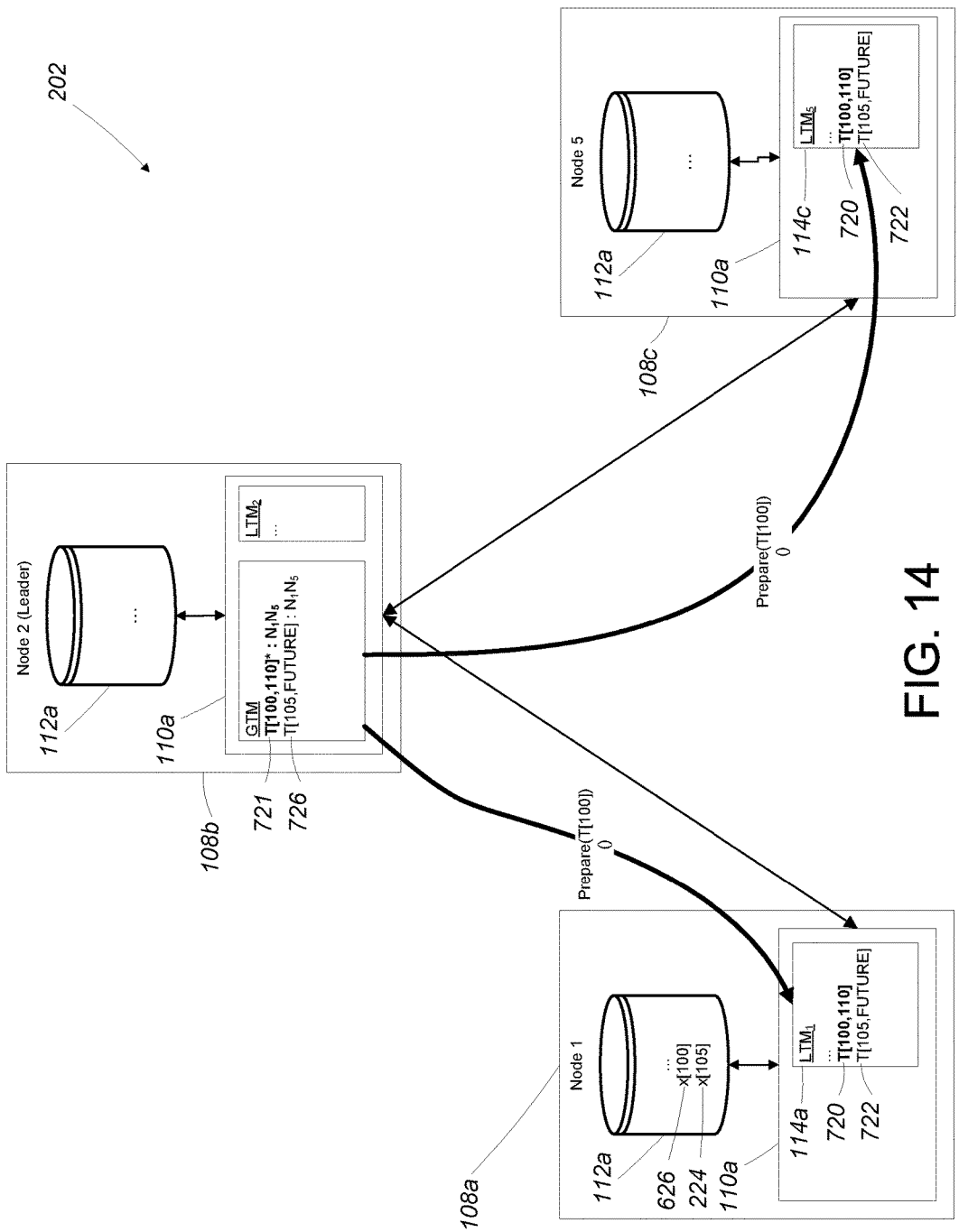
FIG. 14 is a block diagram showing the first transaction receiving prepare messages from a leader node in the distributed database system of FIG. 12.

Referring to FIG. 14, once the commands of the first transaction have completed, a client initiates the commit sequence for the second first transaction by sending an End Transaction message (not shown) to the global transaction manager 116 which in turn generates a commit identifier (i.e., 110) for the first transaction and updates the first global record 721 for the first transaction to include the commit identifier. The global transaction manager 116 also marks the first global record 721 for the first transaction as being in the PREPARE state (shown as an asterisk in FIG. 14), resulting in an updated version of the first global record 721: T[100, 110]*: $N_1N_5$. The global transaction manager 116 sends a Prepare(T[100,110]) message including an empty list of completing transaction identifiers (i.e., ( ) to the local transaction managers 114a, 114c of the first and fifth nodes 108a, 108c. In response to receiving the Prepare(T[100, 110]) message from the global transaction manager 116, the local transaction managers 114a, 114c of the first and fifth nodes 108a, 108c each update the first local record 720 for the first transaction to T[100,110] and begin determining whether they are prepared to commit the first transaction.

Figure 15:
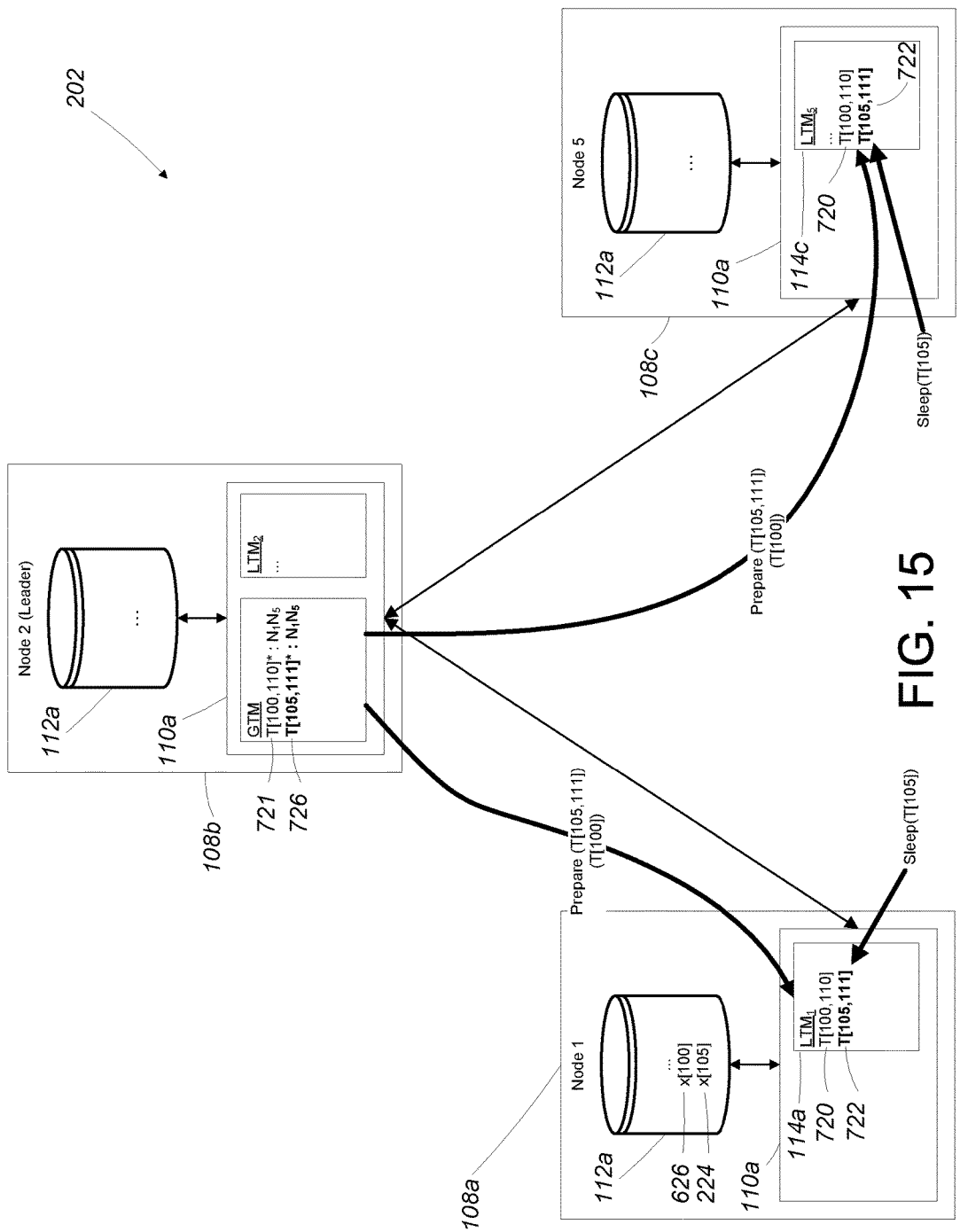
FIG. 15 is a block diagram showing the second transaction of FIG. 14 receiving prepare messages, including a list of completing transaction identifiers, from a leader node and sleeping until the first transaction completes.

Referring to FIG. 15, once the commands of the second transaction have completed, a client initiates the commit sequence for the second transaction by sending an End Transaction message (not shown) to the global transaction manager 116 which in turn generates a commit identifier (i.e., 111) for the second transaction and updates the second global record 726 for the second transaction to include the commit identifier. The global transaction manager 116 also marks the second global record 726 for the second transaction as being in the PREPARE state (shown as an asterisk in FIG. 15), resulting in an updated version of the second global record 726: T[105,111]*: $N_1N_5$. The global transaction manager 116 sends a Prepare(T[105,111]) message to the local transaction managers 114a, 114c of the first and fifth nodes 108a, 108c. Along with the Prepare(T[105,111]) message, the global transaction manager 116 sends a list of "completing transaction identifiers." In this example, the list of completing transaction identifiers includes T[100] since T[100] is a completing transaction (i.e., T[100] was in the PREPARE state prior to the Prepare(T[105,111]) message being sent by the global transaction manager 116).

In response to receiving the Prepare(T[105,111]) message from the global transaction manager 116, the local transaction managers 114a, 114c the first and fifth nodes 108a, 108c each update the second local record 722 for the second transaction to T[105,111] and begin determining whether they are prepared to commit the second transaction.

At the instant in time shown in FIG. 15, the distributed database system 102 needs to determine whether the second transaction can safely commit. In one simple method of doing so, the distributed database system 102 can compare the commit identifier of the first transaction and the commit identifier of the second transaction to determine which transaction has the earliest commit identifier. The transaction with the later of the two commit identifiers is aborted. In the example of FIG. 15, the second transaction would abort using this simple method. However, the first transaction is in the PREPARE state and has not yet committed. Indeed, the first transaction may abort. If the first transaction aborts, then the simple method above would have an inefficient and undesirable result where both transactions abort.

To avoid such an inefficient and undesirable result, another method which utilizes the list of completing transaction identifiers is used to determine whether the second transaction can safely commit. In particular, when the second transaction is in the PREPARE phase, the list of completing transaction identifiers is consulted to determine whether there are any completing transactions that are accessing the same data element(s) as the second transaction and that have a transaction identifier that is less than the transaction identifier of the second transaction. In this case, the first transaction (which is included in the list of completing transaction identifiers) is in the PREPARING state, is accessing the same data element as the second transaction (i.e., x), and has a transaction identifier (i.e., 100) that is less than the transaction identifier (i.e., 105) of the second transaction. Since local transaction manager 114 has no way of knowing whether the first transaction will successfully commit or abort, the local transaction manager 114 causes the second transaction to be suspended until the first transaction has either committed or aborted.

Figure 16:
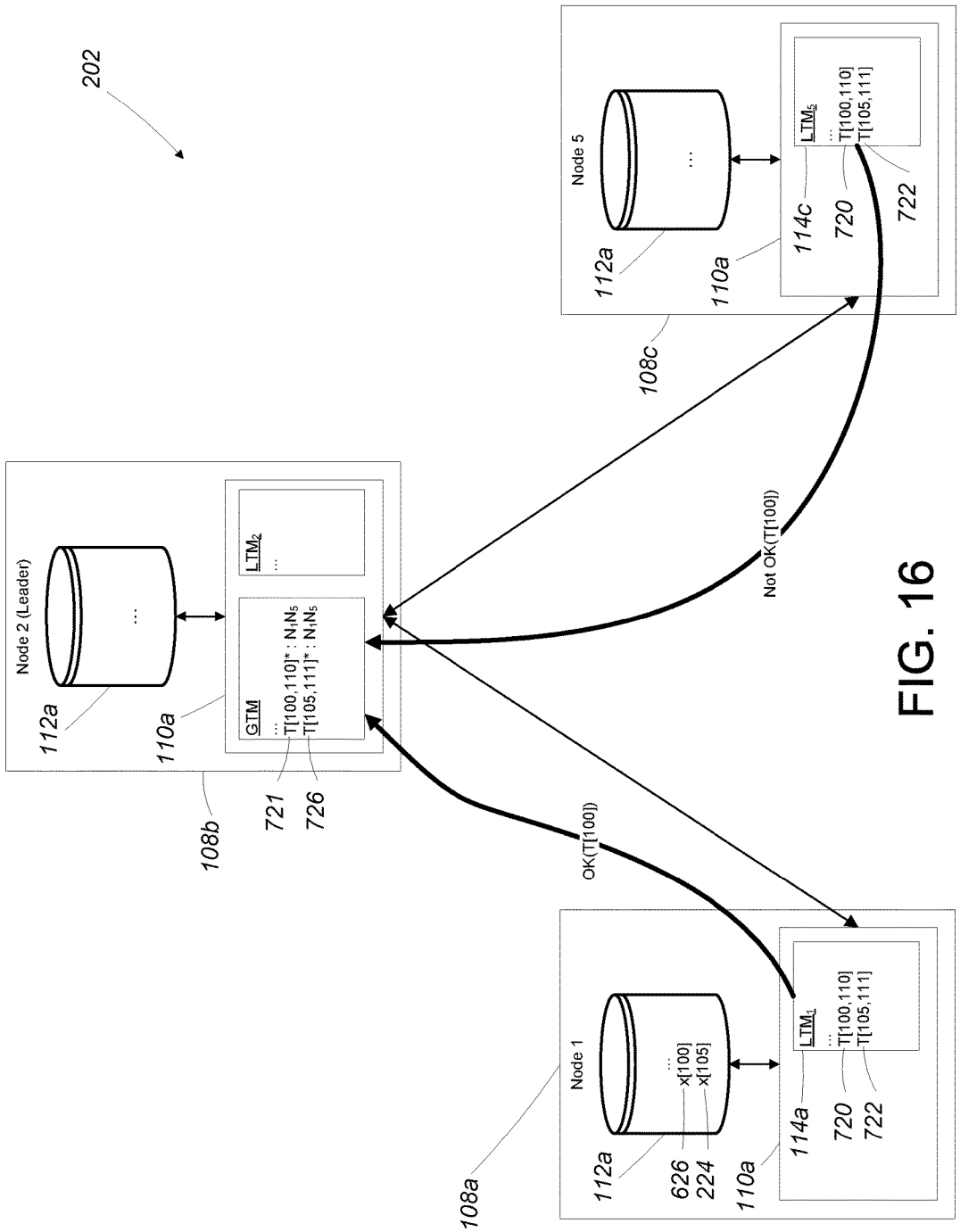
FIG. 16 is a block diagram showing the first transaction of FIG. 12 sending a not OK message to the leader node.
Figure 17:
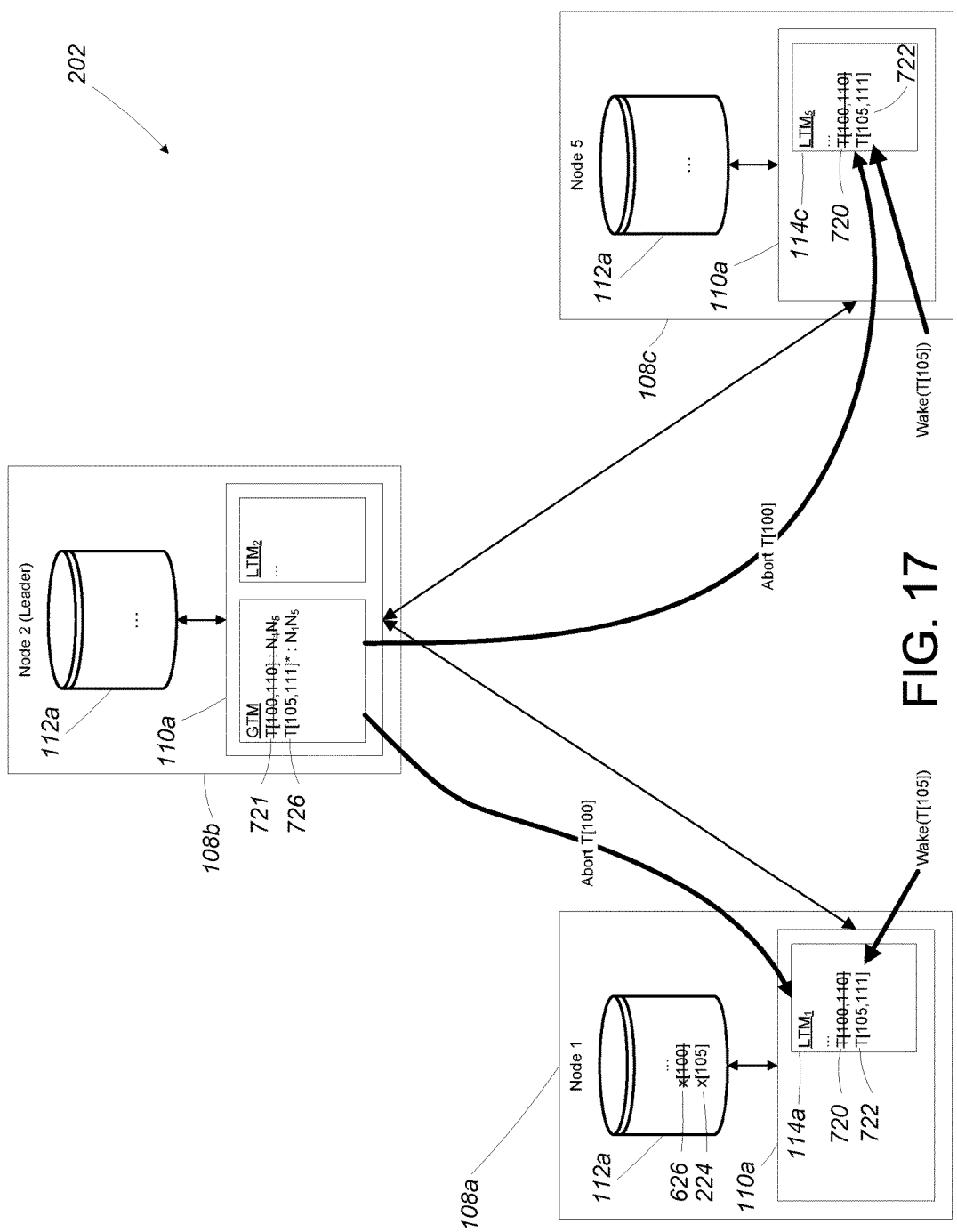
FIG. 17 is a block diagram showing the first transaction of FIG. 12 receiving abort messages from the leader node and of the second transaction of FIG. 12 waking.

Referring to FIG. 16, the database manager 110a of the first node 108a sends an OK(T[100]) message to the global transaction manager 116 indicating that the first transaction can commit. However, the fifth node 108c sends a Not OK(T[100]) message to the global transaction manager 116 indicating that the first transaction can not commit. Referring to FIG. 17, as a result of receiving the Not OK(T[100]) message from the fifth node 108c, the global transaction manager 116 aborts the first transaction by removing the first global record 721 and sending an Abort(T[100]) message to the first node 108a and to the fifth node 108c.

Upon receiving the Abort(T[100]) message from the global transaction manager 116, the first node 108a removes the x[100] version of the data element x from its data fragment 112a and removes the first local record 720 from its local transaction manager 114a. Similarly, the fifth node 108c removes the first local record 720 from its local transaction manager 114c. With the first transaction aborted, the second transaction wakes.

Figure 18:
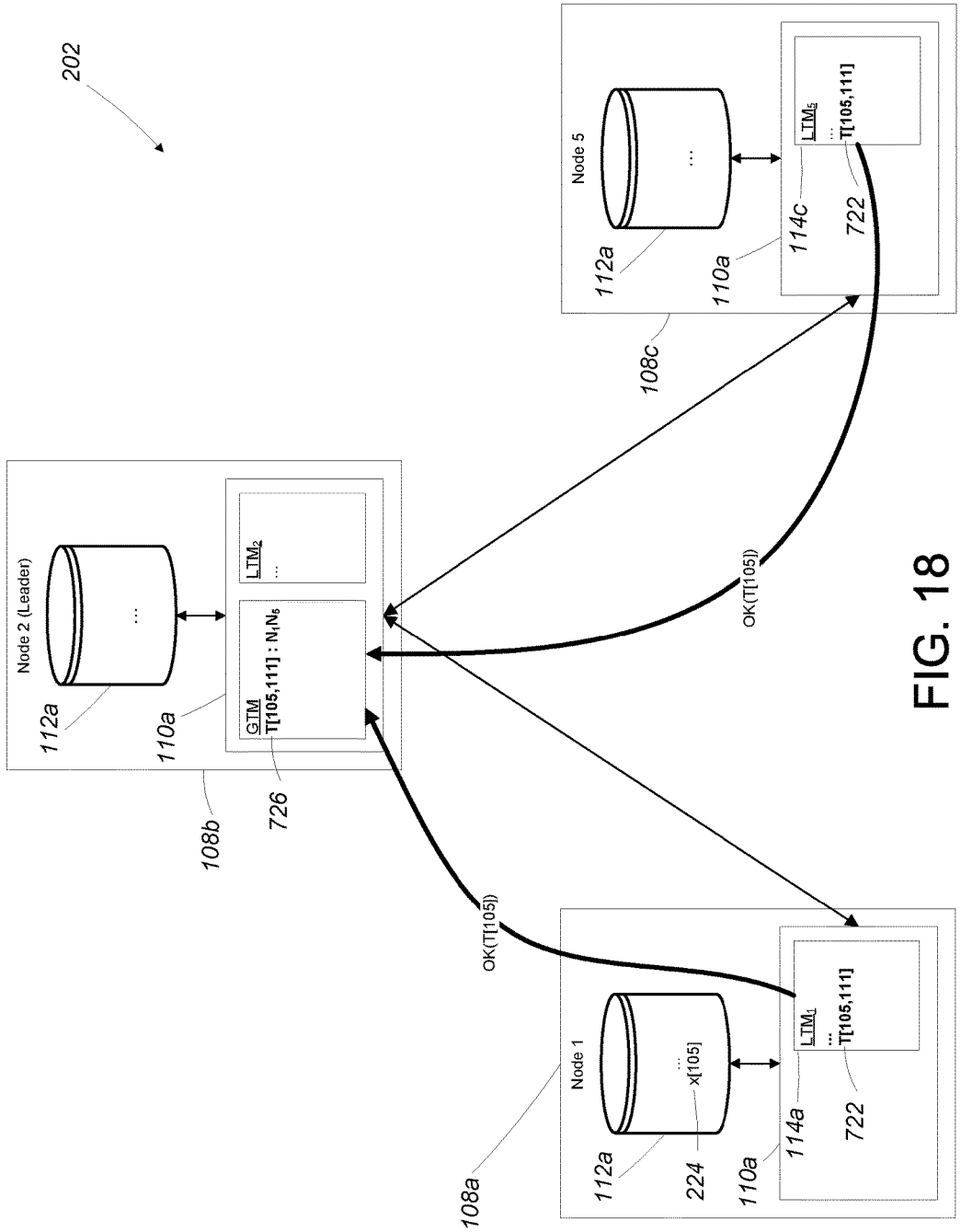
FIG. 18 is a block diagram showing the second transaction of FIG. 12 sending OK messages to the leader node.

Referring to FIG. 18, upon waking, the database manager 110a of the first node 108a sends an OK(T[105]) message to the global transaction manager 116 indicating that the second transaction is prepared to commit. The fifth node 108c also sends an OK(T[105]) message to the global transaction manager 116 indicating that the second transaction is prepared to commit.

Figure 19:
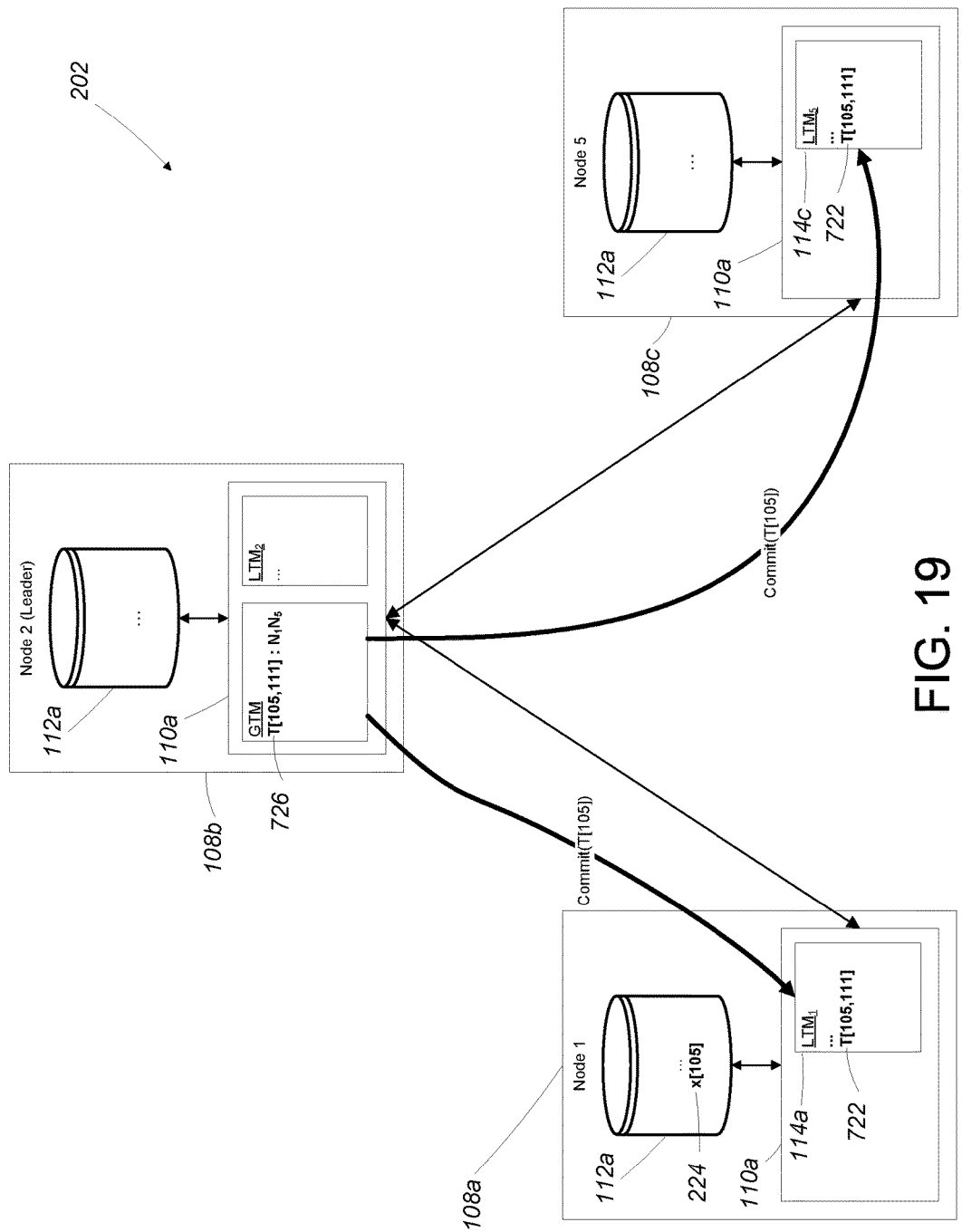
FIG. 19 is a block diagram showing the second transaction of FIG. 12 receiving commit messages from the leader node.

Referring to FIG. 19 with the OK(T[105]) messages from the first and fifth nodes 108a, 108c received, the global transaction manager 116 determines that all of the nodes on which the second transaction are operating have indicated that the second transaction is prepared to commit. The global transaction manager 116 marks the second global record 726 as no longer preparing and sends a Commit(T[105]) message to the first node 108a and the fifth node 108c, causing the second transaction to commit, including causing the x[105] version of x to commit on the database fragment 112a of the first node 108a.

1.7.2 Optimized Distributed Database Read

In some examples, when a first transaction has written a new version of a data element and is in the PREPARE phase and a second transaction including an operation for reading the data element and having a transaction identifier that is greater than the transaction identifier of the first transaction and greater than the commit identifier of the first transaction is active, an ambiguity can occur that may result in inefficient operation of the system. In particular, the second transaction has no way of knowing whether to read the new version of the data element or the previous version of the data element since it is not known whether the first transaction will commit or abort.

Figure 20:
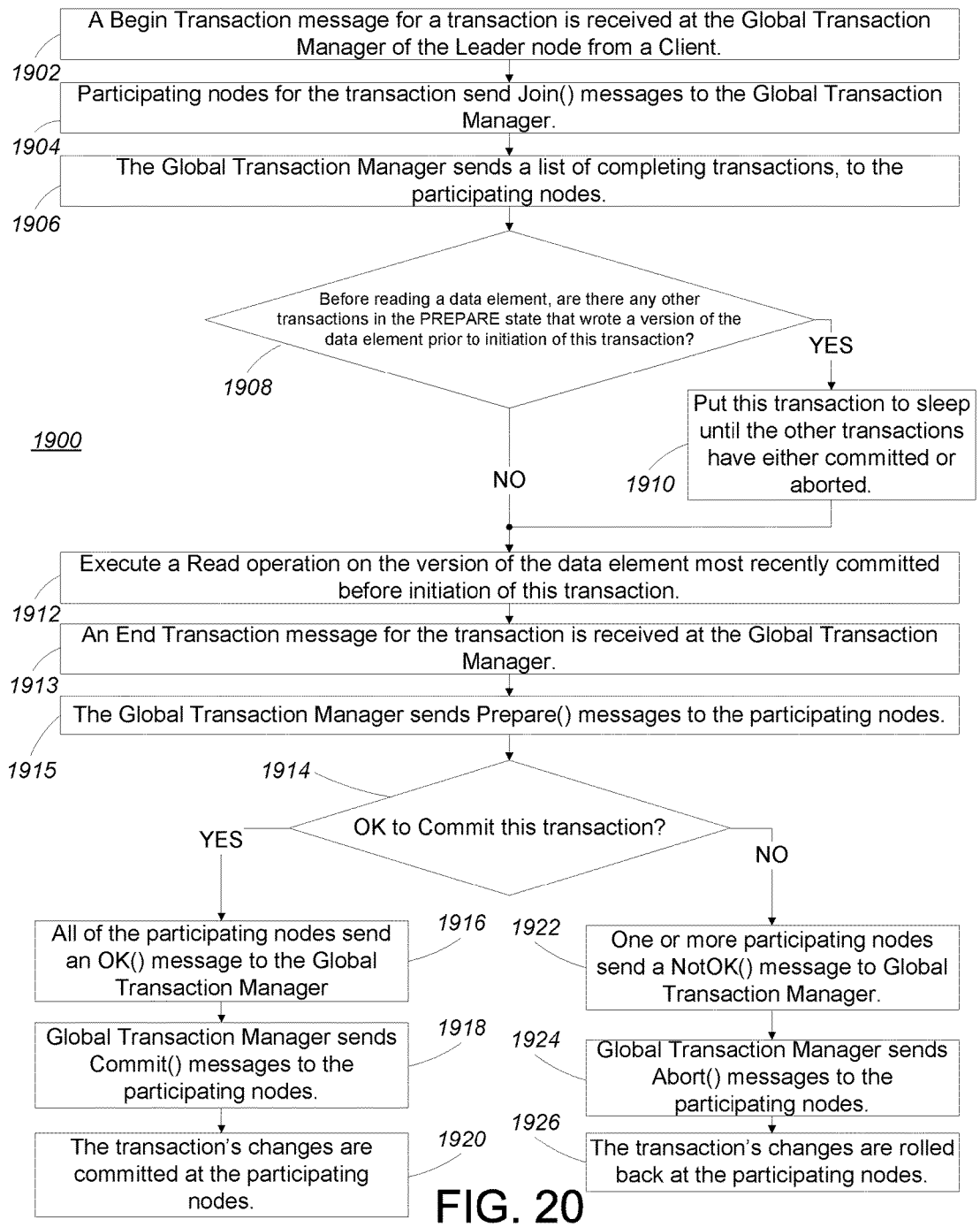
FIG. 20 is a flow chart showing steps of an optimized distributed database read algorithm.

Referring to FIG. 20, to avoid such a situation from occurring, an optimized database read algorithm 1900 is used. In a first step 1902 of the optimized database read algorithm 1900 a Begin Transaction message for a transaction including a database read operation (possibly among other operations) is received at the Global Transaction Manager of the Leader node. In a second step 1904, the Local Transaction Managers of the nodes of the database system that will participate in the database read operation send Join( ) messages to the Global Transaction Manager. In a third step 1906, the Global Transaction Manager sends a list of completing transactions to the Local Transaction Managers of the participating nodes.

In a fourth step 1908, before reading a data element, the Local Transaction Managers of the participating nodes compare the list of completing transactions to the transactions that they currently manage to determine whether any other transactions in the list of completing transactions are in the PREPARE state and wrote a version of the data element prior to initiation of this transaction. If such completing transactions do exist, the algorithm proceeds to a fifth step 1910 in which the Local Transaction Managers cause the transaction to be suspended until the completing transactions complete. Causing the transaction to be suspended delays the decision of which version of the data element is read by the transaction. If no such completing transactions exist or when the transaction awakens, the algorithm proceeds to a sixth step 1912 where the read operation is executed on the version of the data element that was most recently committed before initiation of the transaction.

In a seventh step 1913, an End Transaction message is received at the Global Transaction Manager. In an eighth step 1915, the Global Transaction Manager sends Prepare( ) messages to the Local Transaction Managers of the participating nodes.

In a ninth step 1914, the Local Transaction Managers determine whether the transaction can be committed. If the transaction can be committed, the algorithm proceeds to a tenth step 1916 wherein the Local Transaction Managers of all of the participating nodes send an OK( ) message to the Global Transaction Manager. In a subsequent, eleventh step 1918, the Global Transaction Manager sends Commit( ) messages to the Local Transaction Managers of the participating nodes. Finally, in a twelfth step 1920, the transaction's changes are committed at the participating nodes.

If the transaction can not be committed, the algorithm proceeds to a thirteenth step 1922 in which the Local Transaction Managers of one or more of the participating nodes send a NotOK( ) message to the Global Transaction Manager. In a subsequent, fourteenth step 1924, the Global Transaction Manager sends Abort( ) messages to the Local Transaction Managers of the participating nodes. Finally, in a fifteenth step 1926, the transaction's changes are rolled back at the participating nodes.

Figure 21:
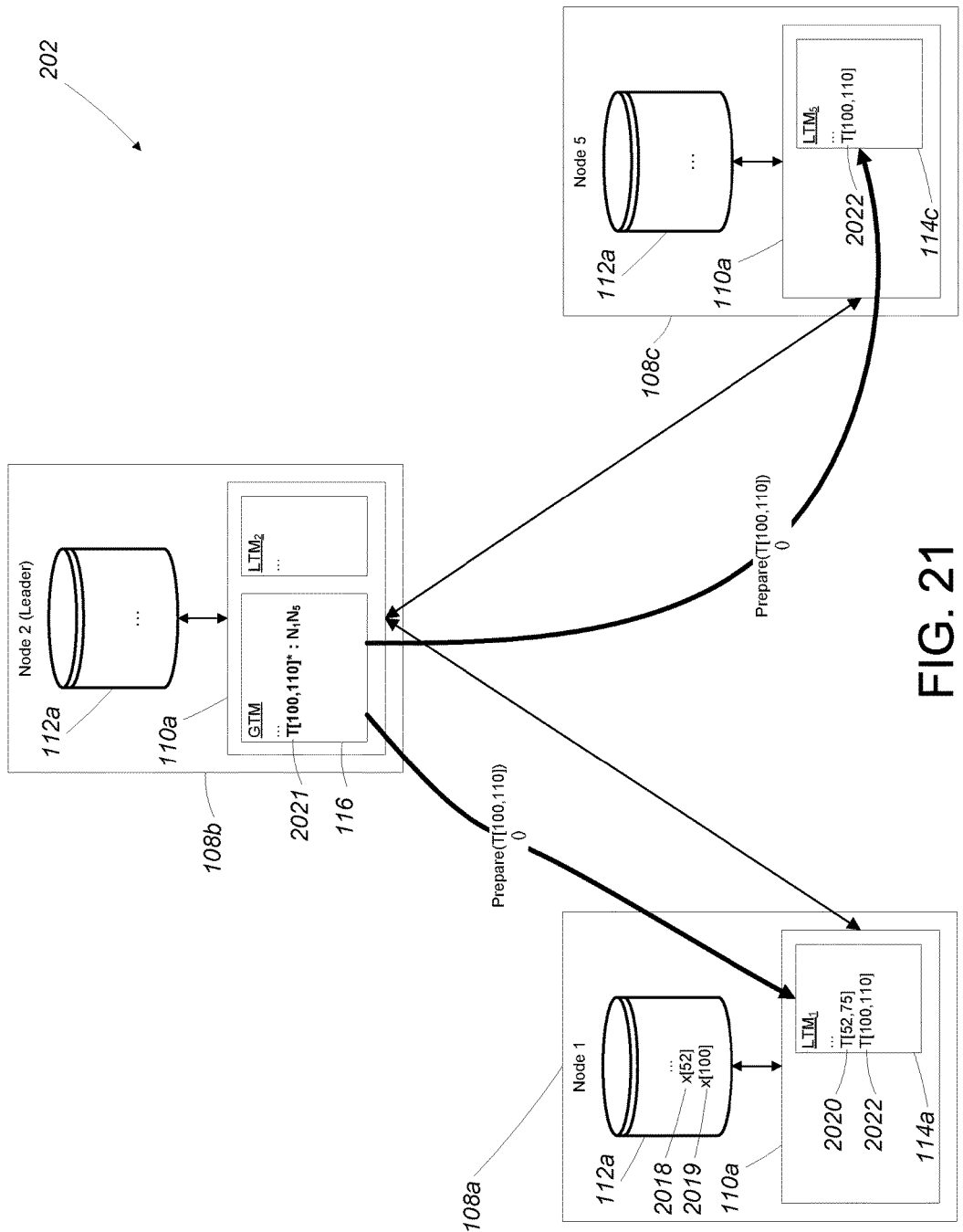
FIG. 21 is a block diagram showing a first transaction receiving prepare messages from a leader node in a distributed database system.

For example, referring to FIG. 21, a portion of a distributed database system 202 includes a first node 108a, a second node 108b, and a fifth node 108c. The second node is 108b is designated as the leader node for the distributed database system 202. A first transaction T[52,75] has previously completed on the first node 108a, resulting in a version of a data element x, x[52] 2018 being written to a first database fragment 112a on the first node 108a. A second transaction T[100,110] is active on both the first node 108a and the second node 108b and has written a version of the data element x, x[100] 2019 to the first database fragment 112a on the first node 108a. A first local record 2020 of the first transaction is stored in a local transaction manager 114a of the first node 108a. A second local record 2022 is stored in the local transaction managers 114a, 114c of the first and fifth nodes 108a, 108c. The global transaction manager 116 has sent a Prepare(T[100,110]) message including an empty list of completing transaction identifiers (i.e., ( )) for a second transaction to the local transaction managers 114a, 114c of the first and fifth nodes 108a, 108c.

Figure 22:
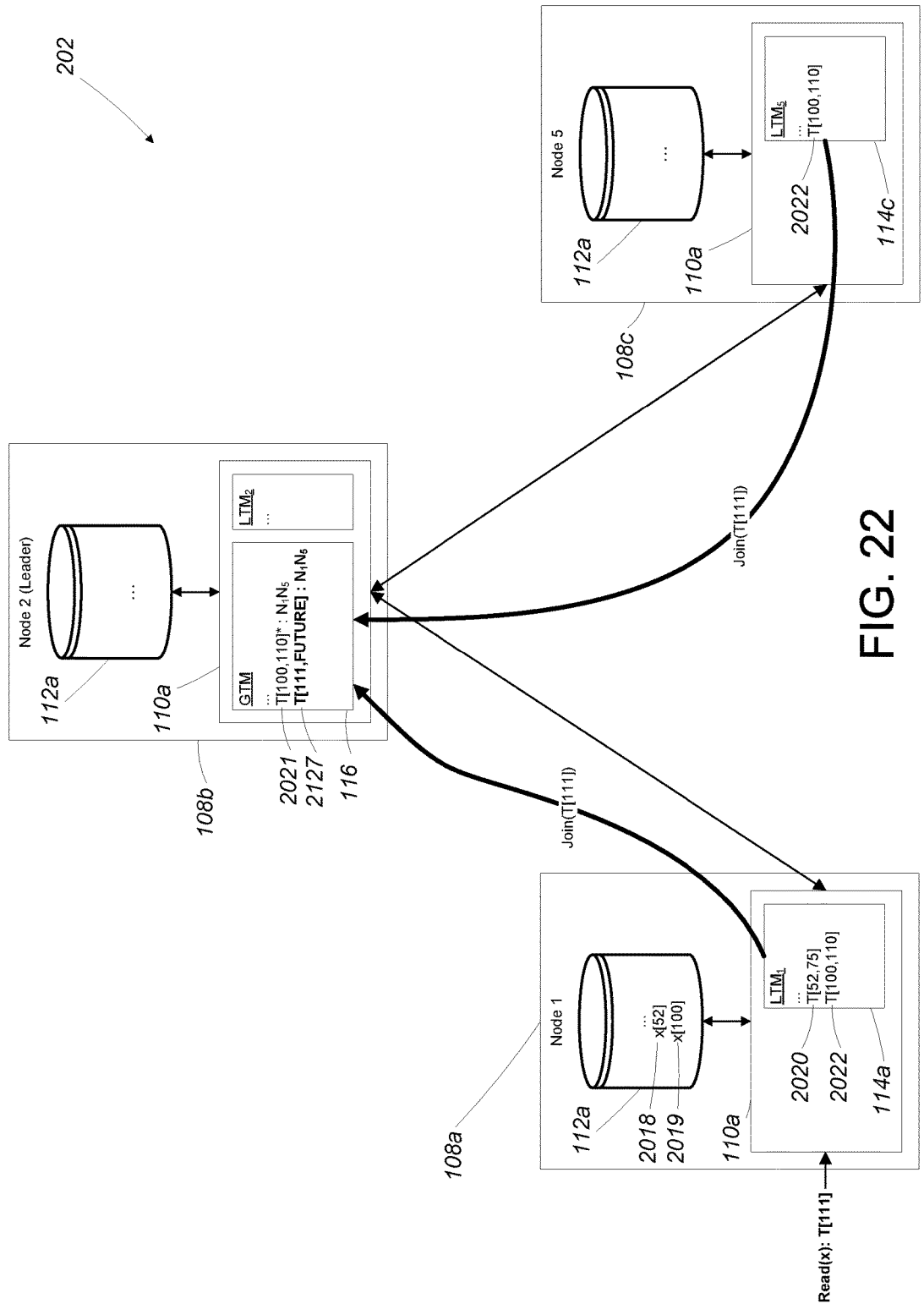
FIG. 22 is a block diagram showing a second transaction including a read operation joining the distributed database system of FIG. 19.

Referring to FIG. 22, a third transaction is initiated at the distributed database system 202 when a client sends a Begin Transaction message (not shown) to the global transaction manager 116. The global transaction manager 116 creates a global record 2127 for the third transaction: T[111,FUTURE] and responds to the client with a Started T[111] message (not shown). The client then issues a Read(x) command for transaction T[111] at the first node 108a and one or more other commands for transaction T[111] (not shown) at the fifth node 108c. Since the third transaction is new to the first node 108a and the fifth node 108c, the first node 108a and the fifth node 108c each send a Join(T[111]) message for the third transaction to the global transaction manager 116 of the leader node (i.e., the second node 108b). The global transaction manager 116 updates the second global record 2127 for the third transaction to reflect that the first node 108a and the fifth node 108c have joined the transaction: T[111,FUTURE]: $N_1N_5$. The second global record 2127 indicates that a transaction with the transaction identifier 111 is currently active (i.e., the commit identifier of the second global record 2127 is FUTURE) and is operating on the first node 108a and the fifth node 108c.

Figure 23:
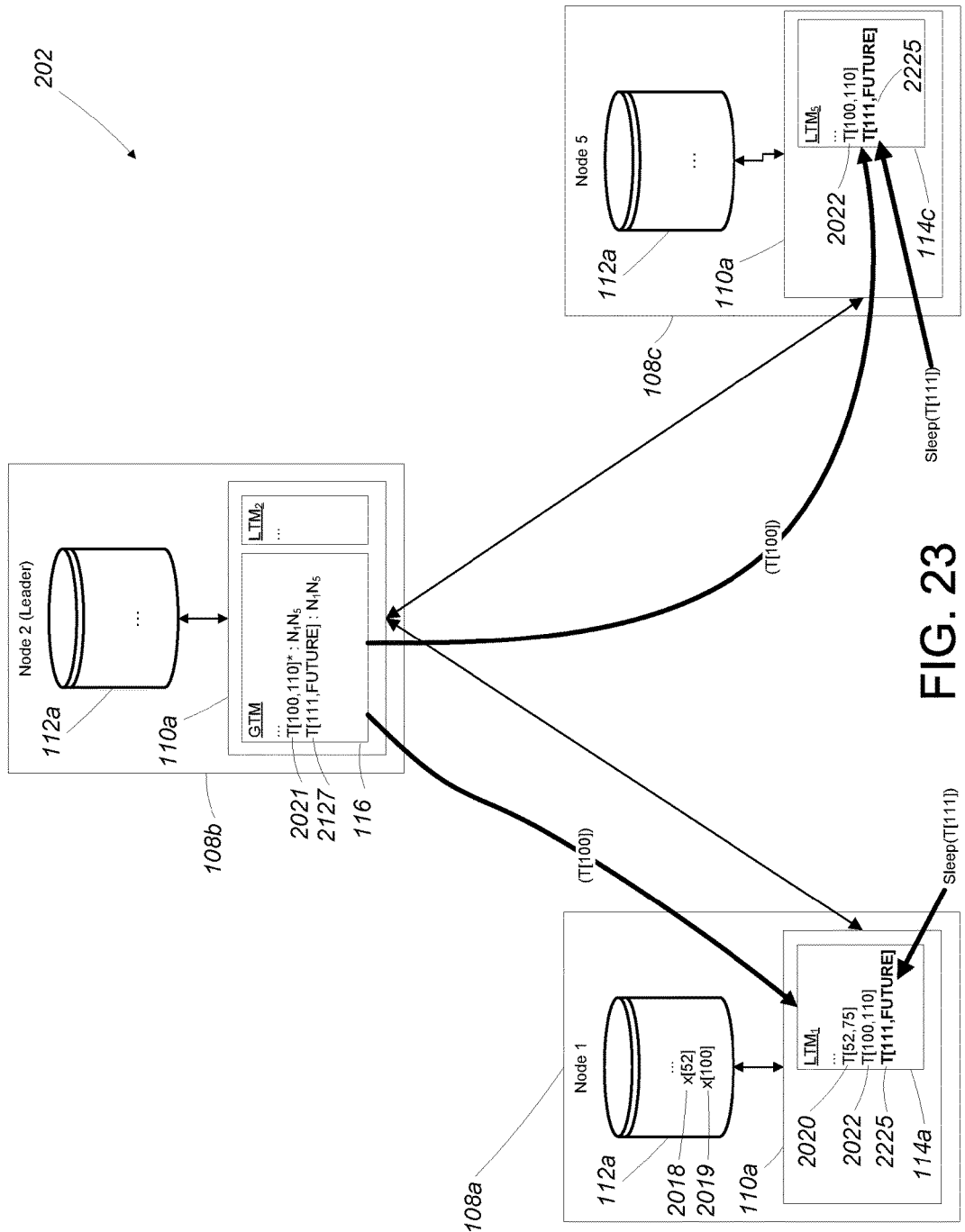
FIG. 23 is a block diagram showing the second transaction of FIG. 22 receiving a list of completing transactions, and sleeping until it can safely perform its operations on the distributed database system.

Referring to FIG. 23, the global transaction manager 116 sends a list of completing transaction identifiers back to the local transaction managers 114a, 114c of the first and fifth nodes 108a, 108c. In this example, the list of completing transaction identifiers includes T[100] since T[100] is a completing transaction (i.e., T[100] is in the PREPARE state). The local transaction managers 114a, 114c of the first and fifth nodes 108a, 108c each create a third local record 2225 for the third transaction: T[111,FUTURE].

At the point in time shown in FIG. 23, before the third transaction, T[111] tries to read x. The local transaction manager 114a for the first node 108a determines whether it is safe for the third transaction to read x by consulting the list of completing transactions to determine whether there are any completing transactions that are accessing the same data element(s) as the third transaction and that have a transaction identifier that is less than the transaction identifier of the third transaction. If any such completing transactions exist, then it is not safe for the third transaction to read x. In this case, the second transaction is in the PREPARING state, is accessing the same data element as the third transaction (i.e., x), and has a transaction identifier (i.e., 100) that is less than the transaction identifier of the third transaction (i.e., 111).

Due to the PREPARING second transaction, the third transaction, T[111] is unable to determine whether it should read x[52] or x[100]. That is, with the second transaction, T[100,110] in the prepare phase, it is unknown whether the second transaction will COMMIT or ABORT. If the second transaction aborts, then the third transaction should read x[52]. Otherwise, if the second transaction commits, then the third transaction should read x[100].

However, it is known that the second transaction will make its decision (i.e., either COMMIT or ABORT) soon, so the local transaction manager 114a of the first node 108a suspends the third transaction until the second transaction is complete (i.e., has committed).

Figure 24:
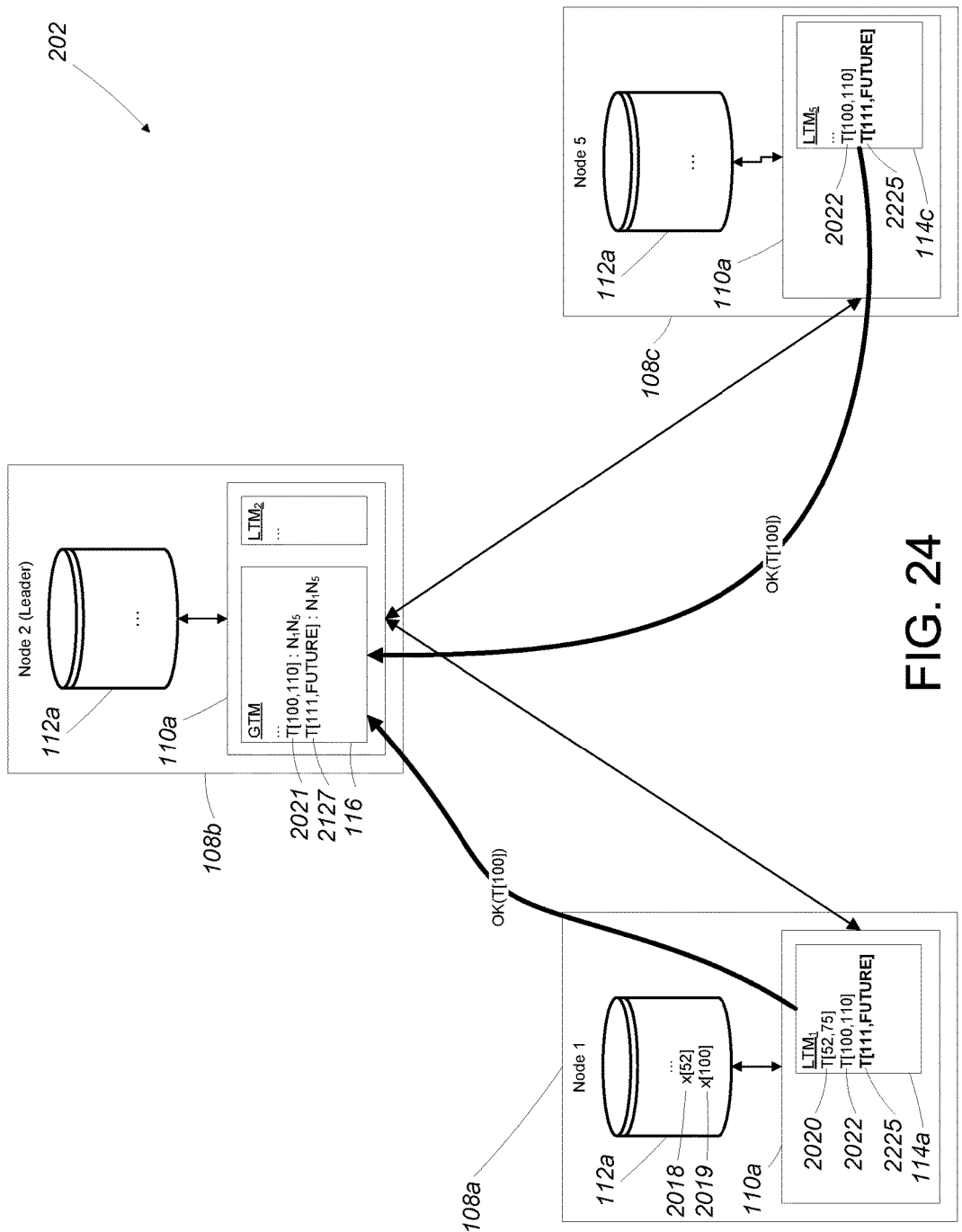
FIG. 24 is a block diagram showing the first transaction of FIG. 19 sending OK messages to a leader node.
Figure 25:
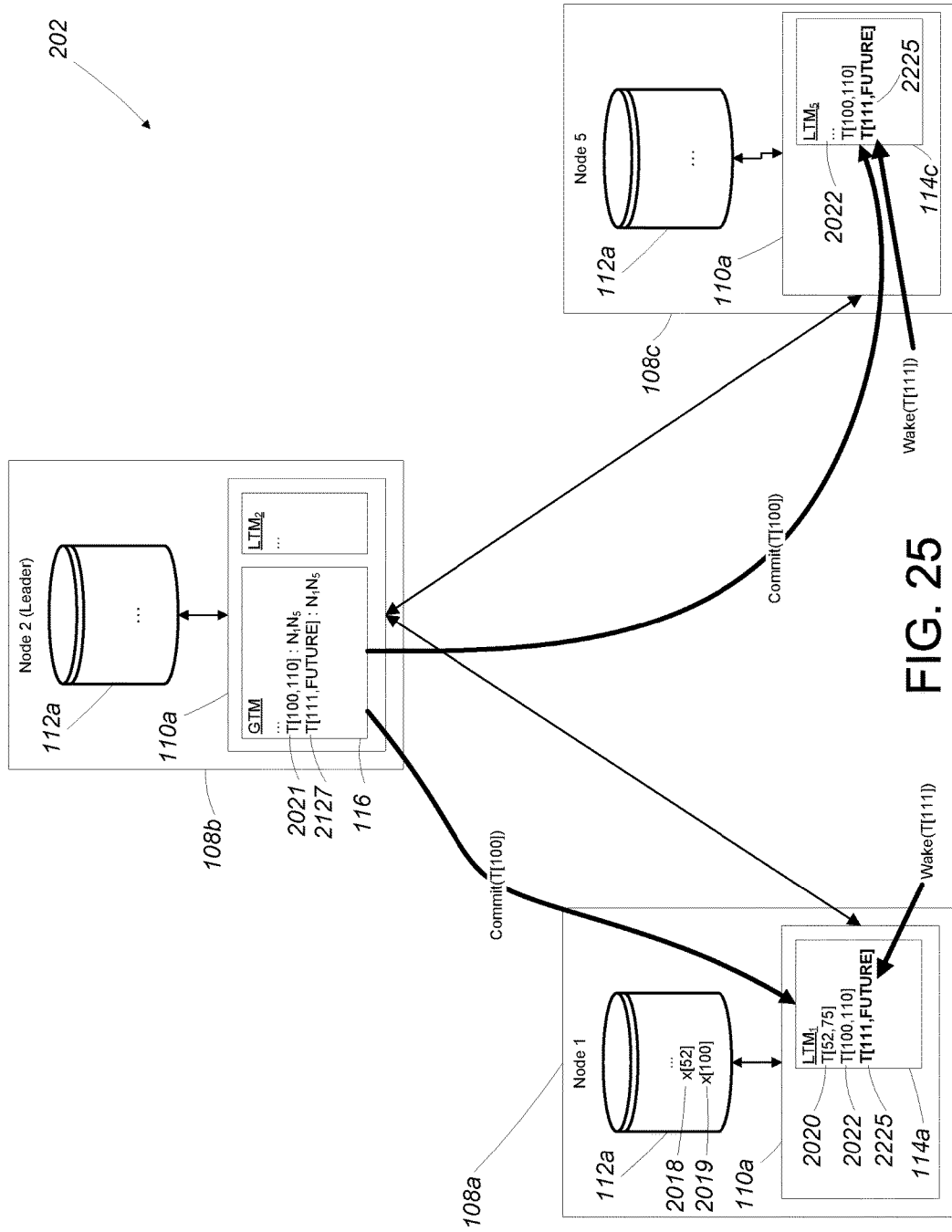
FIG. 25 is a block diagram showing the first transaction of FIG. 19 receiving commit messages from the leader node and of the second transaction of FIG. 22 waking.

Referring to FIG. 24, the local transaction managers 114a, 114c of the first and fifth nodes 108a, 108c both respond to the global transaction manager 116 with an OK(T[100]) message indicating that both of the nodes 108a, 108c are prepared to commit the second transaction. Referring to FIG. 25, in response to receiving the OK(T[100]) messages from the local transaction managers 114a, 114c of the first and fifth nodes 108a, 108c, the global transaction manager 116 sends a Commit(T[100]) message to the local transaction managers 114a, 114c of the first and fifth nodes 108a, 108c, causing the second transaction to commit.

Figure 26:
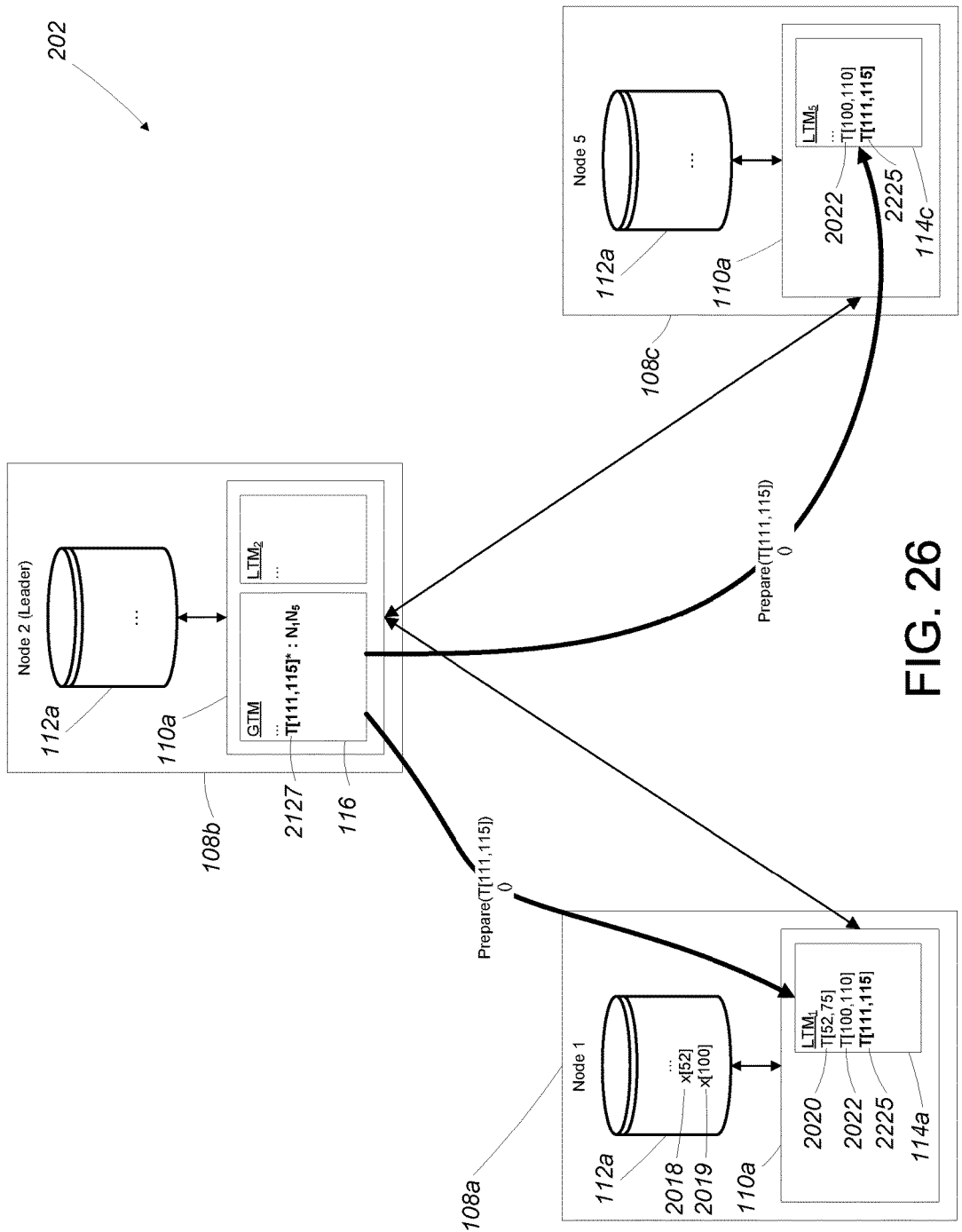
FIG. 26 is a block diagram showing the second transaction of FIG. 22 receiving prepare messages from the leader node.

When the Commit(T[100]) messages are received that the local transaction managers 114a, 114c of the first and fifth nodes 108a, 108c, the local transaction managers 114a, 114c know that the second transaction has successfully committed (and has not aborted). The local transaction managers 114a, 114c wake the third transaction which then reads x[100] from the first database fragment 112a. Referring to FIG. 26, once the operations of the third transactions have completed, the global transaction manager 116 generates a commit identifier (i.e., 115) for the third transaction and updates the second global record 2127 for the third transaction to include the commit identifier. The global transaction manager 116 also marks the second global record 2127 for the third transaction (shown as an asterisk in FIG. 26) as being in the PREPARE state, resulting in an updated version of the second global record 2127: T[111,115]*:$N_1N_5$.

The global transaction manager 116 sends a Prepare(T[111,115]) message including an empty list of completing transaction identifiers (i.e., ( )) to the local transaction managers 114a, 114c of the first and fifth nodes 108a, 108c.

In response to receiving the Prepare(T[111,115]) message from the global transaction manager 116, the local transaction managers 114a, 114c the first and fifth nodes 108a, 108c update their respective third local records 2225 for the third transaction to T[111,115] and determine whether they are prepared to commit the third transaction.

Figure 27:
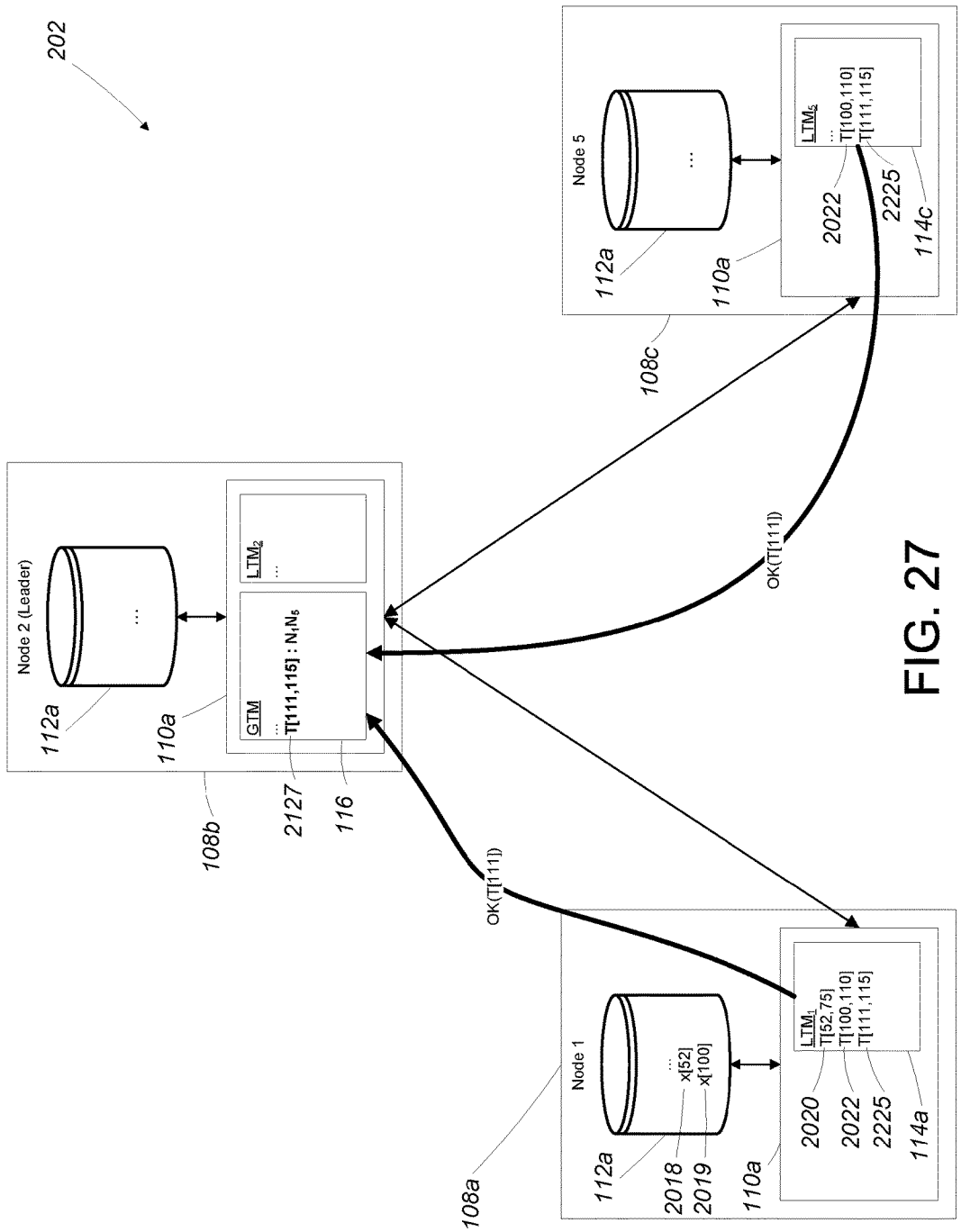
FIG. 27 is a block diagram showing the second transaction of FIG. 22 sending OK messages to the leader node.
Figure 28:
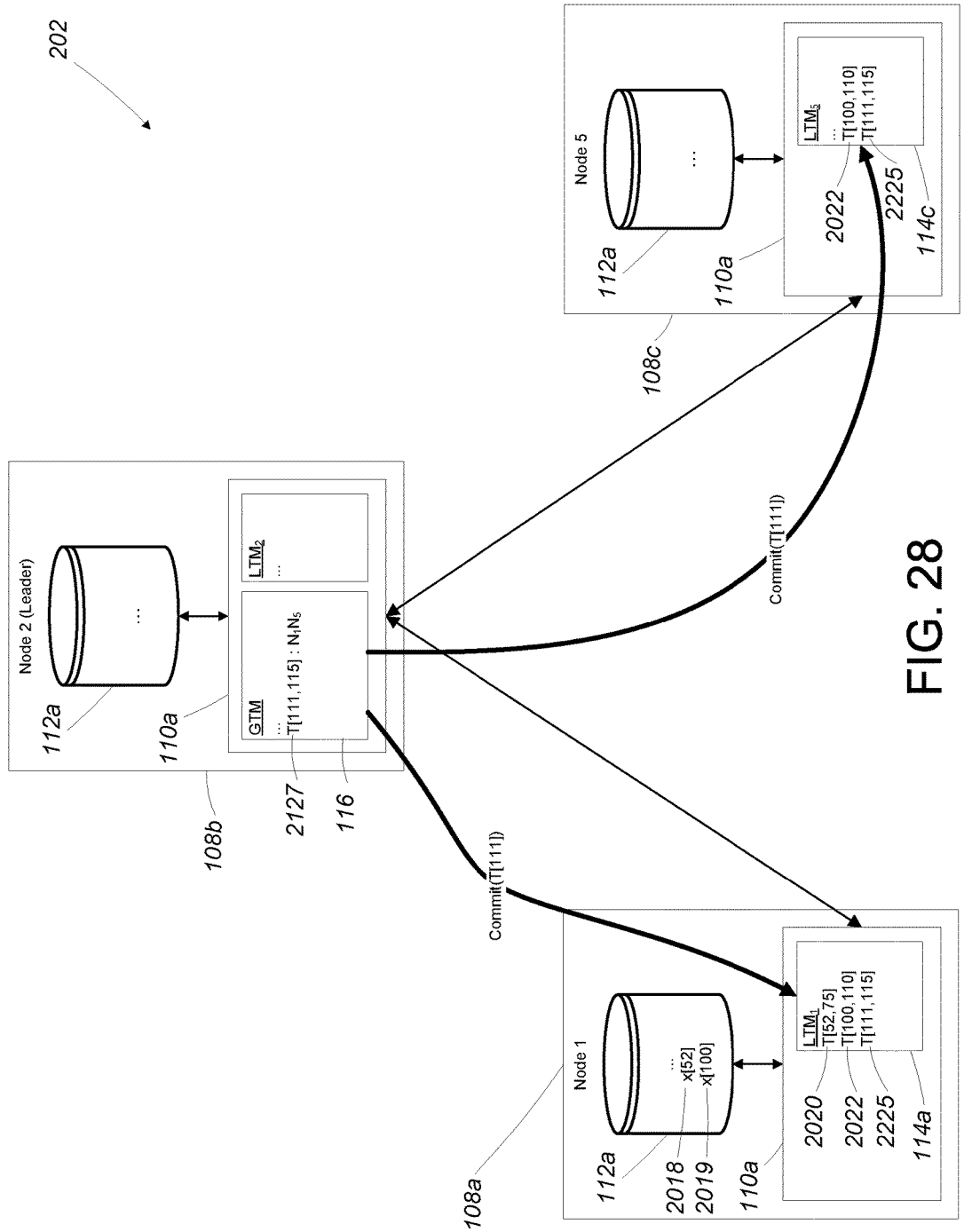
FIG. 28 is a block diagram showing the second transaction of FIG. 22 receiving commit messages from the leader node.

Referring to FIG. 27, the local transaction managers 114a, 114c of the first and fifth nodes 108a, 108c both respond to the global transaction manager 116 with an OK(T[111]) message indicating that both of the nodes 108a, 108c are prepared to commit the third transaction. Referring to FIG. 28, in response to receiving the OK(T[111]) messages from the local transaction managers 114a, 114c of the first and fifth nodes 108a, 108c, the global transaction manager 116 sends a Commit(T[111]) message to the local transaction managers 114a, 114c of the first and fifth nodes 108a, 108c, causing the third transaction to commit.

1.8 Out of Order Message Handling

In some examples, messages such as PREPARE messages for two or more transactions can be sent to the nodes 108 in the distributed database system 102 from the global transaction manager 116 in a first order but arrive at the local transaction managers 114 one or more of the nodes 108 in a second order, different from the first order. If the PREPARE messages are processed in the order that they are received at the local transaction managers 114 rather than the order that they are sent from the global transaction manager 116, side effects such as violating the first committer wins rule (i.e., for two concurrent transactions writing a data element, the first transaction to commit wins and the other must abort) by incorrectly aborting a transaction that should commit may occur. Such side effects can cause inefficient and potentially incorrect operation of the system.

Figure 29:
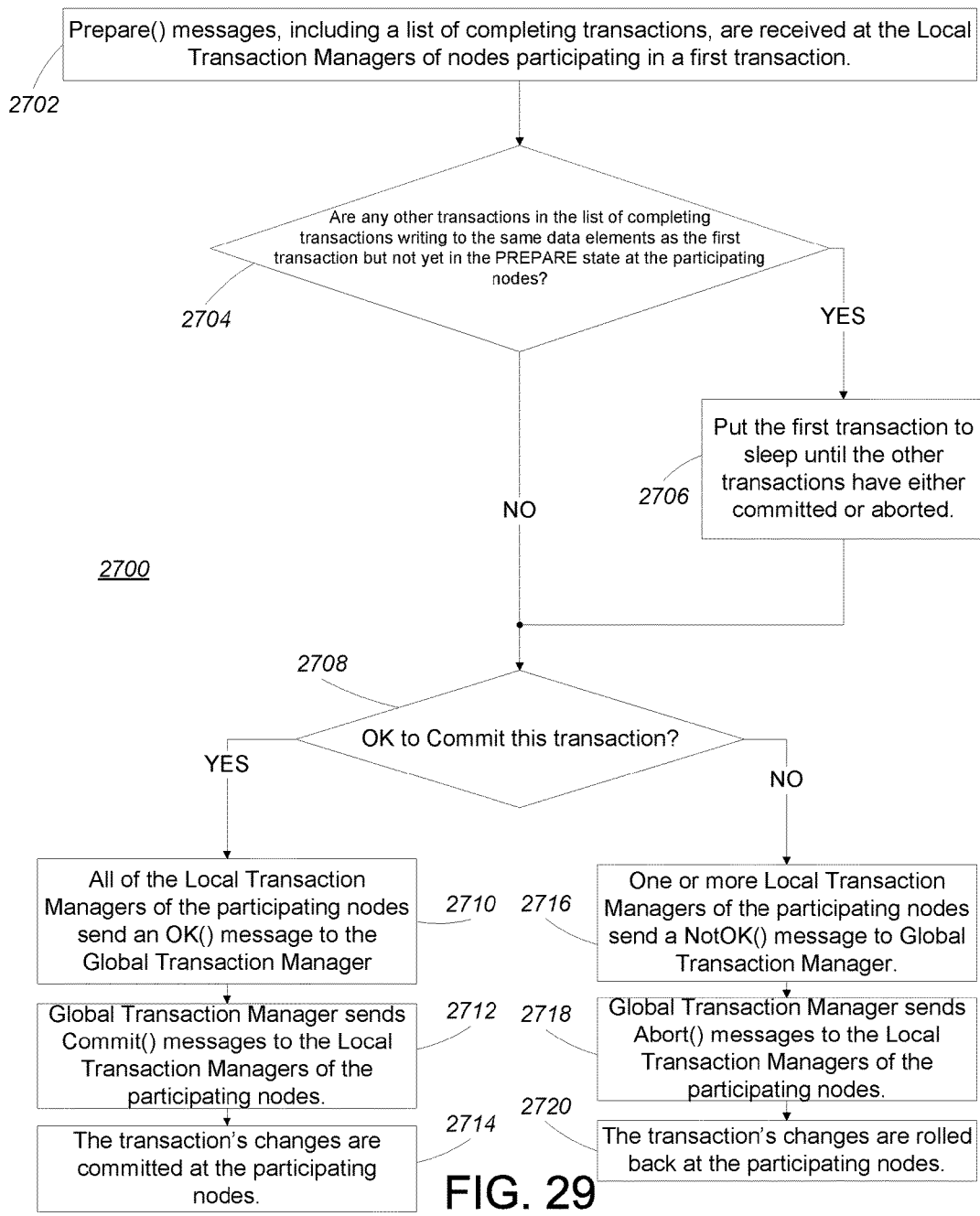
FIG. 29 is a flow chart showing steps of an out of order message handling algorithm.

Referring to FIG. 29, to prevent such a situation from occurring, an out of order message handling algorithm 2700 is used. In a first step 2702, Prepare( ) messages, including a list of completing transactions, are received at the Local Transaction Managers of nodes participating in a first transaction. In a second step 2704, the Local Transaction Managers compares the first transaction to the list of completing transactions and to the transactions that are managed by the Transaction Managers to determine whether any transactions in the list of completing transactions are writing to the same data elements as the first transaction but are not yet in the PREPARE state at the participating nodes.

If any such transactions are identified, then the Prepare( ) message for the first transaction was received out of order and the algorithm proceeds to a third step 2706 in which the Local Transaction Managers cause the first transaction to be suspended until the identified transactions complete. Causing the first transaction to be suspended until the identified transactions complete re-establishes the proper message ordering such that the first committer wins rule is not violated.

If the Prepare( ) message for the first transaction is not received out of order or when the first transaction awakens, the algorithm proceeds to a fourth step 2708 where the Local Transaction Managers determine whether the first transaction can be committed. If the first transaction can be committed, the algorithm proceeds to a fifth step 2710 wherein the Local Transaction Managers of all of the participating nodes send an OK( ) message to the Global Transaction Manager. In a subsequent, sixth step 2712, the Global Transaction Manager sends Commit( ) messages to the Local Transaction Managers of the participating nodes. Finally, in a seventh step 2714, the first transaction's changes are committed at the participating nodes.

If the first transaction can not be committed, the algorithm proceeds to an eighth step 2716 in which the Local Transaction Managers of one or more of the participating nodes send a NotOK( ) message to the Global Transaction Manager. In a subsequent, ninth step 2718, the Global Transaction Manager sends Abort( ) messages to the Local Transaction Managers of the participating nodes. Finally, in a tenth step 2720, the first transaction's changes are rolled back at the participating nodes.

Figure 30:
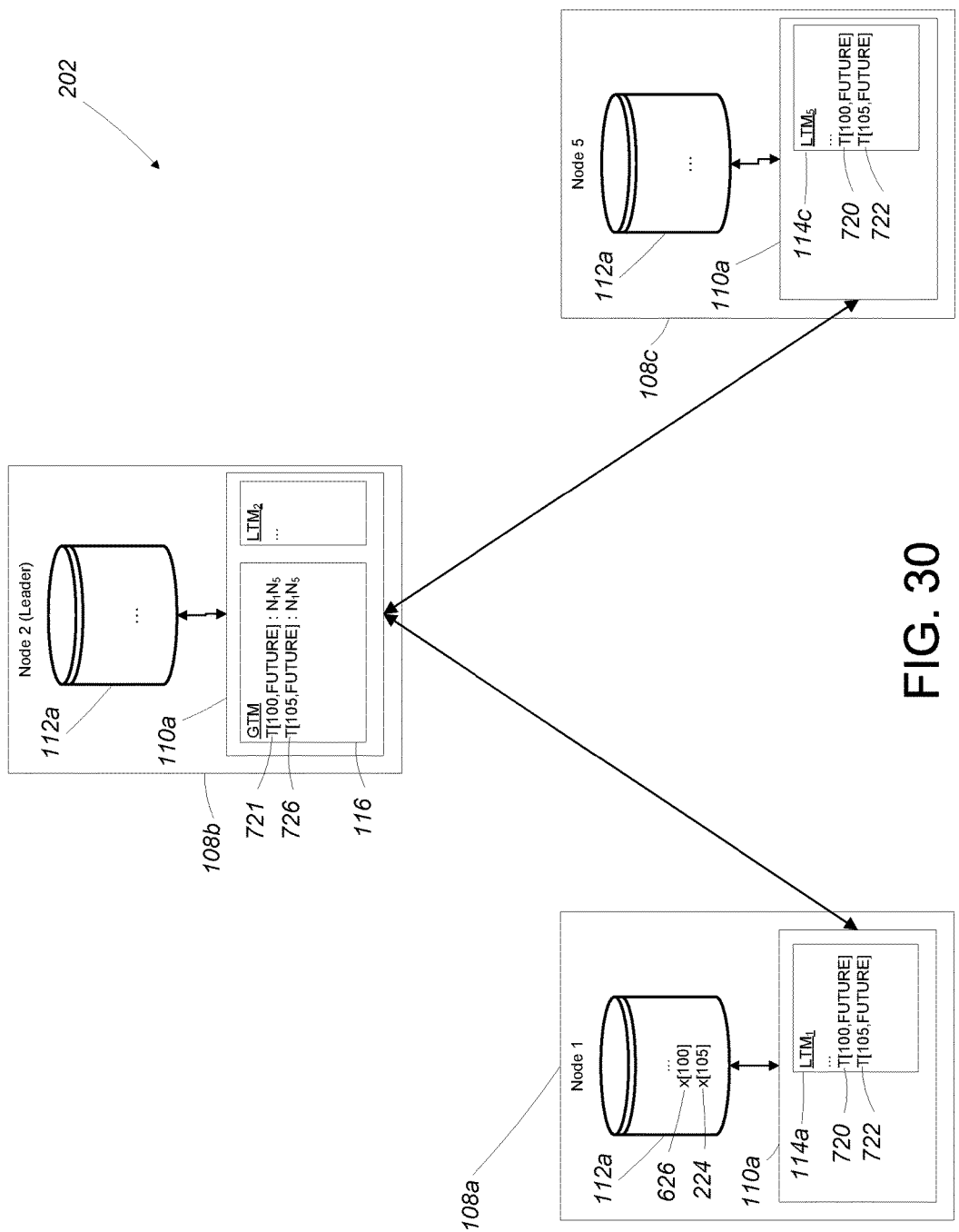
FIG. 30 is a block diagram showing a first transaction and a second transaction active in a distributed database system.

For example, referring to FIG. 30, a portion of a distributed database system 202 includes a first node 108a, a second node 108b, and a fifth node 108c. The second node is 108b is designated as the leader node for the distributed database system 202. A first transaction, T[100,FUTURE] has written a first new version of a data element x, x[100] 626 to a first database fragment 112a on the first node 108a and has performed one or more other operations (not shown) on the fifth node 108c. A second transaction, T[105, FUTURE] has written a second new version of the data element x, x[105]224 to the first database fragment 112a on the first node 108a and has performed one or more other operations (not shown) on the fifth node 108c. The global transaction manager 116 includes a first global record 721 for the first transaction: T[100, FUTURE]: $N_1N_5$. The first global record 721 indicates that the first transaction has a transaction identifier 100 and is currently active on the first node 108a and the fifth node 108c. The global transaction manager 116 also includes a second global record 726 for the second transaction: T[105, FUTURE]: $N_1N_5$. The second global record 726 indicates that the second transaction has a transaction identifier 105 and is currently active on the first node 108a and the fifth node 108c. Both a first local record, T[100, FUTURE] 720 of the first transaction and a second local record, T[105, FUTURE] 722 of the second transaction are stored in the local transaction managers 114a, 114c of the first and fifth node 108a, 108c.

Figure 31:
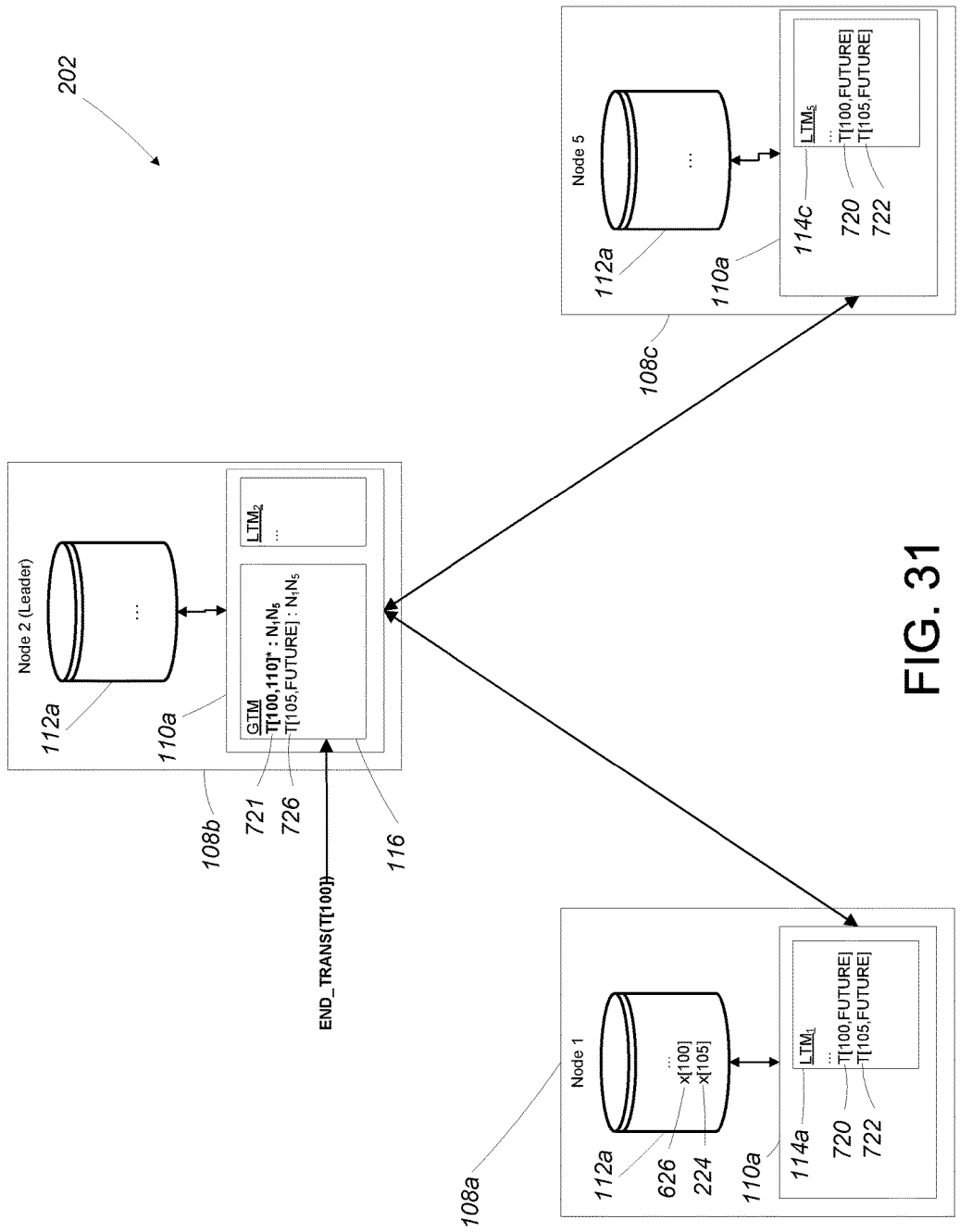
FIG. 31 is a block diagram showing a leader node in the distributed database system of FIG. 27 receiving an END_TRANS message for the first transaction.

Referring to FIG. 31, when the global transaction manager 116 receives an END_TRANS(T[100]) message (e.g., from one of the clients 104), the global transaction manager 116 generates a commit identifier (i.e., 110) for the first transaction and updates the first global record 721 for the first transaction to include the commit identifier. The global transaction manager 116 also marks the first global record 721 for the first transaction as being in the PREPARE state (shown as an asterisk in FIG. 31), resulting in an updated version of the first global record 721: T[100,110]*: $N_1N_5$.

Figure 32:
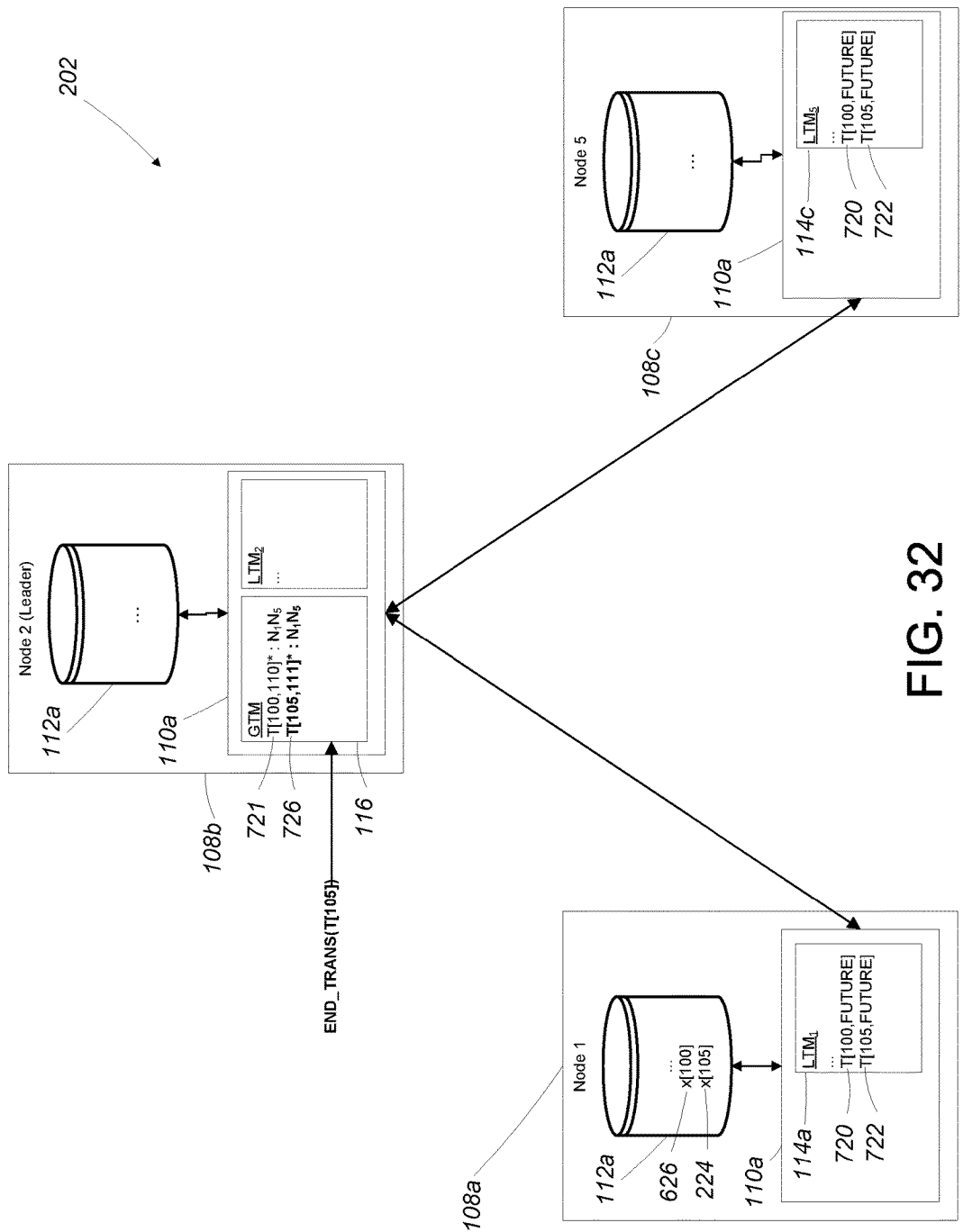
FIG. 32 is a block diagram showing a leader node in the distributed database system of FIG. 27 receiving an END_TRANS message for the second transaction.

Referring to FIG. 32, when the global transaction manager 116 receives an END_TRANS(T[105]) message (e.g., from one of the clients 104), the global transaction manager 116 generates a commit identifier (i.e., 111) for the second transaction and updates the second global record 726 for the second transaction to include the commit identifier. The global transaction manager 116 also marks the second global record 726 for the second transaction as being in the PREPARE state (shown as an asterisk in FIG. 32), resulting in an updated version of the second global record 726: T[105,111]*: $N_1N_5$.

Figure 33:
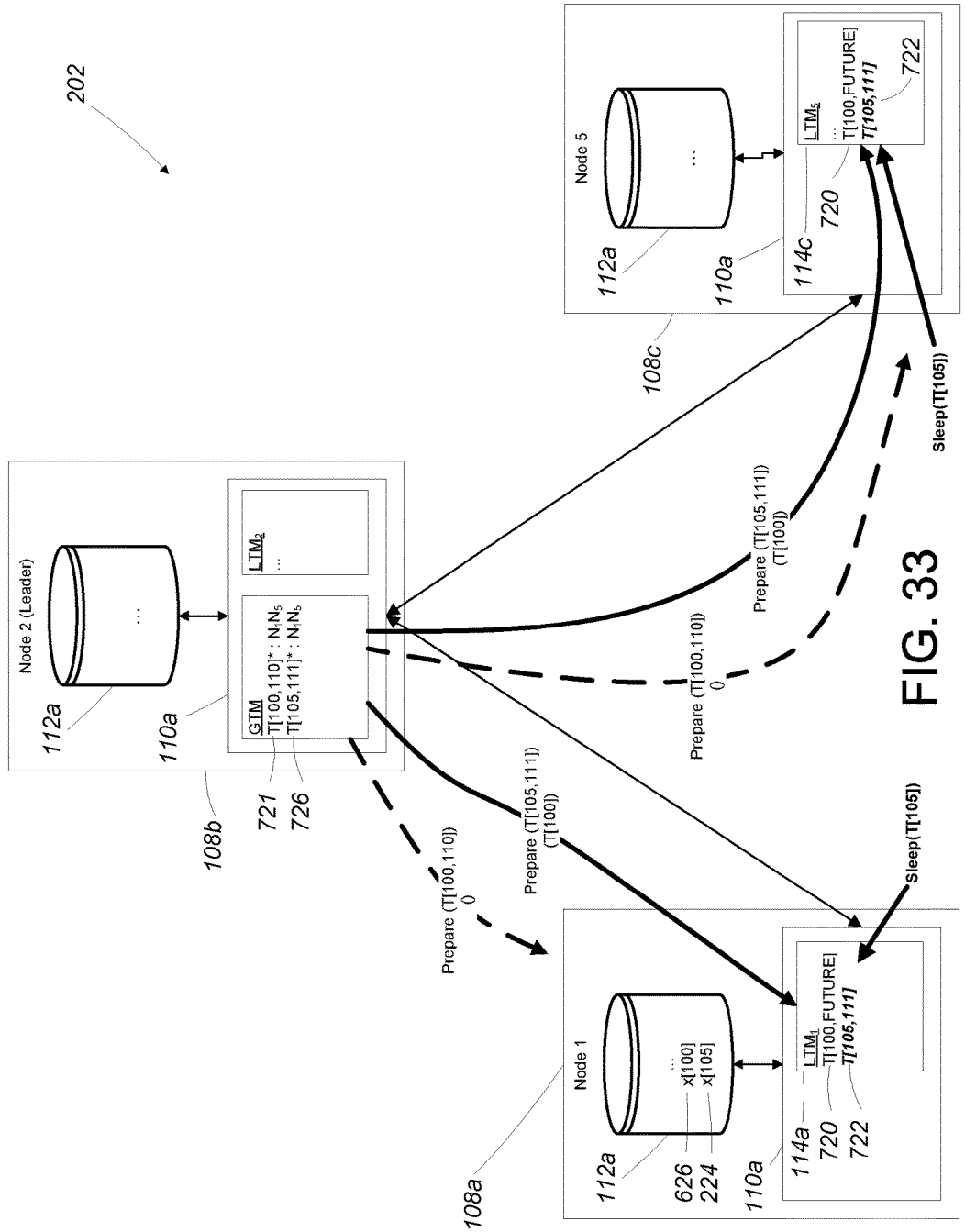
FIG. 33 is a block diagram showing the second transaction of FIG. 27 receiving prepare messages, including a list of completing transaction identifiers, from the leader node before the first transaction receives a prepare message, and sleeping until the first transaction completes.

Referring to FIG. 33, the global transaction manager 116 first sends a Prepare(T[100,110]) message including an empty list of completing transaction identifiers (i.e., ( )) to the local transaction managers 114a, 114c. The global transaction manager then sends a subsequent Prepare(T[105, 111]) message, along with a list of completing transaction identifiers including T[100], to the local transaction managers 114a, 114c.

In the example of FIG. 33, the Prepare(T[105,111]) message and its associated list of completing transaction identifiers arrives at the local transaction managers 114a, 114c before the Prepare(T[100,110]) message. That is, the Prepare( . . . ) messages are received out of order. If the Prepare( . . . ) messages were simply processed in the order that they are received at the local transaction managers 114a, 114c, the local transaction managers 114a, 114c would determine that the second transaction, T[105, 111] is the first committer, causing T[100] to abort. Of course, aborting the first transaction, T[100] would be an incorrect operation since the second transaction, T[105,111] is not actually the first committer. Indeed, the first transaction, T[100,110] is the first committer since it has a commit identifier of 110 in the first global record 721, which is less than the commit identifier, 111 of the second transaction.

To avoid incorrectly aborting the first transaction, in this example, upon receiving the Prepare (T[105, 111]) message the local transaction managers 114a, 114c examine the list of completing transaction identifiers to determine whether any transactions have written the same data element(s) as the second transaction T[105,111] and are in the PREPARE state. In this case, the first transaction, T[100] satisfies these conditions since it is included in the list of completing transaction identifiers (i.e., the first transaction, T[100] is in the PREPARE state) and has written a version of the data element x, to which the second transaction, T[105,111] has also written. Rather than aborting the first transaction, T[100], the local transaction managers 114a, 114c suspend the second transaction, T[105,111] until the outcome of the first transaction, T[100] is known.

Figure 34:
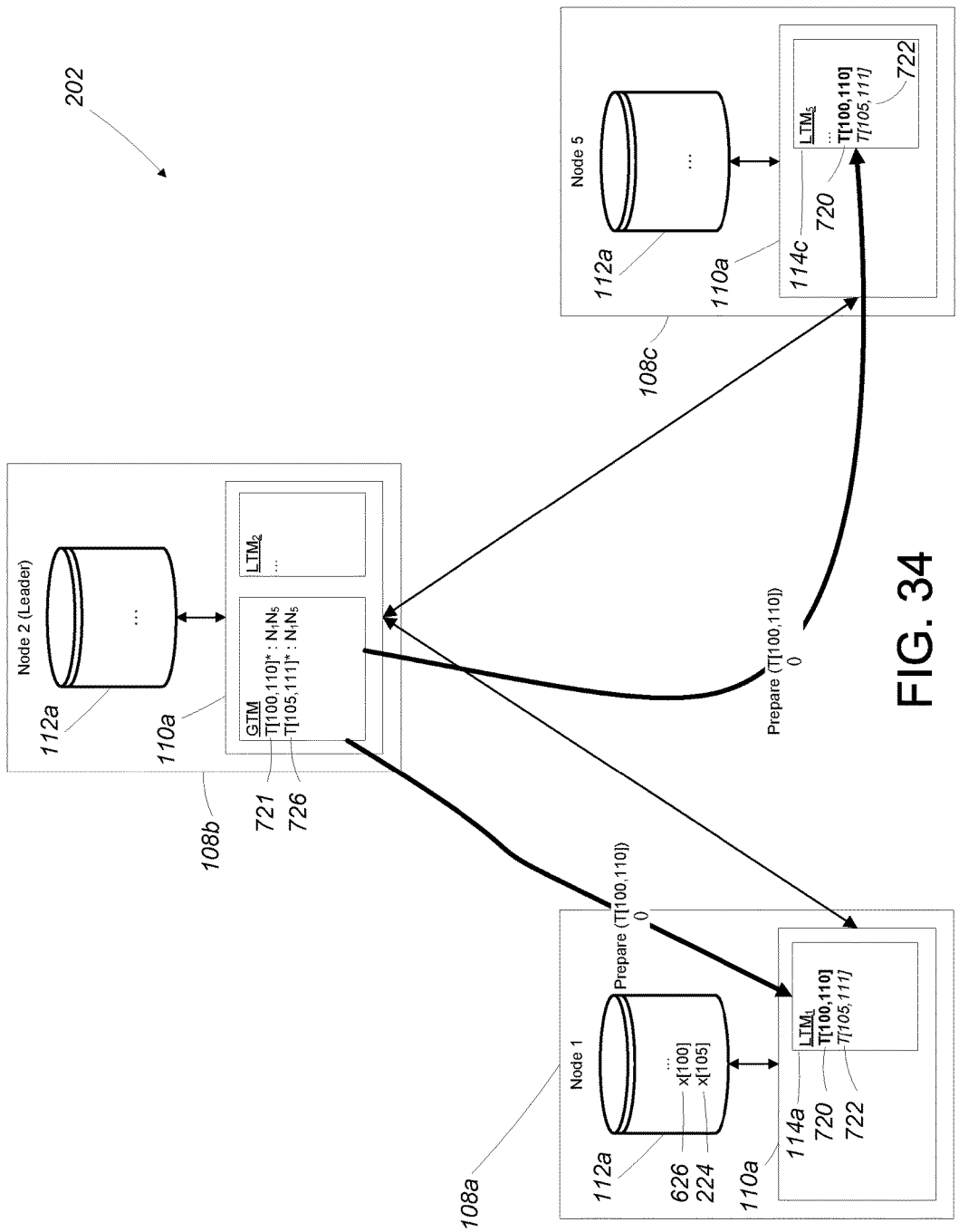
FIG. 34 is a block diagram showing the first transaction of FIG. 27 receiving a prepare message.

Referring to FIG. 34, at some point after the Prepare(T [105,111]) message is received at the local transaction managers 114a, 114c, the Prepare(T[100,110]) message is received at the local transaction managers 114a, 114c. In response to receiving the Prepare(T[100,110]) message from the global transaction manager 116, the local transaction managers 114a, 114c of the first and fifth nodes 108a, 108c each update the first local record 720 for the first transaction to T[100,110] and begin determining whether they are prepared to commit the first transaction.

Figure 35:
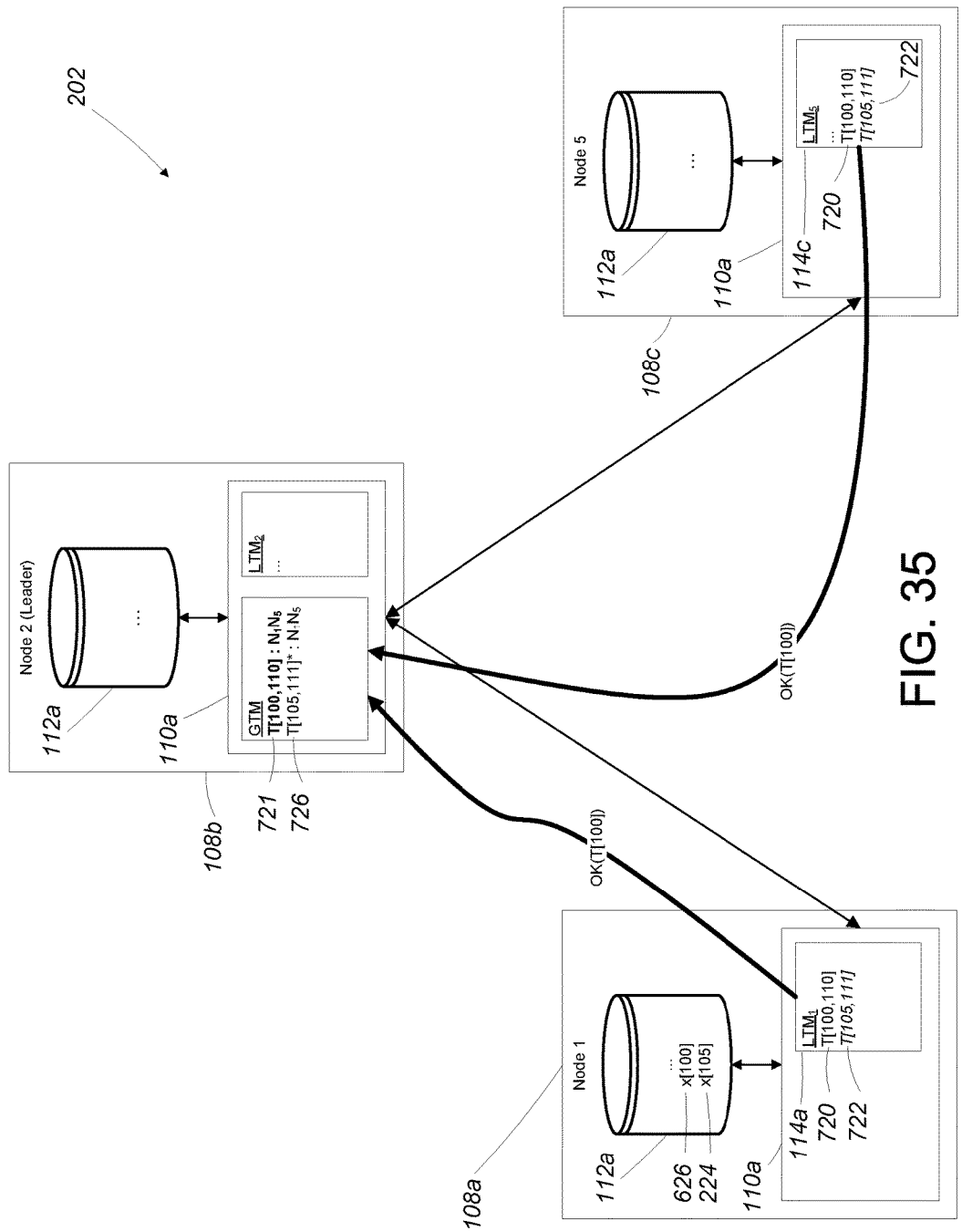
FIG. 35 is a block diagram showing the first transaction of FIG. 27 sending OK messages to the leader node.

Referring to FIG. 35, the database manager 110a of the first node 108a sends an OK(T[100]) message to the global transaction manager 116 indicating that the first transaction is prepared to commit. The fifth node 108c also sends an OK(T[100]) message to the global transaction manager 116 indicating that the first transaction is prepared to commit.

Figure 36:
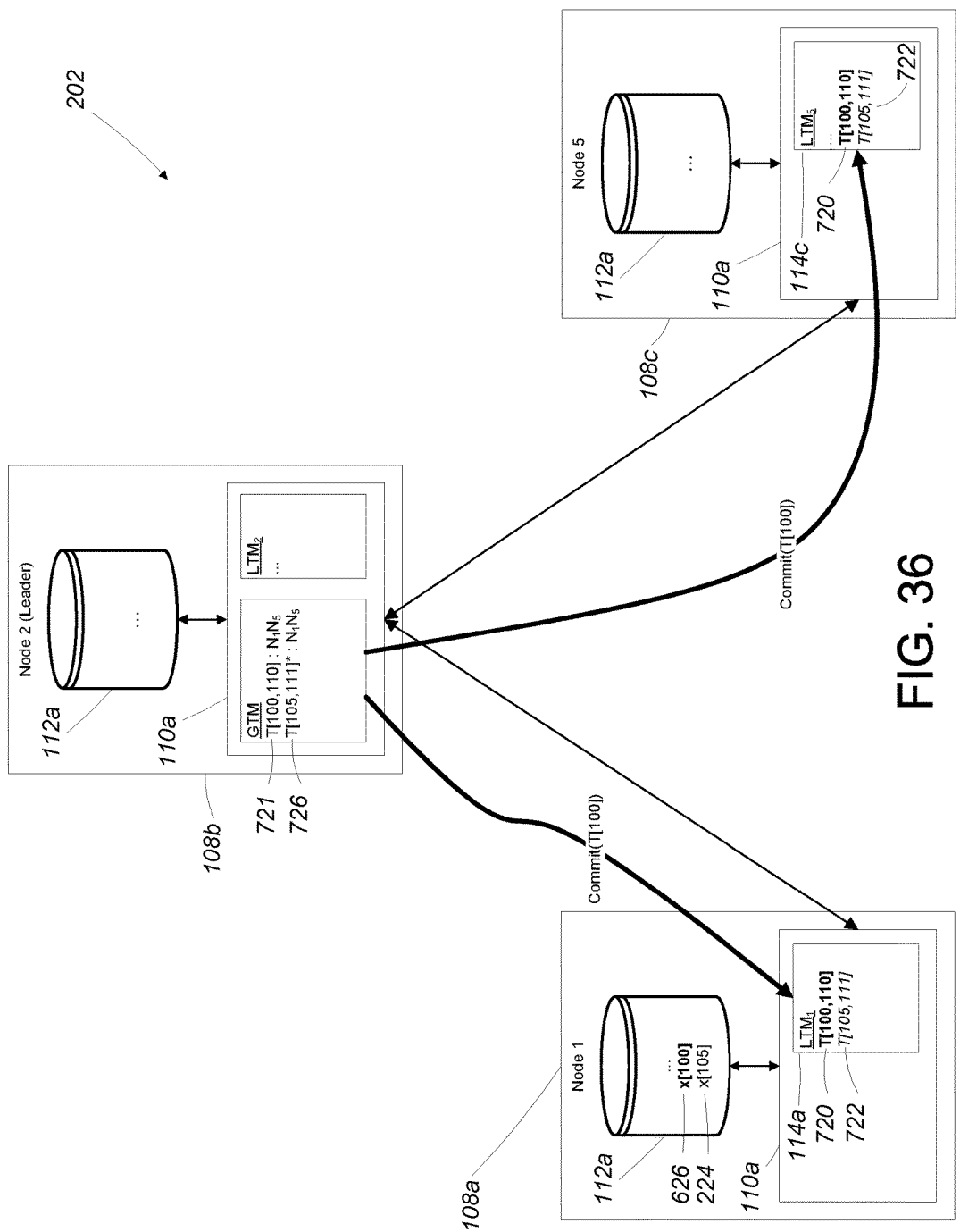
FIG. 36 is a block diagram showing the first transaction of FIG. 27 receiving commit messages from the leader node.

Referring to FIG. 36 with the OK(T[100]) messages from the first and fifth nodes 108a, 108c received, the global transaction manager 116 determines that all of the nodes on which the first transaction are operating have indicated that the first transaction is prepared to commit. The global transaction manager 116 marks the first global record 721 as no longer preparing and sends a Commit(T[100]) message to the first node 108a and the fifth node 108c, causing the first transaction to commit, including causing the x[100] version of x to commit on the database fragment 112a of the first node 108a.

Figure 37:
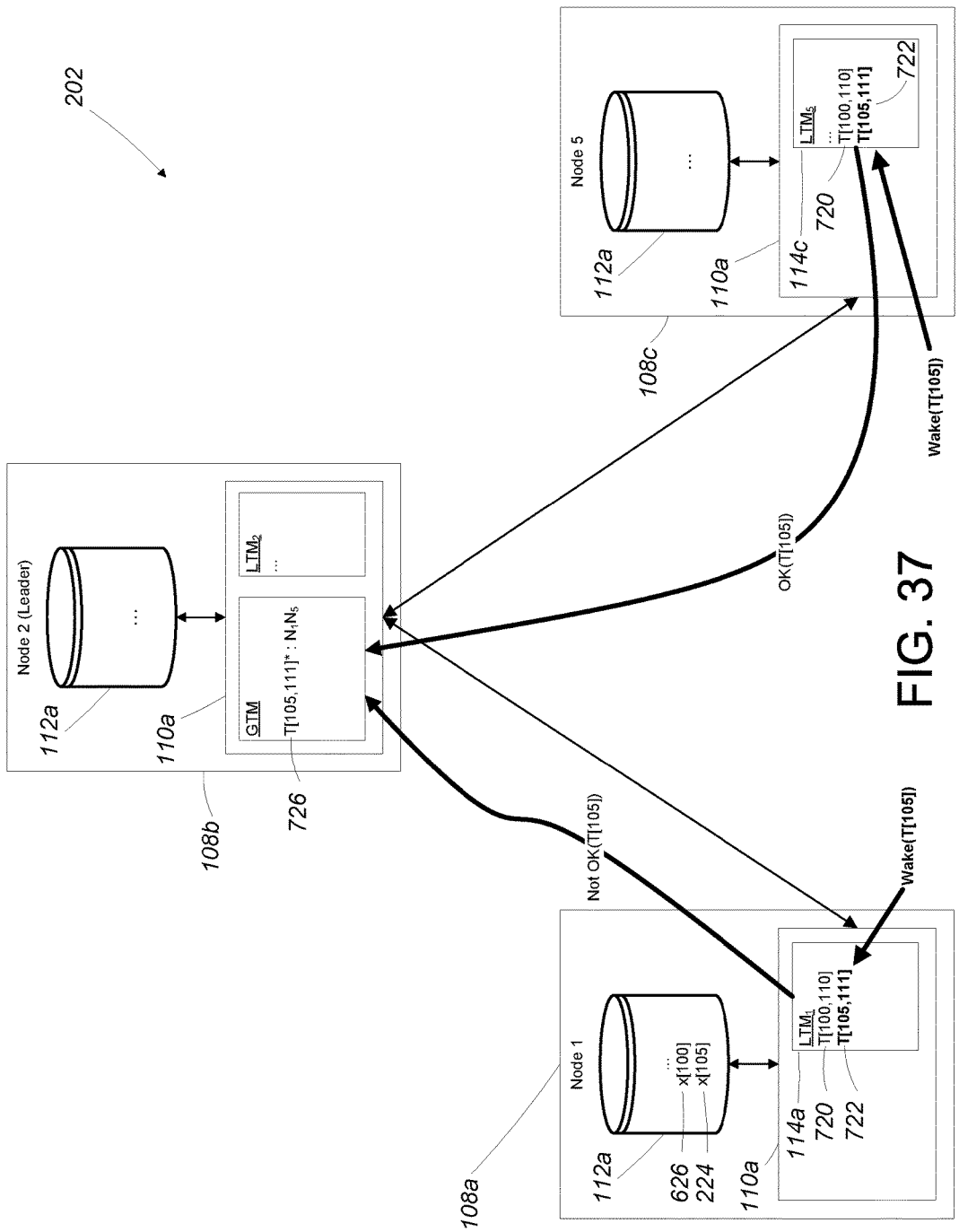
FIG. 37 is a block diagram showing the second transaction of FIG. 27 waking and sending a Not OK message to the leader node.

Referring to FIG. 37, with the first transaction committed, the second transaction wakes. Upon waking, the database manager 110a of the first node 108a sends a Not OK(T[105]) message to the global transaction manager 116 indicating that the second transaction can not commit on the first node 108a because it violates the first committer wins rule. The database manager 110c of the fifth node 108c sends an OK(T[105]) message indicating that the second transaction can commit.

Figure 38:
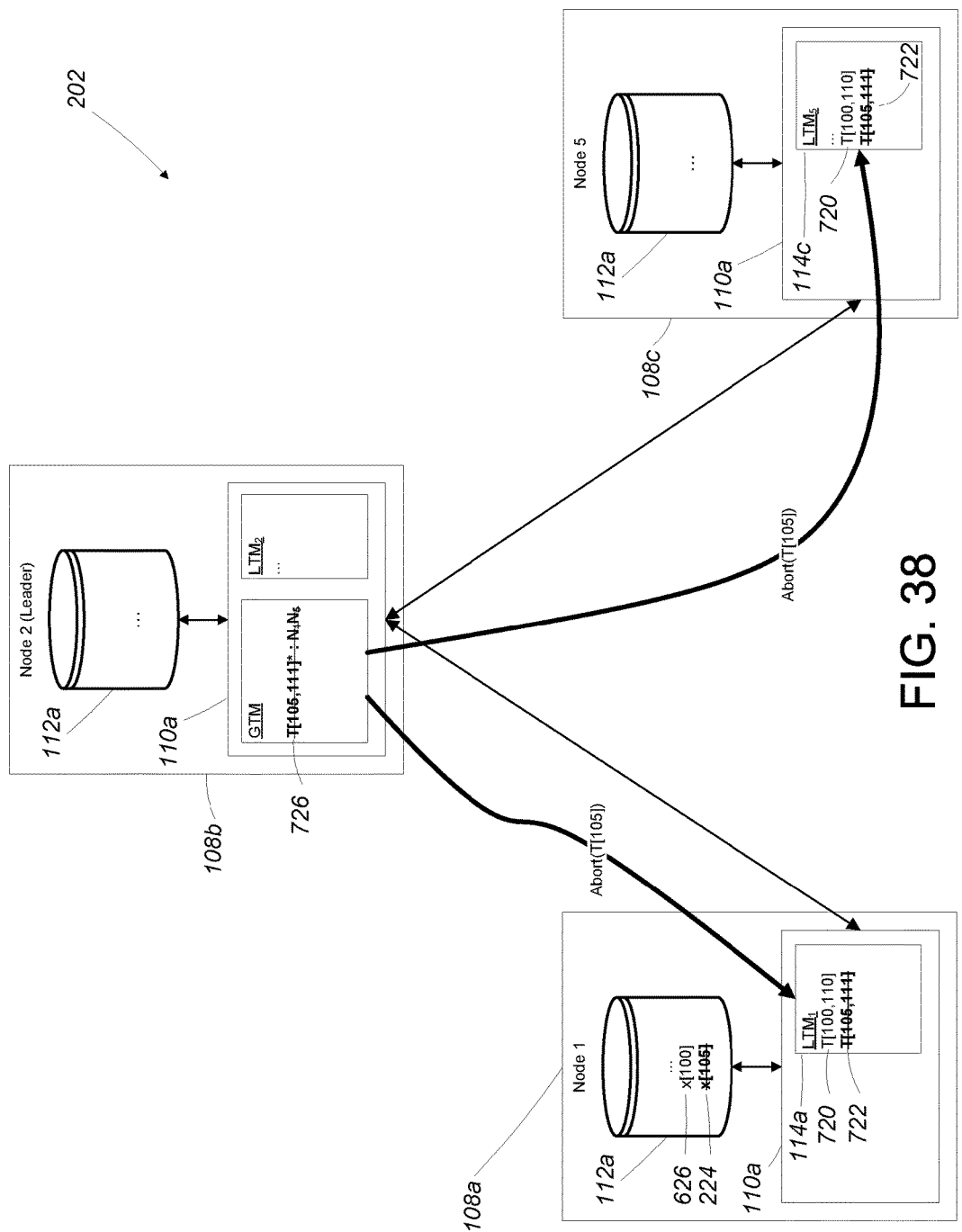
FIG. 38 is a block diagram showing the second transaction of FIG. 27 receiving abort messages from the leader node.

Referring to FIG. 38, as a result of receiving the Not OK(T[105]) message from the first node 108a, the global transaction manager 116 aborts the second transaction by removing the second global record 726 and sending an Abort(T[105]) message to the first node 108a and to the fifth node 108c.

Upon receiving the Abort(T[105]) message from the global transaction manager 116, the first node 108a removes the x[105] version of the data element x from its data fragment 112a and removes the second local record 722 from its local transaction manager 114a. Similarly, the fifth node 108c removes the second local record 722 from its local transaction manager 114c.

1.9 Local Transaction Manager Purging Mechanism

As is described above, the local transaction manager 114 for each of the nodes 108 in the distributed database system 102 maintains a record of each transaction that has in the past or is currently executing on the node 108. In some examples, a technical detail exists that makes it challenging for this process to scale. For example, considering a case where a transaction TRW is determining whether it can read a version of a date element, x[8]. It is known that x[8] was written by T[8], and that T[8] started before T[10]. However, the time when T[8] committed or if T[8] committed at all is not known (from x[8] itself). Although TRW can't obtain T[8]'s commit information directly from x, TRW can obtain this information from the record of T[8] stored in the local transaction manager 114. There will be one of four cases:

1. T[8] is still active (and the local transaction manager 114 knows that T[8] is still active). In this case, TRW cannot read x[8].
2. T[8] is aborting (and the local transaction manager 114 knows that T[8] is aborting), but the abort has yet to "undo" x[8]. In this case, TRW cannot read x[8].
3. T[8] committed before TRW started, meaning that T[8] is T[8,9]. In this case, TRW can read x[8].
4. T[8] committed after TRW started, so that T[8] is (say) T[8,12]. In this case, TRW cannot read x[8].

The challenge comes from points 3 and 4 above. In particular, the local transaction manager 114 maintains the transaction state for its transactions in memory (for efficient access). Points 3 and 4 imply that the local transaction manager 114 must maintain T[8]'s transaction state for a period of time after T[8] commits. This poses a problem for long-lived server processes. Specifically, the local transaction manager 114 must maintain T[8]'s state for as long as necessary to facilitate visibility calculations, and the local transaction manager 114 cannot maintain this state indefinitely, otherwise the server process would run out of memory and crash.

To prevent memory exhaustion, the local transaction managers 114 in the distributed database system 102 periodically purge "old" transaction state (i.e., old records of transactions). The local transaction manager 114 employs two purging strategies: an algorithmically efficient strategy that covers the most common case ("quick purge"), and a less efficient but more thorough strategy ("thorough purge"), for cases where quick purge is not sufficient.

In general, the purging algorithms may rely on a concept of a "global low water mark". The global low water mark is defined as follows: let T[i] be the oldest active transaction in the system, and let T[j] be the oldest active transaction at the time TN started. The global low water mark is j. Where transaction record purging is concerned, the global low water mark implies the following: any transaction whose transaction identifier is less than j must have committed long enough ago that its state information will never be needed again for visibility calculations.

1.9.1 Quick Purge

Prior to the quick purging algorithm beginning, the local transaction manager 114 for a node 108 includes a list of committed transactions, ordered by commit identifier. This list contains all committed transactions that might be needed for visibility calculations. To begin the quick purging process, the local transaction manager 114 sends a network message to the global transaction manager 116 of the distributed database system 102, requesting the global low water mark for the distributed database system 102, and a list of globally-active transactions. The global transaction manager 116 responds to the local transaction manager 114 with a message including the requested information. The local transaction manager 114 processes its list of committed transactions including comparing the commit identifiers of each of the committed transactions to the global low water mark. Any committed transaction with a commit identifier that is less than the global low water mark is purged from the local transaction manager 114. In some examples, the quick purge algorithm is a linear one-pass algorithm, with an early termination condition. On a single local transaction manager, the quick purge algorithm is able to examine the smallest number of transactions necessary for correct operation.

Figure 39:
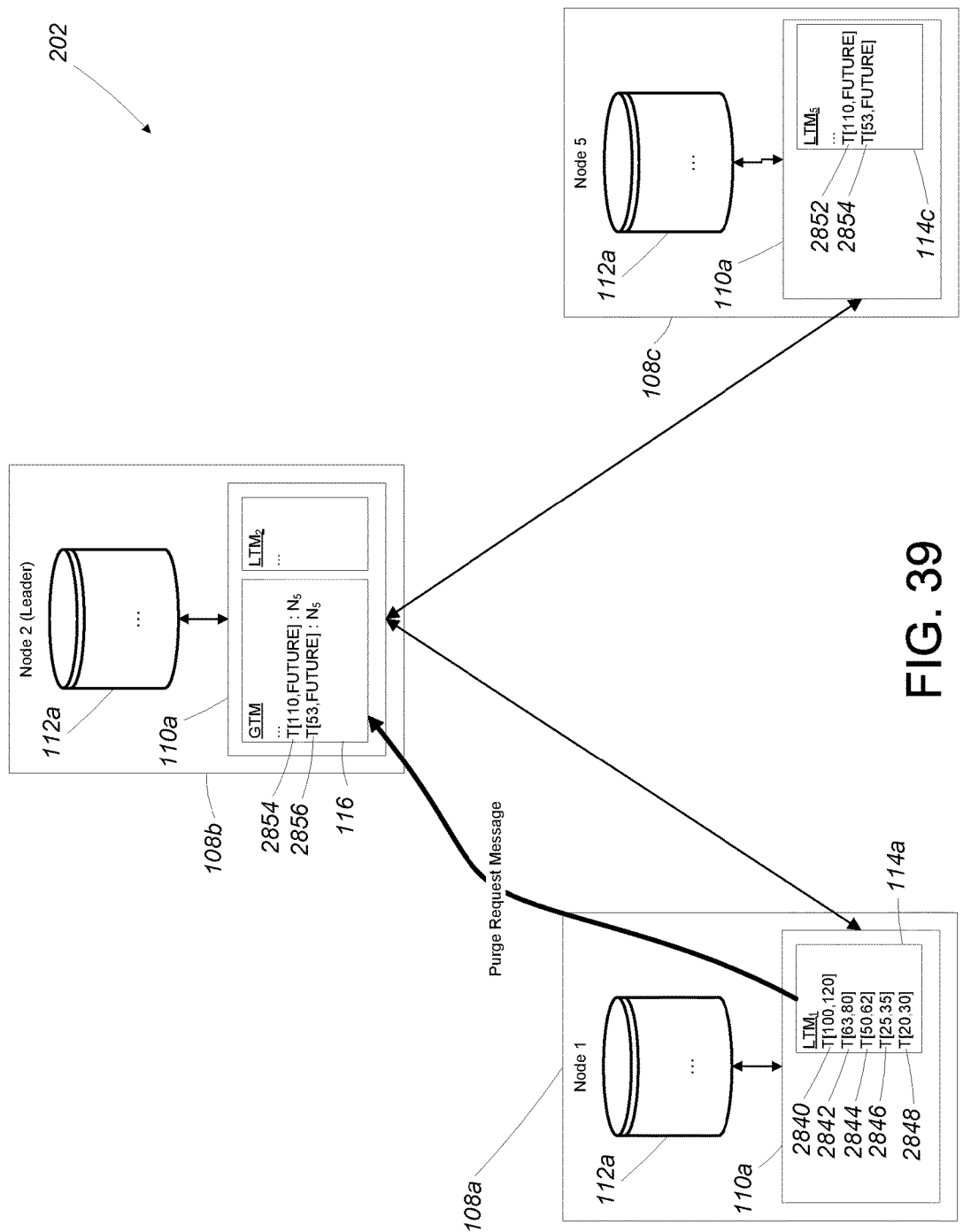
FIG. 39 is a block diagram showing a first node sending a Purge Request Message to a leader node in a distributed database system.

Referring to FIG. 39, a portion of a distributed database system 202 includes a first node 108a, a second node 108b, and a fifth node 108c. The second node is 108b is designated as the leader node for the distributed database system 202. A local transaction manager 114a of the first node 108a includes five local records of transactions that have previously completed at the first node 108a: a first local record 2840 of T[100,120], a second local record 2842 of T[63,80], a third local record 2844 of T[50, 62], a fourth local record 2846 of T[25,35], and a fifth local record 2848 of T[20,30]. The local transaction manager 114c of the fifth node 108c includes two local records of transactions that are active on the fifth node 108c: a sixth local record 2850 of T[110, FUTURE] and a seventh local record 2852 of T[53,FUTURE]. The global transaction manager 116 includes two global records of transactions that are active in the distributed database system: a first global record 2854 of T[110, FUTURE]: $N_5$ and a second global record 2856 of T[53, FUTURE]: $N_5$. The local transaction manager 114a of the first node 108a has sent a "Purge Request Message" to the global transaction manager 116, requesting the global low water mark for the distributed database system 102, and a list of globally-active transactions.

Figure 40:
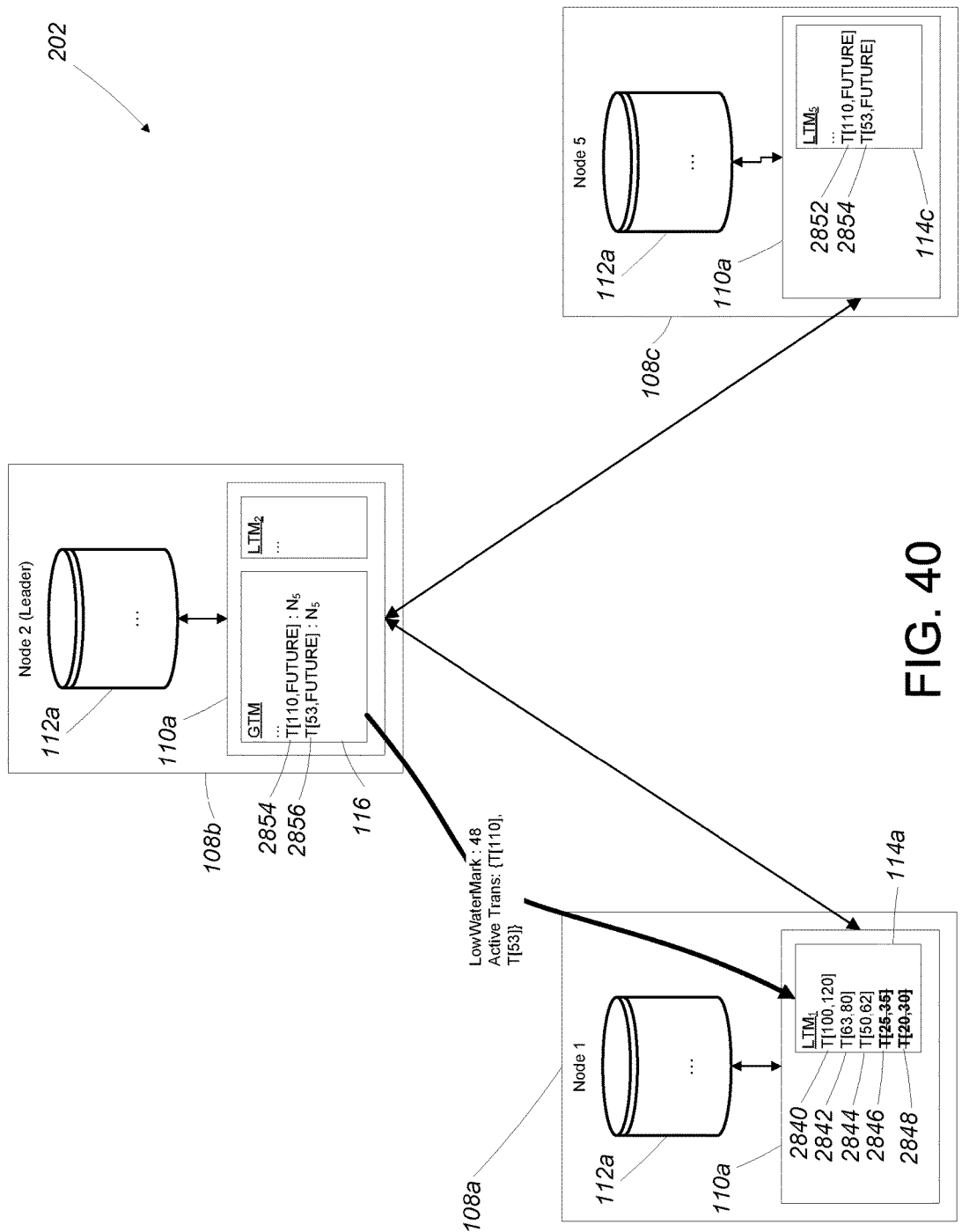
FIG. 40 is a block diagram showing the leader node of FIG. 39 sending a message including a low water mark and a list of active transactions back to the first node and showing the first node performing a quick purge operation.

Referring to FIG. 40, the global transaction manager 116 responds to the "Purge Request Message" with the global low water mark, which is 48 in this case, and with the list of globally active transactions, including T[110] and T[53]. To perform the quick purge, the local transaction manager 114a iterates through its local records of transactions, from oldest to newest, and compares the commit identifiers of the local records to the global low water mark to determine which local records to purge. In this example, the commit identifier (i.e., 30) of the fifth local record 2848 is compared to the global low water mark (i.e., 48). Since 30 is less than 48, the fifth local record 2848 is purged from the local transaction manager 114a. Next, the commit identifier (i.e., 35) of the fourth local record 2846 is compared to the global low water mark (i.e., 48). Since 35 is less than 48, the fourth local record 2846 is purged from the local transaction manager 114a. Then, the commit identifier (i.e., 62) of the third local record 2844 is compared to the global low water mark (i.e., 48). Since 62 is greater than 48, the third local record 2844 is not purged and the quick purging algorithm completes.

1.9.2 Thorough Purge

In some examples, the quick purging algorithm described above is effective for workloads where transactions arrive, execute, and complete at a relatively steady rate. However, not all workloads necessarily have these characteristics. In particular, in some examples the quick purging algorithm deals poorly with long-running transactions (i.e., transactions whose lifetime is significantly longer than average). In such examples, the local transaction manager 114 uses the thorough purging algorithm.

In general, the thorough purging algorithm is executed once the local transaction manager 114 possesses the global low water mark and the list of globally active transaction identifiers and has already performed the quick purging algorithm. The thorough purging algorithm iterates through the local records of committed transaction stored by the local transaction manager 114. For each local record, T[i,j] the local transaction manager 114 iterates over the list of globally active transaction identifiers and compares each globally active transaction identifier, g, to the transaction identifier (i.e., i) and the commit identifier (i.e., j) of the local record to determine whether the local record can be purged. In general, if a globally active transaction identifier, g, exists such that i<g<j, then the local record can not be purged. If no such g is identified, then the local record is purged.

Note that the need to maintain T[i,j] if a g, exists such that i<g<j implies the following: there exists an active transaction T[g] that has not joined with this specific local transaction manager 114, but is concurrent to T[i,j]. If T[g] were to join, then T[i,j]'s state information may be needed for Ties visibility decisions.

Figure 41:
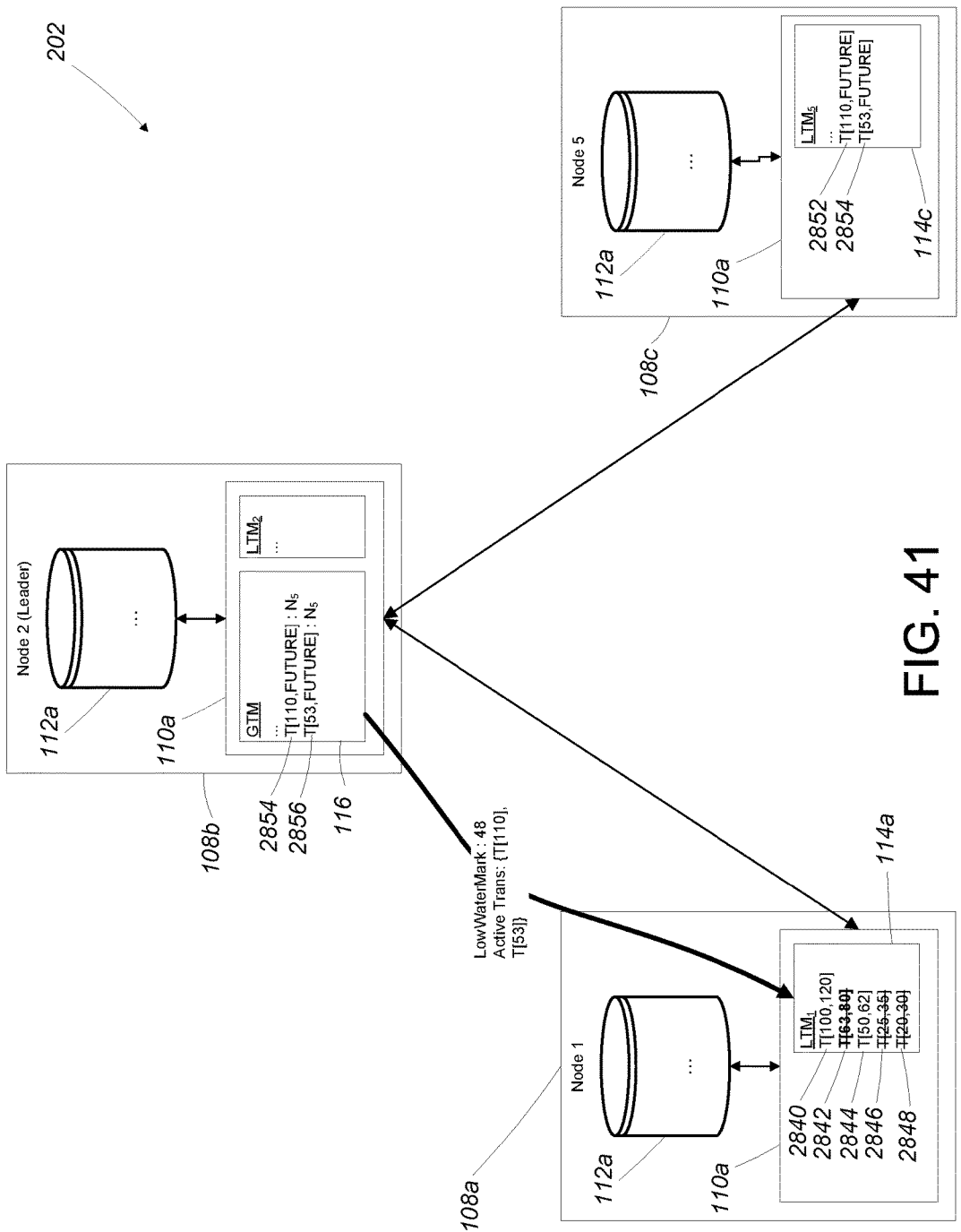
FIG. 41 is a block diagram showing the leader node of FIG. 39 sending a message including a low water mark and a list of active transactions back to the first node and showing the first node performing a thorough purge operation.

Referring to FIG. 41, the quick purge algorithm has been performed (as shown in FIG. 40) and the local transaction manager 114a has the list of globally active transactions, T[53] and T[110]. The thorough purge algorithm iterates through the first local record 2840, the second local record 2842, and the third local record 2844.

When the thorough purge algorithm reaches the first local record 2840, the algorithm compares the transaction identifiers of the list of globally active transactions (i.e., 53 and 110) to the transaction identifier (i.e., 100) and the commit identifier (i.e., 120) of the first local record 2840 to determine whether the first local record 2840 can be purged. In this example, there exists a globally active transaction with a transaction identifier of '110.' Since '110' falls in between the transaction identifier (i.e., 100) and the commit identifier (i.e., 120) of the first local record 2840, the first local record 2840 is not purged.

When the thorough purge algorithm reaches the second local record 2842, the algorithm compares the transaction identifiers of the list of globally active transactions (i.e., 53 and 110) to the transaction identifier (i.e., 63) and the commit identifier (i.e., 80) of the second local record 2842 to determine whether the second local record 2842 can be purged. In this example, since none of the transaction identifiers of the globally active transactions falls in between the transaction identifier (i.e., 63) and the commit identifier (i.e., 80) of the second local record 2842, the second local record 2842 is purged.

When the thorough purge algorithm reaches the third local record 2844, the algorithm compares the transaction identifiers of the list of globally active transactions (i.e., 53 and 110) to the transaction identifier (i.e., 50) and the commit identifier (i.e., 62) of the third local record 2844 to determine whether the third local record 2844 can be purged. In this example, there exists a globally active transaction with a transaction identifier of '53.' Since '53' falls in between the transaction identifier (i.e., 50) and the commit identifier (i.e., 62) of the third local record 2844, the third local record 2844 is not purged.

In the example of FIG. 41, at the completion of the thorough purge algorithm, all local records with the exception of the first local record 2840 and the third local record 2844 are purged from the local transaction manager 114a of the first node 108a.

2 Implementations

The distributed database system described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing transactions in a distributed database system including a plurality of nodes, the method including:
   maintaining, at a first node of the plurality of nodes, records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node;
   receiving, at the second node from the first node, a list of transactions that includes any of the plurality of transactions executing on the second node and having a first transaction state at a time of initiation of the second transaction, the list of transactions including the first transaction;
   determining that an outcome of the second transaction depends on an outcome of the first transaction based at least in part on the list of transactions;
   suspending, based on determining that the outcome of the second transaction depends on the outcome of the first transaction, execution of the second transaction; and
   resuming the execution of the second transaction after the first transaction is completed.

2. The method of claim 1 wherein determining that an outcome of the second transaction depends on an outcome of the first transaction based at least in part on the list of transactions includes determining that a time of initiation of the first transaction occurs prior to the time of initiation of the second transaction and that a commit time of the first transaction occurs prior to the time of initiation of the second transaction.

3. The method of claim 2 wherein the list of transactions is received at the second node at the time of initiation of the second transaction.

4. The method of claim 1 wherein the transactions included in the list of transactions consist of the transactions executing on the second node and having the first transaction state at the time of initiation of the second transaction.

5. The method of claim 1 wherein the list of transactions includes, for each transaction in the list of transactions, a time of initiation of the transaction.

6. The method of claim 1 wherein the first transaction state indicates that a transaction is preparing to complete.

7. The method of claim 1 wherein the first transaction writes the first data element and the second transaction reads the first data element, and a version of the first data element read by the second transaction depends on the outcome of the first transaction.

8. The method of claim 7 wherein possible outcomes of the first transaction include a transaction aborted outcome and a transaction committed outcome.

9. The method of claim 8, wherein resuming the execution of the second transaction after completion of the first transaction comprises reading a first version of the first data element if the outcome of the first transaction is the transaction aborted outcome.

10. The method of claim 8, wherein resuming the execution of the second transaction after completion of the first transaction comprises reading a second, different version of the first data element written by the first transaction if the outcome of the first transaction is the transaction committed outcome.

11. The method of claim 1 wherein one or both of the first transaction and the second transaction accesses data elements stored on a third node of the plurality of nodes.

12. The method of claim 1 wherein both the first transaction and the second transaction attempt to write the first data element and the second transaction is in the first transaction state.

13. The method of claim 12 wherein determining that an outcome of the second transaction depends on an outcome of the first transaction based at least in part on the list of transactions includes determining that a time of initiation of the second transaction occurs after a time of initiation of the first transaction and before a commit time of the first transaction.

14. The method of claim 12 wherein the first transaction is scheduled to commit its write before the second transaction and whether or not the second transaction is aborted depends on whether the first transaction results in a transaction aborted outcome or a transaction committed outcome.

15. The method of claim 14, wherein resuming the execution of the second transaction after completion of the first transaction comprises writing a first value of the first data element if the outcome of the first transaction is the transaction aborted outcome.

16. The method of claim 14, wherein resuming the execution of the second transaction after completion of the first transaction comprises aborting the second transaction if the outcome of the first transaction is the transaction committed outcome.

17. The method of claim 1, further comprising:
   determining, based on data in the list of transactions received at the second node, whether the first transaction started before the second transaction;
   wherein suspending the execution of the second transaction comprises suspending execution of the second transaction in response to determining that the first transaction started before the second transaction and determining that the outcome of the second transaction depends on the outcome of the first transaction.

18. The method of claim 1, wherein suspending the execution of the second transaction comprises suspending the execution of the second transaction to place the second transaction in a sleep state.

19. A computing system for managing transactions in a distributed database system including a plurality of nodes, the computing system including:
   means for maintaining, at a first node of the plurality of nodes, records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node;

means for receiving, at the second node from the first node, a list of transactions that includes any of the plurality of transactions executing on the second node and having a first transaction state at a time of initiation of the second transaction, the list of transactions including the first transaction;

means for determining that an outcome of the second transaction depends on an outcome of the first transaction based at least in part on the list of transactions;

means for suspending based on a determination that the outcome of the second transaction depends on the outcome of the first transaction, execution of the second transaction; and means for resuming the execution of the second transaction after the first transaction is completed.

20. Software stored in a non-transitory form on a computer-readable medium, for managing transactions in a distributed database system including a plurality of nodes, the software including instructions for causing a computing system to:

maintain, at a first node of the plurality of nodes, records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node;

receive, at the second node from the first node, a list of transactions that includes any of the plurality of transactions executing on the second node and having a first transaction state at a time of initiation of the second transaction, the list of transactions including the first transaction;

determine that an outcome of the second transaction depends on an outcome of the first transaction based at least in part on the list of transactions;

suspend, based on a determination that the outcome of the second transaction depends on the outcome of the first transaction, execution of the second transaction; and resume the execution of the second transaction after the first transaction is completed.

21. The software of claim 20, wherein the instructions for causing the computing system to determine that an outcome of the second transaction depends on an outcome of the first transaction based at least in part on the list of transactions comprises one or more instructions for causing the computing system to determine that a time of initiation of the first transaction occurs prior to the time of initiation of the second transaction and that a commit time of the first transaction occurs prior to the time of initiation of the second transaction.

22. The software of claim 20, wherein the first transaction writes the first data element and the second transaction reads the first data element, and a version of the first data element read by the second transaction depends on the outcome of the first transaction.

23. The software of claim 22, wherein possible outcomes of the first transaction include a transaction aborted outcome and a transaction committed outcome.

24. The software of claim 23, wherein the instructions for causing the computing system to resume the execution of the second transaction after completion of the first transaction includes one or more instructions for causing the computing system to read a first version of the first data element if the outcome of the first transaction is the transaction aborted outcome.

25. The method of claim 23, wherein the instructions for causing the computing system to resume the execution of the second transaction after completion of the first transaction includes one or more instructions for causing the computing system to read a second, different version of the first data element written by the first transaction if the outcome of the first transaction is the transaction committed outcome.

26. The software of claim 20, wherein both the first transaction and the second transaction attempt to write the first data element and the second transaction is in the first transaction state.

27. The software of claim 26, wherein the instructions for causing the computing system to resume the execution of the second transaction after completion of the first transaction comprise one or more instructions for causing the computing system to write a first value of the first data element if the outcome of the first transaction is the transaction aborted outcome.

28. The software of claim 26, wherein the instructions for causing the computing system to resume the execution of the second transaction after completion of the first transaction comprise one or more instructions for causing the computing system to abort the second transaction if the outcome of the first transaction is the transaction committed outcome.

29. The software of claim 20, wherein the instructions comprise additional instructions for further causing the computing system to:

determine, based on data in the list of transactions received at the second node, whether the first transaction started before the second transaction;

wherein the instructions for causing the computing system to suspend the execution of the second transaction comprise one or more instructions for causing the computing system to suspend execution of the second transaction in response to determining that the first transaction started before the second transaction and determining that the outcome of the second transaction depends on the outcome of the first transaction.

30. The software of claim 20, wherein the instructions for causing the computing system to suspend the execution of the second transaction comprise one or more instructions for causing the computing system to suspend the execution of the second transaction to place the second transaction in a sleep state.

31. An apparatus for managing transactions, the apparatus including:

a plurality of nodes arranged in a distributed database system, each node including at least one processor; and a communication medium connecting ports of the plurality of nodes for sending and receiving information between the plurality of nodes;

wherein a first node of the plurality of nodes is configured to maintain records of a plurality of transactions, each transaction executing on one or more of the plurality of nodes, each record having a transaction state of a plurality of transaction states, the records including a record for a first transaction and a record for a second transaction, execution of the first transaction at a second node of the plurality of nodes including an operation for accessing a first data element stored on the second node and execution of the second transaction at the second node including an operation for accessing the first data element stored on the second node;

wherein the second node is configured to receive, from the first node, a list of transactions that includes any of the plurality of transactions executing on the second node and having a first transaction state at a time of initiation of the second transaction, the list of transactions including the first transaction;

wherein the second node is configured to determine that an outcome of the second transaction depends on an outcome of the first transaction based at least in part on the list of transactions;

wherein the second node is configured suspend, based on a determination that the outcome of the second transaction depends on the outcome of the first transaction, execution of the second transaction; and wherein the second node is configured to resume the execution of the second transaction after the first transaction is completed.

32. The apparatus claim 31, wherein the second node configured to determine that an outcome of the second transaction depends on an outcome of the first transaction based at least in part on the list of transactions is configured to determine that a time of initiation of the first transaction occurs prior to the time of initiation of the second transaction and that a commit time of the first transaction occurs prior to the time of initiation of the second transaction.

33. The apparatus of claim 31, wherein the first transaction writes the first data element and the second transaction reads the first data element, and a version of the first data element read by the second transaction depends on the outcome of the first transaction.

34. The apparatus of claim 33, wherein possible outcomes of the first transaction include a transaction aborted outcome and a transaction committed outcome.

35. The apparatus of claim 34, wherein the second node configured to resume the execution of the second transaction after completion of the first transaction is configured to read a first version of the first data element if the outcome of the first transaction is the transaction aborted outcome.

36. The apparatus of claim 34, wherein the second node configured to resume the execution of the second transaction after completion of the first transaction is configured to read a second, different version of the first data element written by the first transaction if the outcome of the first transaction is the transaction committed outcome.

37. The apparatus of claim 31, wherein both the first transaction and the second transaction attempt to write the first data element and the second transaction is in the first transaction state.

38. The apparatus of claim 37, wherein the first transaction is scheduled to commit its write before the second transaction and whether or not the second transaction is aborted depends on whether the first transaction results in a transaction aborted outcome or a transaction committed outcome.

39. The apparatus of claim 38, wherein the second node configured to resume the execution of the second transaction after completion of the first transaction is configured to write a first value of the first data element if the outcome of the first transaction is the transaction aborted outcome.

40. The apparatus of claim 38, wherein the second node configured to resume the execution of the second transaction after completion of the first transaction is configured to abort the second transaction if the outcome of the first transaction is the transaction committed outcome.

41. The apparatus of claim 31, wherein the second node is further configured to:
determine, based on data in the list of transactions received at the second node, whether the first transaction started before the second transaction;
wherein the second node configured to suspend the execution of the second transaction is configured to suspend execution of the second transaction in response to determining that the first transaction started before the second transaction and determining that the outcome of the second transaction depends on the outcome of the first transaction.

42. The apparatus of claim 31, wherein the second node configured to suspend the execution of the second transaction is configured to suspend the execution of the second transaction to place the second transaction in a sleep state.

* * * * *